US008863547B2

(12) United States Patent
Enis et al.

(10) Patent No.: US 8,863,547 B2
(45) Date of Patent: Oct. 21, 2014

(54) DESALINATION METHOD AND SYSTEM USING COMPRESSED AIR ENERGY SYSTEMS

(76) Inventors: Ben M. Enis, Henderson, NV (US); Paul Lieberman, Torrance, CA (US)

(*) Notice: Subject to any disclaimer, the term of this patent is extended or adjusted under 35 U.S.C. 154(b) by 2238 days.

(21) Appl. No.: 11/731,717

(22) Filed: Mar. 30, 2007

(65) Prior Publication Data
US 2007/0295673 A1 Dec. 27, 2007

Related U.S. Application Data

(60) Provisional application No. 60/832,777, filed on Jul. 24, 2006, provisional application No. 60/794,190, filed on Apr. 21, 2006, provisional application No. 60/789,415, filed on Apr. 5, 2006.

(51) Int. Cl.
*F25D 9/00* (2006.01)
(52) U.S. Cl.
USPC .............................. 62/401; 62/532; 210/170
(58) Field of Classification Search
CPC ............ B01D 5/0027; B01D 7/00; C02F 1/22
USPC .............. 210/170.11, 766; 62/401, 532, 123, 62/238.2, 434
See application file for complete search history.

(56) References Cited

U.S. PATENT DOCUMENTS

| | | |
|---|---|---|
| 1,970,431 A | 8/1934 | Snitkin |
| 1,999,712 A | 4/1935 | Zorn et al. |
| 2,372,846 A * | 4/1945 | Nettel et al. ................. 202/152 |
| 2,988,895 A | 6/1961 | Toulmin |
| 3,178,900 A | 4/1965 | Saunders |
| 3,204,419 A | 9/1965 | Rose |
| 3,251,192 A | 5/1966 | Rich et al. |
| 3,261,192 A | 7/1966 | Rich et al. |
| 3,314,881 A | 4/1967 | Tuwlner |
| 3,342,039 A | 9/1967 | Bridge et al. |

(Continued)

OTHER PUBLICATIONS

Gao, Partial freezing by spraying as a treatment alternative of selected industrial wastes, National Library of Canada, Univ. of Alberta, Fall, 1998, thesis.

(Continued)

*Primary Examiner* — Mohammad M Ali
(74) *Attorney, Agent, or Firm* — J. John Shimazaki

(57) ABSTRACT

The invention relates to a desalination method and system that uses freeze crystallization technology that incorporates the use of compressed air energy as the source for freezing temperatures. When compressed air is released by a turbo expander, chilled air is produced as a by-product, wherein the chilled air is introduced into a crystallization chamber. Also injected into the chamber is a spray cloud of seawater droplets, which has been pre-chilled by heat exchange with the cold chamber walls, and which is then circulated and exposed to the chilled air in the chamber. The sizes of the droplets can vary, but are preferably predetermined, along with the relative temperatures, flows and speeds of the spray and chilled air, such that when the droplets are circulated within the chilled air, and settle at the bottom of the chamber, they are deposited at slightly above the eutectic temperature. This way, the ice/snow mass that forms at the bottom of the chamber will consist of frozen ice crystals, and a residue of salt water brine, which can runoff from the mass, either from the sides, or through any voids or channels that may form within the mass.

12 Claims, 24 Drawing Sheets

(56) References Cited

U.S. PATENT DOCUMENTS

| | | |
|---|---|---|
| 3,356,691 A | 12/1967 | Peterson |
| 3,367,123 A | 2/1968 | Schambra |
| 3,404,536 A | 10/1968 | Aronson |
| 3,440,147 A | 4/1969 | Rannenberg |
| 3,443,393 A | 5/1969 | Goldberg |
| 3,463,679 A | 8/1969 | Goldberger |
| 3,501,924 A | 3/1970 | Ashley |
| 3,687,859 A | 8/1972 | Probestein et al. |
| 3,885,399 A | 5/1975 | Campbell |
| 3,992,900 A | 11/1976 | Campbell |
| 4,091,635 A | 5/1978 | Ogman |
| 4,112,702 A | 9/1978 | Smirnov et al. |
| 4,319,964 A | 3/1982 | Katz et al. |
| 4,323,424 A | 4/1982 | Secundo et al. |
| 4,356,015 A | 10/1982 | Oliver |
| 4,406,748 A | 9/1983 | Hoffman |
| 4,749,394 A | 6/1988 | Ehrsam |
| 4,838,039 A | 6/1989 | Knodel |
| 4,948,514 A | 8/1990 | MacGregor et al. |
| 5,207,928 A | 5/1993 | Lerner |
| 5,394,706 A | 3/1995 | Keus |
| 5,400,619 A | 3/1995 | Husseiny et al. |
| 5,465,585 A | 11/1995 | Mornhed |
| 5,555,747 A | 9/1996 | Conlon |
| 5,575,160 A | 11/1996 | Keus |
| 5,655,377 A | 8/1997 | Mornhed |
| 6,299,735 B1 | 10/2001 | Lumbreras |
| 6,305,189 B1 | 10/2001 | Menin |
| 6,336,334 B1 | 1/2002 | Minkkinen et al. |
| 6,994,156 B2 | 2/2006 | Kopko |
| 7,159,407 B2 * | 1/2007 | Chen ............ 62/100 |

OTHER PUBLICATIONS

Cho, et al., NMR investigation of the quasi-brine layer in ice/brine mixtures, J. Phys. Chem. B. Feb. 2002. pp. 11.228-232. Pacific Northwest National Laboratory.

Wilf, Application of RO desalting technology for potable water production in USA, date unknown, Hydranautios, www.membranes.com.

Koop, et al., Phase transitions of sea-salt/water mixtures at low temperatures . . . , Journal of Geophysical Research, Nov. 2000, vol. 105, pp. 28,393-402, MIT, Cambridge, MA.

Seekler et al., Application of eutectic freeze crystallization to process streams . . . Deft University/Energy and Process Innovation, 2002, The Netherlands.

Eksperiandova of al., Distribution of impurities during low-temperature . . . , J Solution Chem, Jun. 2006, pp. 1075-1084, National Academy of Sciences, Ukraine.

* cited by examiner

| RECIPROCATING COMPRESSOR | PRESSURE (PSIA) | TEMPERATURE (DEG F) | DENSITY (#/CU FT) | ENTHALPY (BTU/#) | ENTROPY (BTU/(# R) |
|---|---|---|---|---|---|
| INPUT | 14.67 | 70 | 0.074764 | 126.71 | 1.6366 |
| ISENTROPIC | 90 | 426.44 | 0.27351 | 213.05 | 1.6366 |
|  |  |  |  | -86.34 |  |
| EFFICIENCY |  |  |  | 0.84 |  |
| OUTPUT | 90 | 492.95 | 0.25438 | 229.5 | 1.6545 |
|  |  |  |  | -102.79 |  |
| CENTRIFUGAL COMPRESSOR | PRESSURE (PSIA) | TEMPERATURE (DEG F) | DENSITY (#/CU FT) | ENTHALPY (BTU/#) | ENTROPY (BTU/(# R) |
| INPUT | 85 | 70 | 0.43391 | 126.22 | 1.5153 |
| ISENTROPIC | 205 | 222.06 | 0.80974 | 162.64 | 1.5153 |
|  |  |  |  | -36.42 |  |
| EFFICIENCY |  |  |  | 0.84 |  |
| OUTPUT | 205 | 250.4 | 0.77695 | 169.58 | 1.5253 |
|  |  |  |  | -43.36 |  |
| TURBOEXPANDER | PRESSURE (PSIA) | TEMPERATURE (DEG F) | DENSITY (#/CU FT) | ENTHALPY (BTU/#) | ENTROPY (BTU/(# R) |
| INPUT | 200 | 70 | 1.0235 | 125.42 | 1.4552 |
| ISENTROPIC | 31.5 | -148.87 | 0.27586 | 73.734 | 1.4552 |
|  |  |  |  | 51.686 |  |
| EFFICIENCY |  |  |  | 0.84 |  |
| OUTPUT | 31.5 | -114.78 | 0.24795 | 82.004 | 1.4804 |
|  |  |  |  | 43.41624 |  |

FIGURE 3a

|  | HP | SCFM |
|---|---|---|
| RECIPRO. COMPRESSOR | 2,000.0 | 10,857.6 |
| TURBO COMPRESSOR | 844.3 | 10,857.6 |
| TURBO EXPANDER | 844.3 | 10,857.6 |

FIGURE 3b

THERMODYNAMICS OF A 500 kW TURBOEXPANDER

|  | PRESSURE PSIA | TEMP DEG F | DENSITY #/CU FT | ENTHALPY BTU/# | ENTROPY BTU/(# R) |
|---|---|---|---|---|---|
| INPUT | 200 | 70 | 1.0235 | 125.42 | 1.4552 |
| ISENTROPIC EXPANSION | 14.67 | -210.22 | 0.15997 | 59.225 | 1.4552 |
|  |  |  |  | 66.195 |  |
| EFFICIENCY |  |  |  | 0.79 |  |
|  |  |  |  | 73.12595 |  |
| OUTPUT | 14.67 | -152.73 | 0.12951 | 73.126 | 1.5054 |
|  |  |  | 10.67 | SCFM/HP |  |
|  |  |  | 510.65 | kW(thermal) |  |

|  | PRESSURE PSIA | TEMP DEG F | DENSITY #/CU FT | ENTHALPY BTU/# | ENTROPY BTU/(# R) |
|---|---|---|---|---|---|
| INPUT | 200 | 70 | 1.0235 | 125.42 | 1.4552 |
| ISENTROPIC EXPANSION | 30 | -153.21 | 0.26643 | 72.71 | 1.4552 |
|  |  |  |  | 52.71 |  |
| EFFICIENCY |  |  |  | 0.85 |  |
|  |  |  |  | 80.6165 |  |
| OUTPUT | 30 | -120.61 | 0.24022 | 80.616 | 1.4797 |
|  |  |  | 12.45 | SCFM/HP |  |
|  |  |  | 510.07 | kW(thermal) |  |

FIGURE 7

Standard Seawater Composition

| Molar | Salt | Concentration (g/liter) | Eutectic Temperature (C) | Eutectic Composition (w%) |
|---|---|---|---|---|
| 0.425 | sodium chloride | 24.6 | -21.2 | 23.3 |
| 0.009 | potassium chloride | 0.67 | -11.1 | 19.8 |
| 0.0093 | calcium chloride * 2H2O | 1.36 | -55 | 29.8 |
| 0.0255 | magnesium sulfate * 7H2O | 6.29 | -3.9 | 19 |
| 0.023 | magnesium chloride * 6H2O | 4.66 | -33.6 | 21.6 |
| 0.002 | sodium bicarbonate | 0.18 | -2.1 | 5.9 | pH to 8.0

FIGURE 8

| Substance | Desired maximum concentration in mg/l | Permitted maximum concentration in mg/l | Isotonic solution in mg/l |
|---|---|---|---|
| total dissolved solids | 500 | 1500 | 9000 |
| Mg | 30 | 150 | - |
| Ca | 75 | 200 | - |
| Chloride | 20 | 60 | 3550-3800 |
| Sulfate | 200 | 400 | - |
| Sodium | - | - | 3050-3400 |
| Potassium | - | - | 150-210 |
| total content in mmol/l | approx. 10 | approx. 30 | approx. 150 |

FIGURE 9

| Cloud Temperature | Droplets |
|---|---|
| Above 0 C (32 F) | Liquid Water |
| -10 to 0 C (12 TO 32 F) | Supercooled Water |
| -40 to -10 C (-4 TO 14 F) | Supercooled Water and Ice Crystals Coexist (mixed clouds) |
| Below -40 C (-4 F) | Mainly Ice Crystals (glaciated clouds) |

FIGURE 10

| Spray Type | 10 psi | | 40 psi | | 100 psi | |
|---|---|---|---|---|---|---|
| | Capacity (gpm) | VMD μm | Capacity (gpm) | VMD μm | Capacity (gpm) | VMD μm |
| Hollow Cone | .05 12 | 360 3400 | .10 24 | 300 1900 | .16 38 | 200 1260 |
| Flat Fan | .05 5 | 260 4300 | .10 10 | 220 2500 | .16 15.8 | 190 1400 |
| Full Cone | .10 12 | 1140 4300 | .19 23 | 850 2800 | .30 35 | 500 1720 |

FIGURE 11
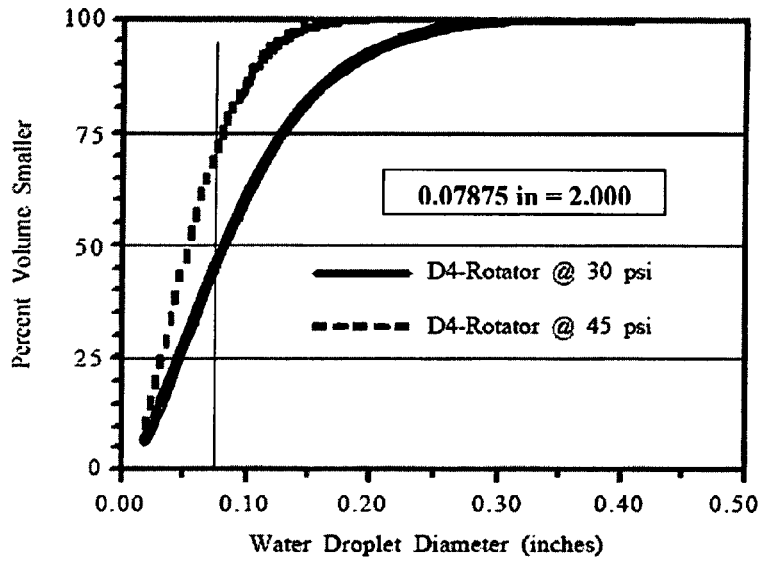
FIGURE 12
| Biot Number | | | | | hR/k |
|---|---|---|---|---|---|
| 2000 | 2000 | 2000 | 1000 | microns radius | R |
| 0.00656 | 0.00656 | 0.00656 | 0.00328 | ft | R |
| 0.25 | 0.25 | 0.25 | 0.25 | BTU/(hr ft F) | k |
| 5 | 1 | 1 | 1 | BTU/(hr sq-ft F) | h |
| 0.1312 | 0.0262 | 0.0262 | 0.0131 | | Bi |
| 7.62 | 38.1 | 38.1 | 76.2 | | 1/Bi |
| Fourier Number | | | | | alpha* t/R2 |
|---|---|---|---|---|---|
| 0.75 | 0.75 | 0.75 | 0.75 | sq ft/hr | alpha |
| 2 | 2 | 10 | 2 | sec | time |
| 0.00056 | 0.00056 | 0.00278 | 0.00056 | hr | time |
| 4.30556E-05 | 4.30556E-05 | 4.30556E-05 | 1.07639E-05 | sq ft | radius squared |
| 9.68 | 9.68 | 48.39 | 38.71 | | Fo |
| (Tc-Ti)/(Ts-Ti) | | | | | |
|---|---|---|---|---|---|
| 0.025 | 0.4 | 0.025 | 0.2 | | |
| Ts | 70 | 70 | 70 | 70 | F | throughout sphere initially |
| Ti | -157 | -157 | -157 | -157 | F | sustained air temperature |
| Tc | -151.325 | -66.2 | -151.325 | -111.6 | F | sphere center |
exp(-Bi * Fo)   0.280831622   0.775691802   0.280831622   0.601697772
3*h*t/(w*Cp*R)  0.020352564   0.004070513   0.020352564   0.008141026
FIGURE 13
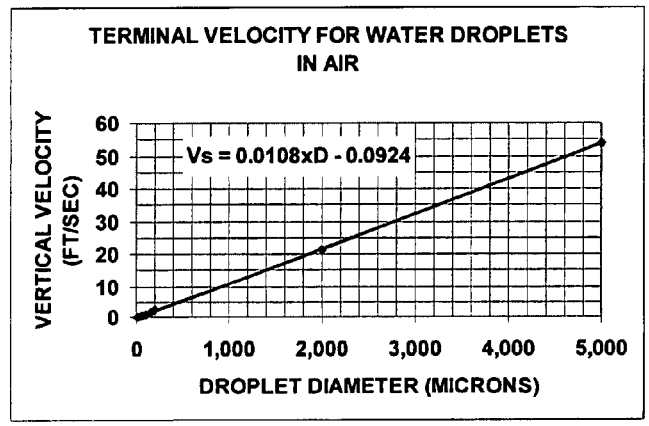

DESALINATION BY CONTINUOUS PROCESSING
CHILLED AIR CO-FLOWS WITH SPRAYED DROPLETS

FIGURE 19

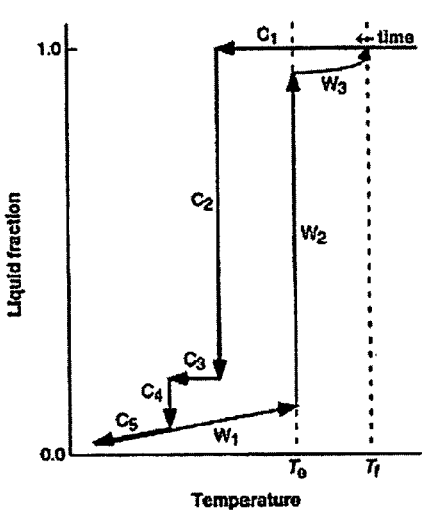

11230 *J. Phys. Chem. B, Vol. 106, No. 43, 2002*

FIGURE 20

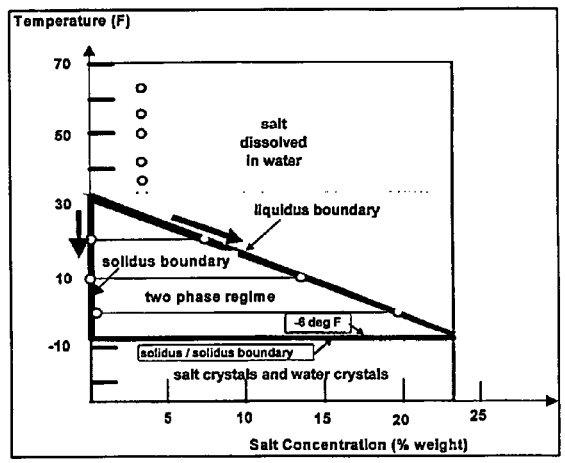

FIGURE 21

Biot Number

| 4000 | 4000 | 1000 | 1000 | microns radius | R |
|---|---|---|---|---|---|
| 0.01312 | 0.01312 | 0.00328 | 0.00328 | ft | R |
| 0.25 | 0.25 | 0.25 | 0.25 | BTU/(hr ft F) | k |
| 5 | 1 | 5 | 1 | BTU/(hr sq-ft F) | h |
| 0.2625 | 0.0525 | 0.0656 | 0.0131 | | Bi |
| 3.81 | 19.05 | 15.24 | 76.2 | | 1/Bi |

Fourier Number                                     alpha* t/R2

| 0.75 | 0.75 | 0.75 | 0.75 | sq ft/hr | alpha |
|---|---|---|---|---|---|
| 0.2 | 0.2 | 0.2 | 0.2 | sec | time |
| 0.00006 | 0.00006 | 0.00006 | 0.00006 | hr | time |
| 0.000172223 | 0.000172223 | 1.07639E-05 | 1.07639E-05 | sq ft | radius squared |
| 0.24 | 0.24 | 3.87 | 3.87 | | Fo |

| (Tc-Ti)/(Ts-Ti) | 0.9 | 0.95 | 0.4 | 0.8 | | |
|---|---|---|---|---|---|---|
| Ts | 40 | 40 | 40 | 40 | F | throughout sphere initially |
| Ti | -121 | -121 | -121 | -121 | F | sustained air temperature |
| Tc | 23.9 | 31.95 | -56.6 | 7.8 | F | sphere center |

FIGURE 22

Biot Number

| 4000 | 4000 | 1000 | 1000 | microns radius | R |
|---|---|---|---|---|---|
| 0.01312 | 0.01312 | 0.00328 | 0.00328 | ft | R |
| 0.25 | 0.25 | 0.25 | 0.25 | BTU/(hr ft F) | k |
| 5 | 1 | 5 | 1 | BTU/(hr sq-ft F) | h |
| 0.2625 | 0.0525 | 0.0656 | 0.0131 | | Bi |
| 3.81 | 19.05 | 15.24 | 76.2 | | 1/Bi |

Fourier Number                                     alpha* t/R2

| 0.75 | 0.75 | 0.75 | 0.75 | sq ft/hr | alpha |
|---|---|---|---|---|---|
| 2 | 2 | 2 | 2 | sec | time |
| 0.00056 | 0.00056 | 0.00056 | 0.00056 | hr | time |
| 0.000172 | 0.000172 | 1.08E-05 | 1.08E-05 | sq ft | radius squared |
| 2.42 | 2.42 | 38.71 | 38.71 | | Fo |

| (Tc-Ti)/(Ts-Ti) | 0.18 | 0.8 | 0.001 | 0.27 | | |
|---|---|---|---|---|---|---|
| Ts | 40 | 40 | 40 | 40 | F | throughout sphere initially |
| Ti | -121 | -121 | -121 | -121 | F | sustained air temperature |
| Tc | 92.02 | 7.8 | 120.839 | -77.53 | F | sphere center |

| water | Temp deg F | Density #/cu ft |
|---|---|---|
| liquid | 70 | 62.3053 |
| liquid | 32 | 62.41418 |
| ice | 32 | 57.24098 |
| ice | -6 | 57.43825 |

Biot Number = h R / k

| 4000 | 4000 | 200 | 200 | microns radius | R |
|---|---|---|---|---|---|
| 0.01312 | 0.01312 | 0.00066 | 0.00066 | ft | R |
| 0.25 | 0.25 | 0.25 | 0.25 | BTU/(hr ft F) | k |
| 50 | 1 | 50 | 1 | BTU/(hr sq-ft F) | h |
| 2.6247 | 0.0525 | 0.1312 | 0.0026 | | Bi |
| 0.381 | 19.05 | 7.62 | 381 | | 1/Bi |

**Fourier Number = diffusivity * time / radius-squared**  alpha* t/R2

| 0.75 | 0.75 | 0.75 | 0.75 | sq ft/hr | alpha |
|---|---|---|---|---|---|
| 0.2 | 0.2 | 0.2 | 0.2 | sec | time |
| 0.00006 | 0.00006 | 0.00006 | 0.00006 | hr | time |
| 0.000172 | 0.000172 | 4.31E-07 | 4.31E-07 | sq ft | radius squared |
| 0.24 | 0.24 | 96.77 | 96.77 | | Fo |

| (Tc-Ti)/(Ts-Ti) | 0.4 | 0.804951 | 0.001 | 0.999973 | | |
|---|---|---|---|---|---|---|
| Ts | 40 | 40 | 40 | 40 | F | throughout sphere initially |
| Ti | -121 | -121 | -121 | -121 | F | sustained air temperature |
| Tc | -56.6 | 8.597184 | -120.8 | 39.99563 | F | sphere center |

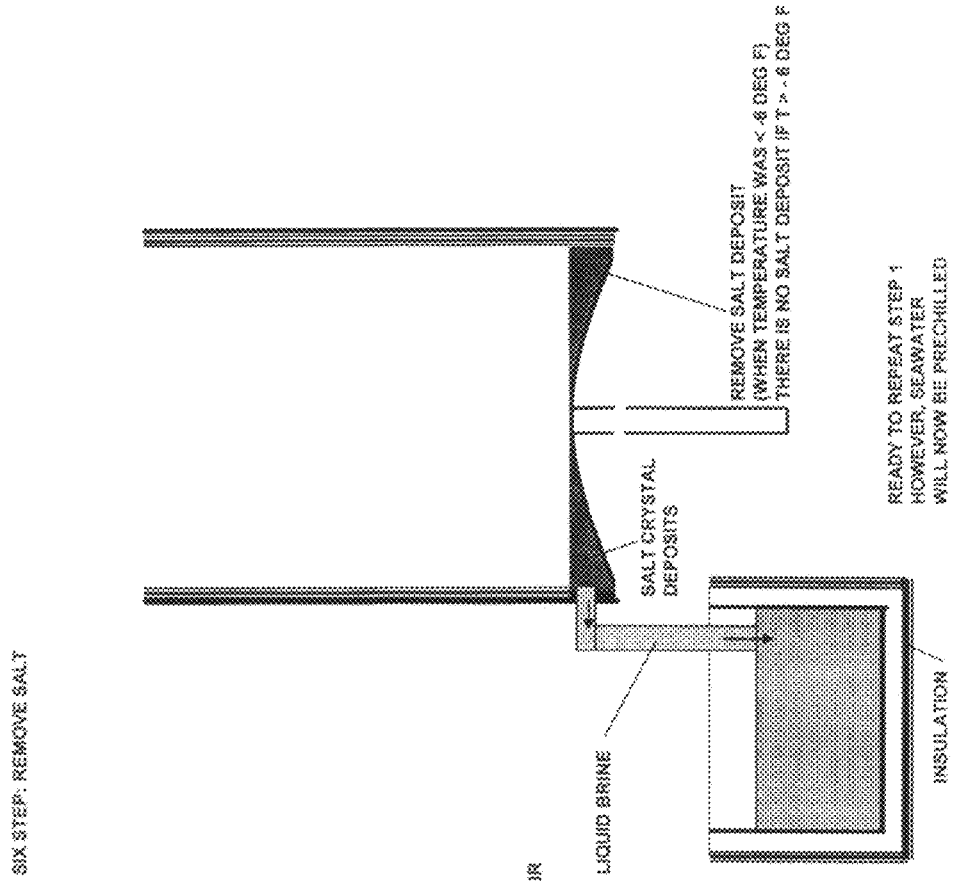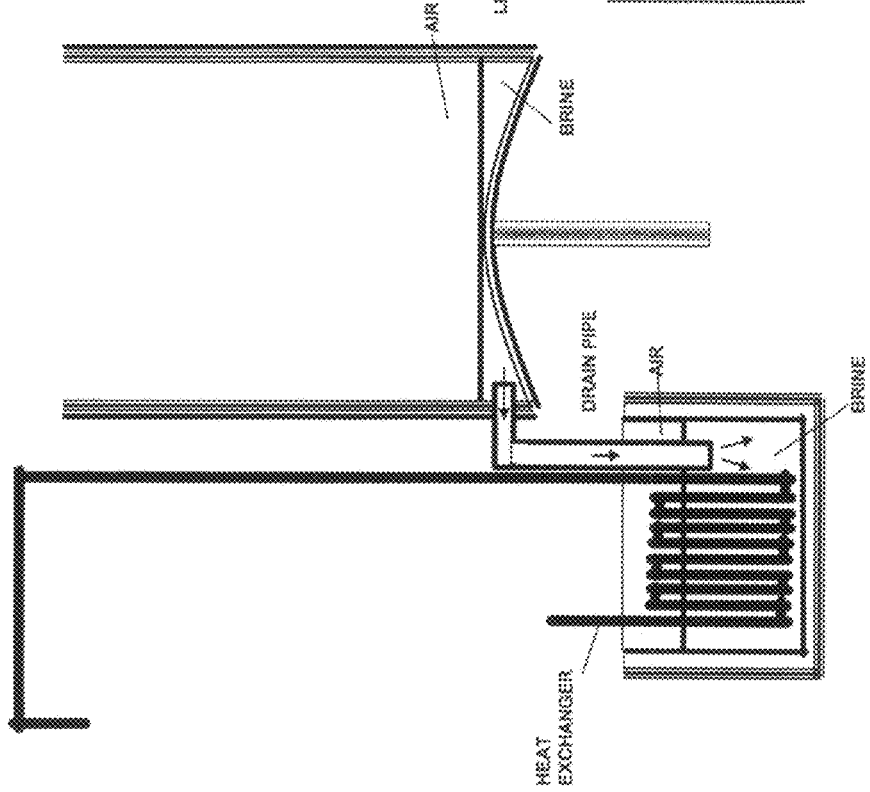

DESALINATION METHOD AND SYSTEM USING COMPRESSED AIR ENERGY SYSTEMS

RELATED APPLICATIONS

The present application claims the benefit of the filing dates of U.S. Non-provisional patent application Ser. No. 11/585,023, filed on Oct. 23, 2006, and U.S. Provisional Patent Application Ser. Nos. 60/832,777, filed Jul. 24, 2006; 60/794,190, filed Apr. 21, 2006; and 60/789,415, filed Apr. 5, 2006. All of these applications are incorporated herein by reference in their entirety.

FIELD OF THE INVENTION

The present invention relates to the field of desalination systems, and in particular, to a desalination system that uses compressed air energy that can be released and expanded to co-generate chilled air, which in turn, can be used to freeze water, and produce fresh drinking water.

BACKGROUND OF THE INVENTION

In the United States, where there is a broad range of climate zones, and an abundance of rain in many areas, there is typically an adequate supply of fresh drinking water available in most regions of the country. Even in areas where water supplies are scarce, efforts have been made to transport water from where it is available, to where it is needed. For example, a significant amount of water is currently being transported from the Colorado River, via the California Aqueduct, to heavily populated, but dry, regions of Southern California, so that sufficient water will be available, not only for drinking purposes, but also for agriculture and irrigation. Other means of supplying and transporting water, such as through a network of utilities and pipelines, including those from lakes, reservoirs, rivers, glaciers, etc., are also in existence.

Nevertheless, there are many geographical areas where it is not as convenient or possible to transport water to where it is needed, on a cost effective basis. These areas include far away regions in the mountains, faraway rural areas, and islands in the ocean, where it might be cost prohibitive to install long pipelines or aqueducts to transport water to those areas. There is also a need for fresh drinking water on board ships, such as those that go for extended periods of time, i.e., cruise lines, ocean liners, cargo ships, Navy fleet ships, etc. There are also other countries, such as where the climate is drier, or where the population is much larger than the availability of fresh drinking water can support. Ironically, many of these areas are located close to the ocean, or other salt water bodies, where seawater is available, but where the amount of fresh drinking water available may be insufficient to meet the demand.

Accordingly, desalination systems and methods to produce fresh drinking water from seawater have been developed in the past. The key to any desalination system is the ability to separate the contaminants, including salt and other impurities, from the base water, which, in turn, can produce fresh drinking water.

For purposes of simplicity, the term "seawater" will be used from this point on to refer to any contaminated water that needs to be purified, whether it is actually water from the sea, or brackish water, or any other water from any other source.

At least three different types of desalination systems are currently in use today, to varying degrees of success, which will now be discussed.

Thermal Method: A thermal method is one that uses heat or other means to convert the seawater into a water vapor, such as by boiling, leaving behind the contaminants in the residual base water. For example, one type of thermal method commonly used is called distillation, where seawater is progressively heated in subsequent vessels at lower pressures to produce a purified water vapor.

The thermal method called Multistage Flash Distillation is the most common desalination method currently being used world-wide. It involves heating the seawater to a high temperature and passing it through a series of vessels having decreasing pressures to produce water vapor. The heated water is passed to another vessel known as a "stage", where the surrounding pressure is lower than in the heater. The sudden introduction of solute and water into a lower pressure "stage" causes the solution to boil so rapidly that it flashed into steam (water vapor). The water vapor, by its very nature, consists of purified fresh water without the solutes, which can then be condensed, collected and used for drinking water. A similar process called Multi-Effect Distillation uses the same principles as the Multistage Flash Distillation, except that this method operates at lower temperatures. At lower pressure there is a lower temperature required to vaporize a given weight of water. There is also another distillation method called Vapor Compression Distillation which is generally used in combination with other processes, where the heat comes from the compression of vapor, rather than direct exchange of heat.

While these methods are highly successful and effective in being able to remove contaminants from the seawater, one of the most significant disadvantages of these methods is the high cost of operation, including the high cost of the energy needed to heat the seawater, and/or reduce the pressure, to boil it. Because of these costs, these methods are often used only when fresh drinking water is not available, or could not be made available at a lower cost.

Membrane Processes: A membrane process is one that uses a relatively thin permeable layer of material that allows either water or salt to pass through, which helps induce a separation between two differing concentrations. On one side of the membrane is typically located the water with the contaminants, and on the other side of the membrane is typically located the water that has been purified.

One of the most common types of membrane processes is reverse osmosis, which is a pressure driven process which forces saline water through a membrane, leaving salts behind on the other side. While reverse osmosis has been shown to be economical in terms of its relatively low energy consumption rate, the process typically has a significantly higher upfront investment cost compared to most thermal methods. There is also a relatively high cost associated with the replacement cost of membrane material, due to limited membrane life.

Another common membrane process is called Electrodialysis, which is a voltage driven process that uses an electric potential to move salts selectively through a membrane, leaving fresh water behind. This process has some of the same drawbacks as reverse osmosis, in that the upfront capital costs can be prohibitive.

Freeze Crystallization: Freeze crystallization is a process which takes advantage of the freezing process and the phase diagram of seawater to produce fresh drinking water. Essentially, seawater is subjected to cooling temperatures, such as via a refrigerant, which causes freezing to occur, wherein the freezing is used to help form solid ice crystals made from pure water, which can then be separated from the salt contaminants contained in the residual base water. This process and its potential has been investigated due to its higher efficiencies when compared to reverse osmosis, but the freeze process for desalination purposes has never been implemented successfully on a large scale.

The freeze crystallization process is different from the other processes, and typically involves the formation of ice crystals by freezing seawater, wherein the pure water ice crystals can be separated out of the base water. During the process, when pure ice crystals are formed by exposure to freezing temperatures, they are usually allowed to traverse to the top of a tank, under action of buoyancy, while the impurities are allowed to separate and sink by reason of a higher density. This way, it is possible to separate the pure ice water from the impurities, such as the salty brine and other minerals, wherein fresh drinking water can be produced.

In addition, the formation of ice crystals, in this respect, can be achieved in two different ways: 1) by direct cooling, and 2) indirect cooling.

Direct cooling involves using an inert cooling fluid or refrigerant that is physically injected into the seawater, i.e., bubbled through it, which causes the seawater to vaporize at the desired temperature. This is the result of the refrigerant heat of evaporation being drawn from the solution, which causes the seawater to cool down to the eutectic temperature. Although the intermixing of the refrigerant with the seawater makes this method efficient, an important drawback is that the refrigerant ends up getting disadvantageously intermixed with the ice. That is, ideally, the process would form distinct particles of pure water ice, but in this cooling method, some of the refrigerant, which is present throughout the equipment, ends up being trapped within the ice particles, and therefore, fresh drinking water, free of the refrigerant, cannot be produced with purity. Consequently, the direct cooling method has not been used in connection with the production of fresh drinking water.

A more common freezing desalination process is called indirect cooling. In this process, the refrigerant is not injected directly into the seawater, but rather, is introduced into a series of pipes or jackets that run through the seawater. The pipes and jackets are typically made of a material, like aluminum, with good heat conducting properties, and help keep the refrigerant and seawater separated during the process. The refrigerant preferably only passes through the inside of the pipes and jackets; the seawater, on the other hand, is only exposed to the exterior of the pipes and jackets, and not the refrigerant itself. This way, the seawater is cooled by direct contact with the pipes and jackets, and not direct contact with the refrigerant. This avoids the problems associated with the direct cooling method, although using pipes and jackets introduces an added level of resistance to the transfer of heat from the seawater to the refrigerant, which makes this method less efficient.

Once the pipes and jackets are cooled, and seawater is passed over them, ice crystals are formed on the exterior surface, and therefore, it becomes necessary to remove the ice from the surface physically, such as by using a scraper. Once the ice is physically removed, the lower density ice crystals that are released tend to float to the top of the higher density brine solution. This way, the ice crystals can be removed from the top, and washed clean of impurities, and then allowed to thaw and melt, wherein they produce purified drinking water. Thereafter, the salty brine mixture can be disposed.

The total surface area of contact that is needed for indirect cooling and the heat transfer coefficient are the key parameters of this process. These parameters relate to the effectiveness of the refrigerant in being able to cool and freeze the seawater solution around the refrigerant-containing pipe or jacket.

An example of an indirect cooling method in use currently is called a Scraped Surface Crystallizer, which consists of a cooled cylinder (evaporator) with a knife or scraper arrangement that is able to scrape ice crystals off of the cooled surface. Either the scraper moves over the cooled surface, or the cooled surface is moved across the scraper, to enable the ice to be scraped and removed. In either case, to avoid friction and damage to the surfaces, the system is typically designed so that there is a clearance or gap between the surfaces, which ultimately leaves behind a layer of ice on the cooling surface. This additional layer of ice on the cooling surface causes the entire system to be inefficient in its ability to transfer heat away from the cooling surface, to allow more ice to be formed on the surface, and causes a sharp decrease in heat flow through the cylinder, and a drop in its capacity. There is also the adhesion force that exists between the scraper and the cooling surface which requires the expenditure of energy to overcome, i.e., extra energy is needed to scrape the ice to remove it successfully, and this must be accomplished constantly over an extended period of time.

There have also been studies done involving freezing wastewater to determine how ice crystals form within a droplet. In studies by Dr. Wa Gao, discussed in her thesis entitled "Partial Freezing by Spraying as a Treatment Alternative of Selected Industrial Wastes," the effect of freezing temperatures on a single droplet of wastewater was studied, wherein a single droplet (at below freezing temperatures of fresh water of about minus 5 degrees C.), was exposed to an updraft of subfreezing air temperatures, i.e., between minus 5.5 degrees C. to minus 17.7 degrees C., in a chilled air vertical wind tunnel. The test was performed repeatedly for the same droplet size and droplet condition to obtain statistical information. She observed the freezing of each droplet began at the bottom edge of the droplet, and then enveloped the outer surface area of the droplet in 0.23 seconds. The wastewater froze inwardly as the ice shell thickened. The complete 2,800 micron droplet froze completely in a mean period of time, i.e., 7 seconds. In all cases the freezing was complete in 20 seconds. The solid ice portion of the droplet was formed with pure water, and the remaining liquid brine around it consisted of the concentrated wastewater. The ice spheres fragmented during the freezing process as the interior liquid brine was squeezed to the outside because of internal stresses in the ice as it squeezed the incompressible liquid. In another study, wastewater was sprayed outdoors in cold arctic winter weather to produce a large mound of ice particles directly on the ground. Although initial freezing took place while the droplets were in flight, additional freezing and separation occurred after the droplets landed on the ground. Once the mound was formed, it could then be melted during the spring, and used for irrigation purposes.

Because of the drawbacks of the existing desalination methods and systems discussed above, there is a need for a highly efficient and cost effective desalination method that allows fresh drinking water to be produced from seawater.

SUMMARY OF THE INVENTION

The present invention relates to the use of compressed air energy in conjunction with a water desalination system, wherein energy produced by the wind, or any other energy source, can be used to produce compressed air, and wherein when the compressed air is released and expanded, such as by the use of a turbo expander, it can produce dramatically chilled air, as a by-product, which in turn, can be used to freeze and desalinate seawater. That is, rather that using a refrigerant to reduce the temperature of the seawater for desalination purposes, as in the case of the freeze crystallization methods described above, the present invention uses clean chilled air, derived from releasing and expanding compressed air energy, directly mixed with the seawater droplets, to produce fresh frozen ice particles.

Overall, the approach is to abandon the reverse osmosis method of desalination, and use a freeze crystallization process that works at the atmospheric pressure and at the low heat of ice fusion, rather than at the atmospheric pressure and high heat of evaporation, as in the case of the Multistage Flash Distillation method.

The approach generally comprises the following steps:

1. Producing a volumetric flow of chilled air at temperatures as low as minus 175 degrees F. at slightly above one atmosphere of pressure, and introducing this chilled air into an insulated mixing chamber. This chilled air can be accomplished by expanding the compressed air, which is produced by a compressor, through a turbo expander to produce chilled air directly, or through a turbo expander and generator that produces electricity and chilled air as a by-product.
2. Producing a volumetric flow of seawater which can be sprayed as a droplet cloud into the chamber and mixed with the chilled air to cause the temperature of the seawater droplets to be reduced to at or slightly warmer than the eutectic temperature, which for regular seawater is about minus 6.2 degrees F.
3. As the seawater droplets begin to mix with the chilled air, and freeze, due to heat exchange, pure water ice crystals begin to form, which begin to separate from the salty brine solution. Over time, i.e., less than a few seconds, the frozen ice particles begin to fall to the bottom of the chamber, where due to heat exchange the temperature of the air is warmer, and wherein the air and the growing deposit of ice particles at the bottom eventually reach an equilibrium temperature that is preferably just above the eutectic temperature. Then, the lower density ice particles begin to float and coalesce on top of the higher density salty brine solution that collects at the bottom, and form an ice/snow mass that continues to enlarge and float on top of the salty brine solution, wherein any higher density salt brine continues to separate from the ice particles and runoff down the sides of and through the channels and voids that exist in the ice/snow mass. A fresh water wash column involving a spray of water can be used to help facilitate the runoff of the brine from the ice/snow mass to help clean the ice mass further. Note: The density of the brine may be between 1.35 gm/cc when concentrated and 1.025 gm/cc in seawater; whereas the density of pure water is 1 gm/cc; the density of fresh water ice is 0.917 gm/cc; and the density of snow is less than 0.1 gm/cc. Thus the high density brine flows out between the pores in the ice/snow mass and over the interstices between the ice fragments.
4. At the end of the cycle, which is after the ice/snow mass is formed, the ice/snow mass is preferably removed, and then allowed to thaw and melt, wherein purified drinking water can be produced. The salty brine solution becomes more dense and salty over time, and is removed from the chamber, along with any salt solids that are formed, so that the process can begin again. The deposited salt and other minerals can be saved for later industrial use or must be properly handled when disposed.

The present invention preferably contemplates using the expansion of compressed air as the source of freezing temperatures to freeze and desalinate seawater. There are at least three different methods of producing chilled air contemplated, as follows: (1) a compressed air energy storage system having a compressor and a large high pressure storage tank, wherein a turbo expander is used to release and expand the compressed air when it is needed, wherein the energy produced is converted into chilled air and/or electrical energy, (2) a turbo expander having the dual capacity to generate electricity and chilled air, wherein the electricity generating capability is preferably replaced by a supplemental compressor capability that uses the turbo expander work to replenish the discharged compressed air in an associated surge tank, and (3) a turbo expander having the capacity to produce chilled air without having to store the energy first. In each case, the chilled air is injected into the mixing chamber to provide cooling for the seawater that is injected into the chamber.

The present invention preferably comprises a desalination system that can be performed in batches, inside a mixing chamber, wherein a mass of ice/snow made of fresh water is formed, and then removed from the chamber, and allowed to melt, to form pure water. To form each batch, the seawater and chilled air in the chamber must be properly mixed, and therefore, the seawater is preferably pressurized and passed through an array of nozzles, to form a spray of droplets, or cloud. By injecting the chilled air into the mixing chamber so that the sprayed seawater droplets is exposed and circulated with the chilled air, ice crystals will begin to form within each droplet. The volumetric size of each seawater droplet and the temperature of the seawater and chilled air fed into the chamber are preferably carefully predetermined, as well as the overall size and configuration of the chamber. Also preferably predetermined is the manner in which the seawater spray and chilled air are injected into the chamber, and mixed, to ensure that the resultant mixture quickly reaches the optimum temperature for freezing and desalination.

Typically, in connection with a seawater droplet, the freezing occurs from the outside to the inside, but over time, the ice structure that is formed forces the saltwater brine to the outside, i.e., brine rejection. It has also been observed that the ice shell around the concentrated brine core develops internal stresses and the ice shell fragments and forces the concentrated liquid brine to the outside of the ice shell. The agglomeration of ice crystals, which forces brine away, eventually forms an overall structure that has the ice crystal as a monolith, which in turn, is coated with brine. When these coated ice crystals impinge on each other, the brine solution is forced to surround the newly formed ice crystal composite. This process continues until there is a complete separation of a macrostructure of ice surrounded by brine. At the bottom of the chamber, the final ice mass that forms appears like porous snow that permits gravity drainage of the brine. As will be discussed, additional fresh water can be added to further release any brine attached to the ice. And, the fresh water that performs this function of freezing and releasing more brine can be recovered again for reuse.

The direction of the seawater spray and chilled air being introduced into the chamber can contribute to the proper formation of the ice crystals and therefore the ice mass. In this respect, the present invention contemplates both a 1) counter-flow and 2) co-flow arrangement. The factors that determine which to use depends on how quickly the seawater needs to be frozen, which is dependent on how cold the seawater is before it enters the chamber, how cold the chilled air is, the size of the chamber, how the seawater droplets are exposed to and circulate with the chilled air, and the amount of each that is being introduced, etc.

In the counter flow embodiment, the system preferably has a chamber that sprays droplets of seawater downward into the chamber, and which enables chilled air from the turbo expander to be blown upward against the falling droplets, thereby causing the seawater droplets to circulate and freeze, and then fall to the bottom of the chamber. This is referred to as a counter flow process because the seawater spray and chilled air flow in opposite directions to increase the residence time of the droplets in the chamber. In another embodiment, the system preferably has at least one spray nozzle that sprays droplets of seawater downward into the chamber, but which enables chilled air from the turbo expander to be blown downward in the same direction as the falling droplets. This is referred to as a co-flow process because the seawater spray and chilled air flow in the same direction to permit the coldest air to act on the incoming droplet at the greatest heat transfer rate.

In another aspect, the chamber walls are preferably heated with the indrawn warm seawater and/or heat from the compressed air to keep the ice from collecting on the walls, and the ice mass from sticking thereto. When indrawn seawater is passed through the chamber walls, the heat exchange that occurs preferably helps to pre-cool the seawater before it is sprayed into the chamber. Preferably, the seawater is piped through tubes or cavities that wrap around the crystallization chamber, such that the seawater is pre-cooled to near freezing temperatures even before it enters the chamber. That is, the super chilled air that is introduced into the chamber will have the effect of cooling the chamber walls, so that by wrapping the tubes or cavities around the walls, and running the seawater through the tubes or cavities, they will act as a heat exchanger, to enable the seawater to become pre-chilled. This way, the seawater, once it enters the crystallization chamber, will freeze more quickly, and will drop down to the bottom, where it will continue to freeze and solidify. Preferably, this way, the temperature of the seawater even before it enters into the chamber will be close to freezing or even slightly colder than the freezing point of distilled water (0° C. or 32° F.).

Waste heat from the compressors can also be used for a similar effect. That is, around the crystallization chamber, it is desirable to prevent ice particles from sticking to, and collecting on, the chamber walls, and therefore, one way to use the waste heat is to distribute the heated compressed air, or warm water produced by the waste heat, within tubes or cavities extending around the crystallization chamber. In this respect, preferably, the tubes or cavities can wrap around the chamber, which is where the ice particles are likely to accumulate. Because this acts as a heat exchanger, when heated air from the compressor is passed through the chamber walls, the compressed air is preferably pre-cooled before it is sent to the turbo expander and expanded to produce the chilled air. Therefore, the air that is released by the turbo expander can be made even colder.

Desalination occurs because the seawater is chilled to near its eutectic temperature (about minus 6 degrees F.), and separates into solid ice (frozen fresh water) and liquid brine (highly concentrated salt solute in water solvent), where the formation of the ice crystal forces the saltwater out of its structure and then there is a further separation induced by the strong difference in density at the bottom of the chamber. In this respect, the freezing of the seawater preferably occurs in three stages: (1) chilling of the filtered seawater pumped through tubes or cavities surrounding the chilled crystallization walls (strong chilling effect), (2) chilling of the seawater droplets during their flight through the chilled air in the chamber (short residence time with chilling of the droplet), and (3) chilling of the semi-frozen droplet after it has deposited at the bottom of the chamber to form an ice mass (longest residence time).

During the downward flight of the droplet through the chilled air, the droplet begins to get colder progressively inward toward its center, and eventually, ice crystals will begin to form within the shell of the droplet. In one example, the droplets that are greater than 4,000-microns in diameter may have an interior core portion that is not yet frozen, and droplets that are less than 200 microns in diameter may be completely frozen through to its center.

It has been observed that even if all droplets are the same size, some will freeze late and some will freeze early because of the process of how ice forms around a microscopic nuclei that varies in number and size, in each droplet of the same size. Note that droplets above 8,000 microns in diameter tend to shatter in a relative wind and break up into small droplets. Thus the ice layer around a large droplet (defined as 4,000 microns in diameter or more) will fragment during the growing thickness of the ice layer around the liquid core. In experiments using chilled air at minus 17 degrees C., and chilled seawater droplets at plus 5 degrees C., and with suspended piggery wastewater droplets having 4,200, 3,400 and 2,800 microns in diameter, it was found that the complete droplet was nearly frozen in the mean time of 7 seconds for pH=7.1 (neutral), and 7.5 seconds for pH=11 (alkaline limit is pH=14), whereas there was about 2.5 seconds residence time in flight. Thus much of the freezing can occur after deposition of the droplet at the bottom of the crystallization chamber. The surface shell of the droplets froze in much less time, i.e., as low as 0.23 seconds.

It is important for the droplets to freeze to form a two-phase solution of solid ice particles and liquid brine, so it is desirable for the droplets to reach at or near the eutectic temperature while in flight. On the other hand, if the droplets become too cold (colder than the eutectic temperature) as they fall through the chamber, the fresh water within each droplet could freeze together with the solid salt crystals and solid brine, in which case, it may not be possible to separate the salt from the fresh water. This can happen, for example, when the seawater spray consists of varied droplet sizes, wherein the smaller droplets may reach below the eutectic temperature and completely freeze by the time they reach the bottom of the chamber. In this respect, consider that the spray nozzle that is designed to disperse a cloud of mean size close to 4,000 microns in diameter will also generate a smaller fraction of mass flow but a huge number of droplets in the range of 400 microns in diameter. These smaller particles have a ten-fold smaller settling velocity and will have a ten-fold longer residence time. Furthermore, these smaller particles will freeze faster and to temperatures far below the eutectic temperatures when they interact with the minus 135 deg F. or minus 175 deg F. local air stream exiting the nozzles in the co-low configuration.

Therefore, the small droplets in downward flight through this extremely cold temperature regime will indeed cause undesirable crystallization of the droplet into one solid particle composed of (1) Solid ice of fresh water, (2) Solid salt with each salt molecule bound to two water molecules with attached water molecules, and (3) Solid salt crystals. During the flight of the small particle in the cold air there is no separation of the brine from the fresh water. However, as will be discussed, the separation will occur when the droplet deposits on the mass of accumulated ice particles created from the large droplets at the bottom of the chamber, which preferably has an equilibrium temperature that is warmer than the eutectic temperature.

The very small particle on the order of a few hundred microns in diameter may freeze completely through to their centers when exposed to air temperatures far colder than the eutectic temperature, in the regime close to the spray nozzle. When these small droplets deposit on the warmer ice/snow mass at the bottom of the crystallization chamber, they are preferably warmed to about the equilibrium temperature of slightly warmer than the eutectic point. Thus if the small droplets undergo freezing to below the eutectic temperature, they can thaw back up to above the eutectic temperature. At that point, the usual separation of the solid porous snow/ice structure and the liquid salt solution (brine) will occur. Even though typical nozzles spray larger diameter particles, there will always be smaller particles, including a distribution of particle sizes within a certain range. The smaller particles are likely to be large in numbers, but will not contribute to a very large mass overall.

In this respect, it has been found that it is desirable for the ice mass at the bottom of the chamber to remain at slightly higher (warmer) than the eutectic temperature, such that any remaining salt brine surrounding each ice particle will drain and runoff down the sides of the ice mass, or through voids or channels formed in the ice/snow mass, rather than being frozen and trapped inside the ice. Accordingly, it is important to control the temperature of the chilled air inside the chamber to obtain optimum results, as well as to allow enough time for the salt brine to runoff, before the ice mass is removed from the chamber. In some cases, there may be some droplets that will have been deposited during the last few seconds of a cycle that will not have had sufficient time to permit the brine runoff. This is a small fraction that will contribute to the very small amount of impurities in the final potable water.

The freezing of the seawater preferably enables buoyant pure water ice particles to be formed, with trace amounts of salty brine adhering thereto, with the objective being to leave behind the salt and other impurities in the salty brine, at the bottom of the chamber. The desalination system preferably removes the ice particles from the salty brine, which is denser than the ice particles, so that gravity can help separate the brine from the ice particles, and clean the ice particles, in one of at least two ways.

First, the ice particles can form an ice/snow mass, by allowing the ice particles to accumulate at the bottom of the chamber, i.e., as they fall on top of each other. Over time, as the ice particles fall, and they stick together, they will collectively form an ice mass, which will tend to float on top of the salty brine, where the liquid brine is denser than the solid ice. In this respect, the system is preferably adapted so that ice particles will form a conical shape ice mass, by introducing seawater droplets into the center of the chamber, wherein the ice particles formed thereby will also accumulate in the center of the chamber. The seawater spray is preferably directed toward the centerline of the chamber, so that the ice particles do not collect on the walls, and so that the ice mass that forms at the bottom of the chamber tends to form in the center of the chamber, i.e., in the shape of an inverted cone. On one hand, this advantageously enables the salty brine that encapsulates or adheres to each pure water ice particle to run down the sides, rather than being trapped inside the ice mass i.e., in pockets or crevices that might otherwise form on the mass as it solidifies. By forming a cone shaped ice mass, the brine that adheres to each ice particle will simply run off down the sides, rather than being trapped, so that the salty brine can be effectively separated from the ice mass as needed. On the other hand, studies have shown that the ice mass that forms may form channels and voids throughout so that any accumulated salt brine could simply pass through the mass, via the channels and voids, without being trapped. The ice mass, in this respect, looks more like snow, and is porous, to allow the brine to pass through.

In addition to ice formation in flight, especially at extremely cold temperatures, there is another mechanism that creates a porous mass at the bottom of the crystallization chamber. Consider the ideal case of hard spherical droplets collecting at the bottom of the chamber. In the most dense packing configuration, the highest density is the ratio of the volumes of the sphere compared to the cube of air that surrounds it, or $[4/3*pi*r^3]/[8r^3]$ or 0.52 gm/cc. It is expected that the true density will fall between this ideal value and the density of snow, which is 0.10 gm/cc. This provides sufficient porosity for the liquid brine to find an open passage to the bottom of the collected mass. Once the dense liquid brine starts flowing, the ice particles buoy further apart, and the brine drains faster.

The embodiment also preferably has means for rinsing the ice mass with fresh water, the fresh water freezing onto the accumulated frozen mass of ice/snow and releasing the attached brine layer as more and more droplets are deposited. For further removal of the brine that attaches itself to the surface of each ice particle, there is preferably an injection of fresh water on the layer of ice/brine deposited at the bottom of the chamber to assist the gravity drainage of the salty brine on a layer-by-layer basis. This fresh water freezes as it attaches to each layer and further displaces the very thin viscous salty brine layer from the interstices between the ice particles. The fresh water that is frozen on the ice particles is later thawed and preferably recovered for re-use without the use of additional fresh water. If even higher purity water is required, a downstream wash column can be added. In this respect, additional fresh water at room temperature, such as at 60 degrees F., can be sprayed down onto the ice mass to help remove the salty brine from the ice mass as the mass forms. The majority of the salt brine is displaced from the spaces between the ice particles by gravity flow. The salty brine is preferably drained out of the bottom of the chamber, through a drain.

The bottom section of the chamber preferably comprises a perforated basket, which is able to catch the falling ice particles, to form the ice mass thereon, but which allows the chilled air to circulate out of the chamber. In this respect, the side walls of chamber preferably has an exit port through which the excess chilled air can flow out of the chamber, wherein the chilled air can then be distributed to the air conditioning system and used as chilled air. Other means (other than the perforated basket) for removing the ice/snow mass, such as pistons, and pincers, are also possible. The ice particles that form at the bottom of the basket preferably from a large ice mass, or, in some cases, a slurry, wherein the perforations in the basket allow the salty brine to pass through, leaving behind the pure water ice particles in the basket. Then, by removing the basket, the pure water ice mass and/or slurry can be removed from the chamber.

The mass of ice particles which is removed can then be melted, to produce fresh water at the bottom of a holding tank. Fresh water at relatively warm temperatures, in this case, at plus 60 degrees F., can be sprayed down like a wash column onto the ice particles, to rinse the ice, and cause the ice to melt. Alternatively, or in conjunction with the rinse water, local warm air can be brought into the holding tank, to further assist in melting the ice particles. As the ice melts, the fresh water droplets can pass through the perforations in the basket, and collect at the bottom of the holding tank, in the form of chilled fresh drinking water. More than one basket can be used so that the desalination and melting processes do not need to be interrupted while removing each basket from the chamber. Other means of removing and melting the ice mass, such as using a drop down door, that allows the ice mass to drop onto a conveyor, so that it can be moved to where it can more easily be melted, can also be provided.

Because the ice mass is made of ice, and therefore, is cold, the fresh water that is produced when it melts will be chilled water. From there, the fresh chilled water can be distributed for drinking purposes, or used for other purposes, such as being stored for later use by the air conditioning system, or re-circulated back to the crystallization chamber to be used as the spray for the wash column, or spray in the holding tank.

BRIEF DESCRIPTION OF THE DRAWINGS

FIGS. 3a and 3b are data sheets relating to the secondary compressor and the heat exchangers that are used to keep the chilled air cool.

FIG. 7 shows a standard composition of seawater, including the weight percent and eutectic temperature for each component.

FIG. 8 shows the requirements for clean drinking water.

FIG. 9 shows temperature regimes for water droplet phases.

FIG. 10 shows characteristics of spray nozzles.

FIG. 11 shows a range of droplet sizes that are possible by nozzle type.

FIG. 12 shows a chart of water droplet temperature and residence time, within a cold air stream (1 k and 2 k micron).

FIG. 13 shows the terminal velocity for water droplets in air.

FIG. 19 shows a possible evolution of the liquid fraction during a cooling and warming cycle of a salt solution.

FIG. 20 shows an equilibrium phase diagram for a salt water solution at below the eutectic concentration of 23.3%.

FIG. 21 shows a chart of centerline water droplet temperatures with a residence time of 0.2 seconds (1 k and 4 k micron).

FIG. 22 shows a chart of centerline water droplet temperatures with a residence time of 2.0 seconds (1 k and 4 k micron).

FIG. 29 shows a section view of the main chamber after completion of the cycle, wherein the remaining cold salt brine at the bottom of the chamber is introduced into a heat exchanger which helps to pre-cool the incoming seawater that is introduced into the chamber.

FIG. 30 shows a section view of the main chamber after completion of the cycle, wherein the remaining solid salt deposits are removed using a hydraulic lift.

DETAILED DESCRIPTION OF THE INVENTION

The freeze crystallization method of desalinating water discussed above requires a cooling system to freeze the seawater which is needed to separate the pure water from the impurities in the seawater. The present invention uniquely incorporates the use of compressed air energy technology as a means of co-producing chilled air as a by-product, wherein a turbo expander can be used to release and expand compressed air energy, to produce a suitable amount of chilled air for desalination purposes.

A. Compressed Air Energy Systems:

The present invention preferably contemplates using one of at least three different methods of producing chilled air, including (1) a compressed air energy storage system having a compressor and a large high pressure storage tank, wherein a turbo expander is used to release and expand the compressed air energy when it is needed, wherein the energy can be converted into chilled air and/or electrical energy, (2) a turbo expander having the dual capacity to generate electricity and chilled air, wherein the electricity generating capability is preferably replaced by a supplemental compressor capability that uses the turbo expander work to replenish the discharged compressed air in an associated surge tank, and (3) a turbo expander having the capacity to produce chilled air without having to store the energy first. Each of these systems will now be discussed.

Figure 1:
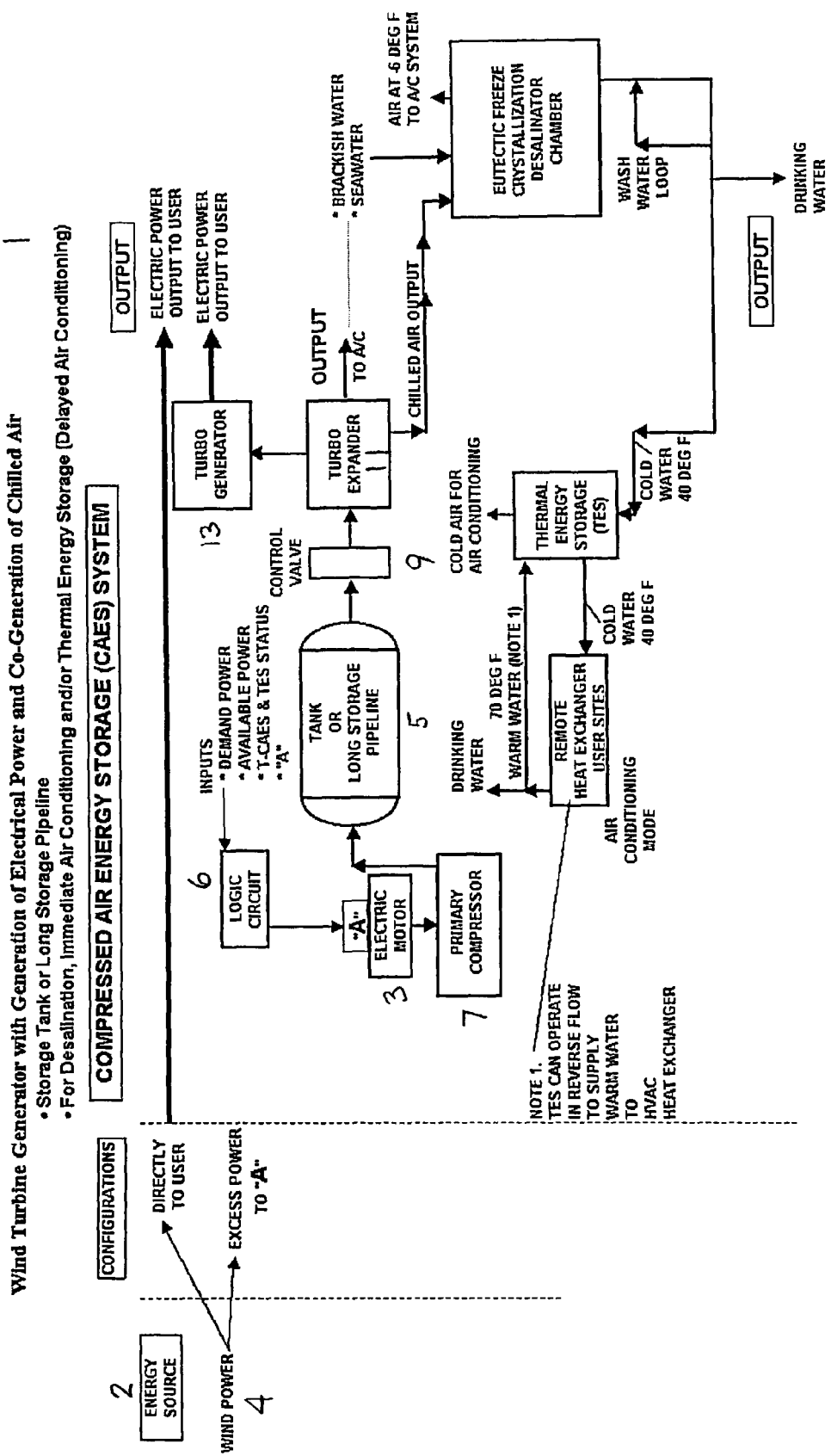
FIG. 1 is a schematic drawing showing a compressed air energy storage tank version of the desalination system of the present invention, wherein wind power or other energy source is used to co-generate chilled air for desalination purposes.

1. Compressed Air Energy Storage Tank System:

This embodiment, as shown in FIG. 1, preferably comprises a compressed air energy storage system 1, with an electric motor 3, primary compressor 7, storage tank 5, a control valve 9, turbo expander 11 and turbo generator 13 for generating electricity. In FIG. 1, "A" designates the route whereby electrical energy is transmitted from energy source 2, which can be a wind turbine 4, wind farm, diesel engine, power generator, or any conventional source of energy, such as a geothermal power generation plant, nuclear power plant, fossil fuel power generation plant, or the power grid, to electric motor 3. Some of these power sources often generate power in excess of power demand. The excess power would be stored in the form of compressed air. When electric power is recovered from the compressed air to fill power demand, the co-generated super chilled air would be used for desalination. The motor 3 preferably drives the primary compressor 7, to compress air that is then stored in storage tank 5.

The compressed air energy can preferably be stored in tank 5 for an extended period of time, until the energy is needed. Then, at the appropriate time, the control valve 9 can be used to release the compressed air so that it can be expanded by turbo expander 11. At this point, if desired, and particularly when electrical energy is needed, the waste heat generated by the primary compressor 7 can be circulated to turbo expander 11, to reduce and offset the effect of super cold temperatures. However, when chilled air is desired, as would be the case whenever desalination is desired, it would be beneficial not to use any waste heat, since heat would simply increase the temperature of the chilled air. At the same time, the waste heat can be used to regulate the temperature of the chilled air, if precise temperatures are desired.

One of the outputs that can be produced by this system 1 is in the form of electricity, which can be generated directly by turbo generator 13, as the compressed air is released from tank 5 by turbo expander 11, to create a high velocity air flow. Another output that is produced is in the form of chilled air, which is co-produced as a by-product as the compressed air from tank 5 is released and expanded by turbo expander 11. In either case, the present system 1 is preferably adapted so that these outputs can be generated at the same time, i.e., the compressed air can generate 1) electricity using turbo generator 13, 2) chilled air using turbo expander 11, or 3) both electricity and chilled air, as dictated by the needs of the system.

High-pressure storage tank 5 is preferably provided and designed to withstand the high pressures likely to be generated by primary compressor 7, and insulated to maintain a consistent temperature in the tank. Tank 5 can also be in the form of a pipeline or other container for holding pressurized air, as described in more detail in U.S. application Ser. No. 11/585,023, filed on Oct. 23, 2006, which is incorporated herein by reference. The term "tank" will be used to include pipes and other compressed air storage mediums, and in this respect, the pipeline discussed in Applicants' U.S. provisional application Nos. 60/763,577, filed Jan. 31, 2006, and 60/834,232, filed Jul. 28, 2006, as well as U.S. non-provisional application Ser. No. 11/407,733, filed Apr. 20, 2006, which are incorporated herein by reference, can be used. Tank 5 is also preferably located in proximity to compressor 7, and turbo expander 11, such that compressed air can be conveyed to tank 5, and then circulated to turbo expander 11, without significant pressure loss. Although the present invention contemplates that various size tanks can be used, the present system preferably contemplates that the size of the tank should be based on the needs of the system, the size of the facility or demand, the cost of the system, etc., as necessary to provide a sufficient amount of compressed air energy for storage. When there is insufficient room for a tank, or when a specific application is considered, the surge tank or tank-less versions, to be discussed, can be used.

The present invention contemplates that any conventional means of releasing air and converting the compressed air into electrical energy and/or chilled air can be used. In the preferred embodiment, one or more turbo expanders 11 are used to release the compressed air and create a high velocity airflow that can be used to power a turbo generator 13 to create electrical energy. This electricity can then be used to supplement the electrical energy supplied directly by the energy source, as needed, or to drive a supplemental compressor, which can produce additional compressed air that can be recycled and stored in tank 5. In these embodiments, turbo expander 11 preferably feeds energy to an alternator, which is connected to an AC to DC converter, followed by a DC to AC inverter and then followed by a power conditioner to match impedances to the user circuits. This chain of devices assures that the variable frequency inputs result in the required constant frequency output.

Optionally, when desalination is not required, one or more means for providing heat to the compressed air energy system 1 can be provided to boost the generation of electricity by turbo generator 13. The present invention contemplates that at least three different types of heating systems can be used as a means of providing heat, including 1) solar thermal collectors to utilize energy from the sun, 2) waste heat collectors to circulate the waste heat generated by the compressors, and 3) a separate heating unit, such as a fossil fuel burner, to introduce heat to the system. In this system, because it is normally desirable to generate chilled air as a by-product for cooling or desalination purposes, the waste heat and other heating systems are generally used only when electricity is being generated by turbo generator 13, and, when little or no chilled air is needed or being utilized for cooling or desalination purposes.

The present invention preferably takes advantage of the chilled air being generated by turbo expander 11, for additional secondary purposes, such as water desalination and air conditioning, which increases the efficiency of the system. For example, in addition to using the chilled air for purposes of producing direct cooling for air conditioners, and/or rerouted through pipes to the compressors, to keep the compressors cool, in the preferred embodiment, the chilled air is used to provide cooling for a desalination system. The exit chilled air from desalination can also be used for air conditioning systems and the like.

Logic circuit 6 preferably comprises a control system to control the operation of storage tank 5, compressor 7, turbo expander 11, turbo generator 13, heating units, refrigeration components, etc. One primary function of the control system is to direct the power immediately to the customer and bypass the compressor, if desired. In such case, only when there is excess power available from the power source that the customer cannot use is the power sent to the compressor. On the other hand, when there is no power available from the power plant, but the customer needs power, the compressed air can be released to supply the required power deficit. In those circumstances where there is a deficit in required power, and the storage tank is below the required minimum power, it may be necessary to turn on the emergency power. The control system is preferably designed to be able to maintain the level of compressed air energy in tank 5 at an appropriate level, by regulating the flow of compressed air into and out of tank 5. The control system preferably has a microprocessor that is pre-programmed so that the system can be run automatically.

A typical 500 kilowatt turbo expander 11 or other conventional expander can be used in connection with storage tank 5 that stores compressed air produced by compressor 7. The exhaust air associated with the work performed by the expansion of the compressed air in tank 5 can generate extremely cold air, which is then used for desalination purposes. In this example, the turbo expander 11 preferably enables an input of compressed air at a pressure of about 200-psia and 70 degrees F. (input entropy=1.4552 BTU/#–°R) and an output pressure of 14.67-psia which will isentropically expand to about minus 210 degrees F. (output entropy=1.4552 BTU/#–°R). If the thermodynamic efficiency of the expansion is only 79% because of the excessively large pressure drop across the turbo expander, the discharge temperature will be about minus 152.7 degrees F.

Similarly, a 500 kilowatt turbo expander with a compressed-air input pressure of 200-psia and 70 degrees F. (input entropy=1.4552 BTU/#–°R) and an output at a higher pressure of 30-psia will isentropically expand to minus 153.2 degrees F. (output entropy=1.4552 BTU/#–°R). If the thermodynamic efficiency of the expansion over a smaller pressure ratio is 85%, the discharge temperature will be about minus 120.6 degrees F.

In either case, consideration was given to the thermodynamics of the storage tank and its effect on the air temperature. The air pressure within the storage tank will drop as air is being withdrawn from the storage tank. The air temperature within the storage tank would be expected to drop near-adiabatically to temperature levels that are not acceptable as input for the efficient operation of the turbo expander. However, the storage tank, because of its thick steel wall needed to accommodate the high air pressure, also acts as a thermal storage, wherein the steel tank walls retain sufficient heat, even at an initial temperature of 70 degrees F., to keep the residual air temperature within the tank from dropping significantly. Thus, as the air temperature within the tank starts to drop, the sensible heat within the tank walls begins to flow in the direction of the negative temperature gradient between the steel wall and the inside air. The net result is that the residual air within the tank shows only a moderate temperature drop that is acceptable by the turbo expander.

Figures 5, 6:
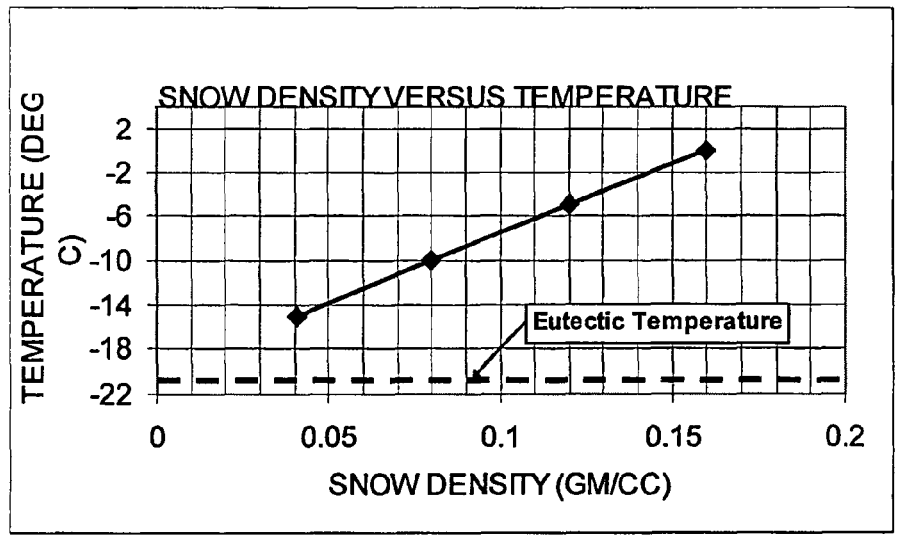
FIG. 5 shows the thermodynamics of a 500 kW turbo expander.
FIG. 6 shows a snow porosity chart showing the density of snow compared to air temperature.

The thermodynamic power of 510 kW (thermal) will likely produce 450 kW (electric) because of the 2% gear friction loss and 10% energy loss during conversion by the electric generator. The thermodynamics of a 500 kW turbo expander is shown in FIG. 5.

In either case, it can be seen that the exhaust air from the turbo expander 11 exhibits extremely low temperatures suitable for desalination purposes. Such low temperatures, having very high cooling/freezing potential, can be very useful for seawater desalination, when using a modified form of the Eutectic Freeze Crystallization (EFC) method discussed below.

Figure 2:
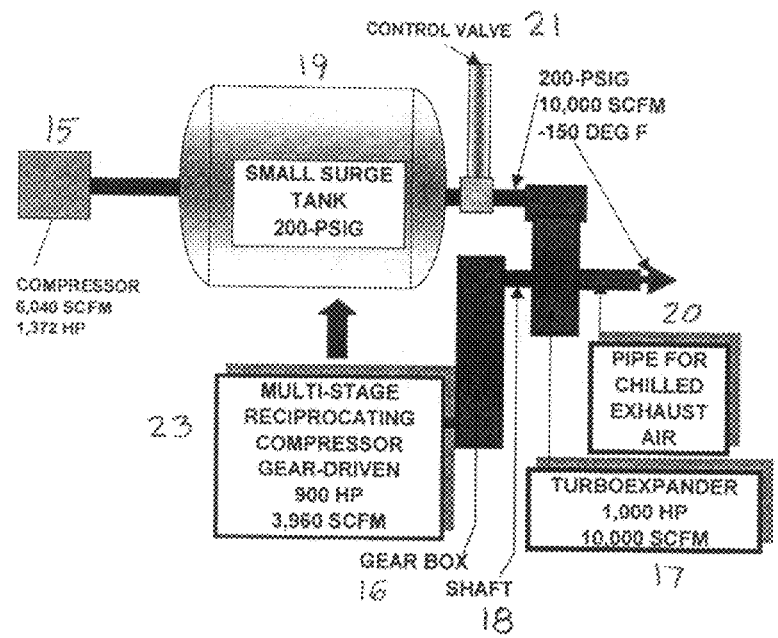
FIG. 2 is a schematic drawing showing the surge tank version of the compressed air energy system of the present invention.

2. Surge Tank Compressed Air Energy System:

Another compressed air energy system is shown in FIG. 2. FIG. 2 shows details of a compressor 15 and turbo expander 17 of an embodiment in which there is only a small surge tank 19, rather than a large storage tank. In this system, energy from the source can be used to drive compressor 15, wherein the compressed air is channeled into surge tank 19, and a control valve 21 is provided to control the extent to which the compressed air is released to turbo expander 17. As can be seen in FIG. 2, preferably, the pressurized and expanded output air from the turbo expander 17 is channeled in two different ways. First, the co-produced chilled air from the turbo expander 17 can be channeled through a pipe 20 and then distributed to the desalination system, as will be discussed, or other cooling function. Second, additional energy from the turbo expander 17 can be cycled back, via a shaft 18, to a gear box 16, which in turn, enables a multi stage reciprocating compressor 23 to produce additional compressed air energy, which can be cycled back into surge tank 19, to replenish the discharged compressed air therein. This way, any extra energy produced by turbo expander 17, which is not used in the form of chilled air, can be cycled back to produce more compressed air, which in turn, can be used to produce more chilled air and/or electricity.

The local atmospheric air is preferably compressed by the reciprocating compressor 23 at a flow rate consistent with the backpressure of the stored air in surge tank 19. There is therefore preferably a positive inflow of air from the first compressor 15 that combines with the positive inflow of air from the reciprocating compressor 23 that matches the negative outflow of air feeding turbo expander 17. This balance happens at an equilibrium pressure that is dependent upon the SCFM/HP curves for the compressors 15, 23 and turbo expander 17. The pressure for a particular set of commercial hardware might be slightly above 200-psig.

Note that if it is desired to co-produce electricity with this system, gearbox 16 can be configured so that the rotating shaft 18 of turbo expander 17 can be connected to an electric generator to produce electricity, and disconnected from the reciprocating compressor 23. This option allows shaft 18 to be connected and disconnected from the impeller-driven reciprocating compressor 23 which can be used to recycle compressed air into surge tank 19.

Figure 3:
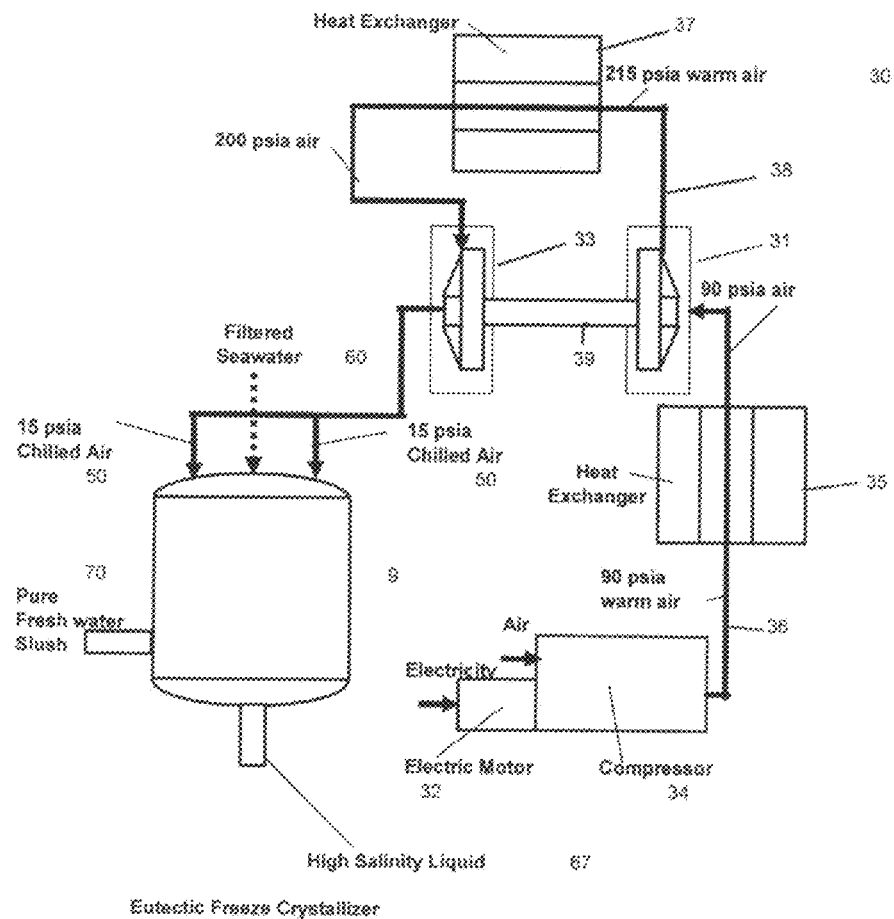
FIG. 3 is a schematic drawing showing the tank-less version of the compressed air energy system of the present invention.

3. Tank-Less Compressed Air Energy System:

FIG. 3 shows details of a "tank-less" compressed air energy system, including compressor 31 and turbo expander 33 of an embodiment in which there is no need for a storage tank. In this system, energy from the source can be used to compress air using electric motor 32, secondary compressor 34, and turbo compressor 31, wherein the compressed air can be released using turbo expander 33, without having to store the energy first. Electric motor 32 can be driven directly by the electricity generated by energy source 3. Compressed air can also be generated by the energy source 3 directly and routed to drive turbo compressor 31 if desired.

As can be seen in FIG. 3, electric motor 32 is preferably used to drive the secondary compressor 34, wherein the pressurized output air from the secondary compressor 34 is cooled by a heat exchanger 35, extended along line 36, wherein the air from compressor 34 is then passed along to turbo compressor 31. The turbo compressor 31 preferably shares shaft 39 with turbo expander 33, such that driving one will also drive the other, wherein the system can reach a steady state operation, as will be discussed.

A second heat exchanger 37 is preferably provided along line 38 between turbo compressor 31 and turbo expander 33, such that as the compressed air travels from turbo compressor 31 to turbo expander 33, it passes through the second heat exchanger 37, to cool the air once again. This way, the air that enters into turbo expander 33 is relatively cold. A small surge tank, like the one shown in FIG. 2, may be provided between second heat exchanger 37 and turbo expander 33, if desired. The heat exchange systems used can be incorporated into the mixing chamber walls, as pipes and/or cavities, as will be discussed.

Because turbo compressor 31 and turbo expander 33 are driven by the same shaft 39, operating one will operate the other, which helps to reduce the overall cost of driving the mechanisms. Indeed, because the electric motor 32 is able to compress air initially, to create pressure inside the system, and the pressurized air is channeled into compressor 31, and then, to turbo expander 33, the force of driving turbo expander 33 can be used to initially drive compressor 31, thereby eliminating the need to use additional energy to drive either mechanism.

For example, when the initial pressurized-air from the secondary compressor 34 is passed from turbo compressor 31 to turbo expander 33, the turbo expander 33 starts to rotate, which in turn, causes turbo compressor 31 on the common shaft 39 to rotate as well. Then, as the turbo compressor 31 accelerates in rotational speed, it further pressurizes the input air from the secondary compressor 34 into turbo expander 33, causing the turbo expander 33 to accelerate further. The cycle of accelerating the turbo expander 33 and turbo compressor 31 systems with the same shaft 39, using the energy from secondary compressor 34, can then eventually reach a steady state, wherein the flow through secondary compressor 34, turbo compressor 31 and turbo expander 33 match. The rotational power across turbo compressor 31 and turbo expander 33 can match as well. Compressed air generated by the energy source can also be fed directly to turbo compressor 31, to achieve the same effect as using secondary compressor 34. Controls are used to control and operate the heat exchangers that are used to help control the temperatures of the air passing through turbo expander 33. The controls determine which heat exchangers are to be used at any given time, and how much effect they should provide.

FIG. 3a shows the following: First, it shows the thermodynamic description of the secondary compressor 34 (identified as reciprocating compressor) during its operation between 14.67-psia and 90-psia. The compression process is considered isentropic so that one can take air from 14.67-psia and 70 degrees F., to 90-psia and 426.44 degrees F. (Entropy=1.6366 BTU/(# R). However, it should be noted that the compression process may be as low as 84% or less efficient, wherein the result is that more energy is expended to achieve 90-psia, so that the final temperature is actually higher, i.e., could be 492 degrees F. or higher. Water-cooling of the compressor and water-cooling in the downstream heat exchanger 35 preferably bring the output temperature to about 70 degrees F. The heated water can then be sent to the hot water system as waste heat recovery, if desired, or to the crystallization chamber walls, as will be discussed. Also consider that there may be a pressure drop, such as about a loss of 5-psi, between the secondary compressor 34 and turbo compressor 31.

A similar process is preferably repeated with the turbo compressor 31 (identified as centrifugal compressor) with its 84% efficiency. The result is that the 85-psia and 70 degrees F. air is compressed to about 205-psia and 250 degrees F., by using about 43.36 BTU/# of flowing air. Again, water-cooling of the turbo compressor 31 and water-cooling in the downstream heat exchanger 37 preferably bring the output temperature to about 70 degrees F. The heated water can then be sent to the hot water system as waste heat recovery, if desired, or to the crystallization chamber walls, as will be discussed. Also consider that there is about a 5-psi pressure drop between the turbo compressor 31 and turbo expander 33. The turbo expander 33 accepts input air at 200-psia and 70 degrees F., and can exhaust chilled air at about 31.5 psia and minus 114.8 degrees F. This releases 43.416 BTU/# of flowing air, slightly more than the 43.36 BTU/# of flowing air required by the turbo compressor 31.

A sample case is given in FIG. 3b, wherein a 2,000 hp system can provide 10,857.6 SCFM air at minus 114.78 degrees F. for chilling purposes. Note that this was achieved by powering only the 2,000 HP reciprocating secondary compressor 34 at an efficiency of 102.79 BTU/# or 5.5 SCFM/HP. In FIG. 3a there is 2,000 hp electrical input and 844.3 hp thermal output. This represents 42.2% efficiency.

These numbers and amounts are estimated, and are provided for exemplary purposes only. In actual use, the desalination system of the present invention preferably operates with chilled air in the temperature range of minus 135 degrees F. to minus 175 degrees F., and therefore, systems having greater cooling potential, such as by increasing the amount of pressure that is released, is contemplated by the present invention. Actual numbers and amounts may vary.

The chill temperature available from the turbo expander can be generalized by considering an example of a 200-psia input pressure and two discharge pressures (1) 30-psia for a one stage turbo expander, and (2) 14.67-psia for a two stage turbo expander. In the first case, the 30-psia discharge pressure considers a downstream process wherein the chilled air will need sufficient pressurization to pass through long lengths of piping and valves and their associated pressure losses. The second case, the 14.67-psia discharge pressure considers that there is no downstream plumbing of any consequence and gives the greatest pressure drop (temperature drop) across the turbo expander.

Figure 3C:
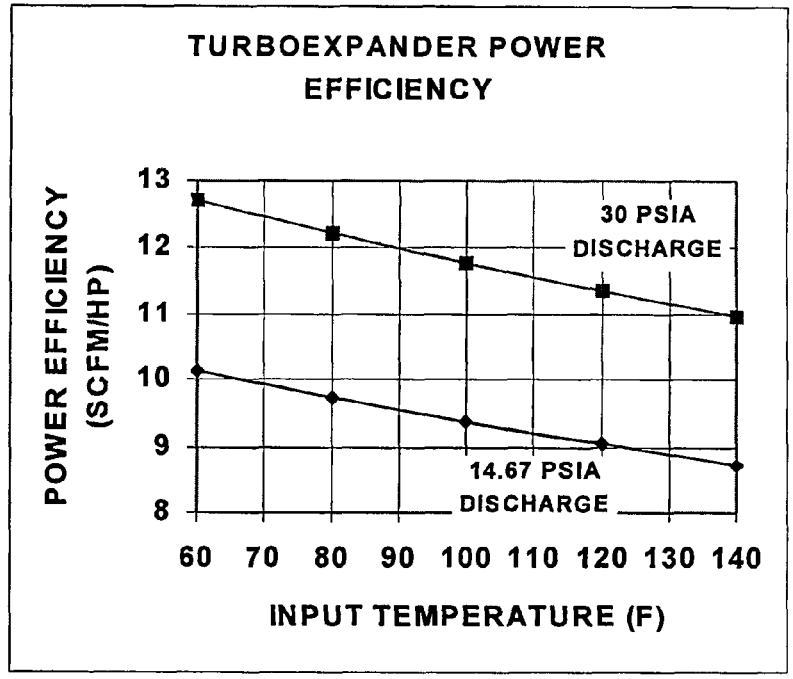
FIGS. 3c and 3d are graphs showing different turbo expander discharges.
Figure 3D:
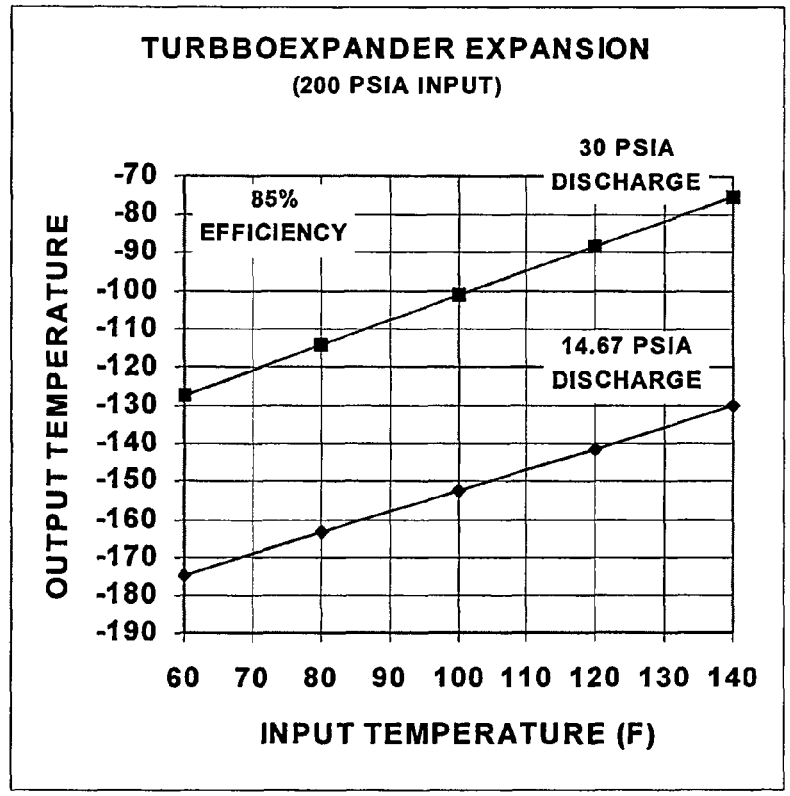

FIG. 3c shows the strong difference between the airflow requirements to produce a unit of power (SCFM/hp) for the above two specific cases. FIG. 3c shows that the higher the input temperature, the less airflow is required to produce a unit of power. So, higher input temperatures will require less compressed air energy, including a smaller storage tank, to produce a given amount of power for the same power discharge time. On the other hand, FIG. 3d shows that the lower input temperature will produce a lower discharge temperature. Furthermore, FIG. 3d shows that discharging from 200-psia to 14.67-psia (atmospheric pressure) produces extremely low temperatures for lower input temperatures. Thus if the goal is desalination, or air conditioning, it is necessary to consider the larger pressure drop and colder input temperatures.

B. Applications of Present Desalination System:

The present desalination system can be used in virtually any application where the need for desalination exists. For example, there may be a need to supply fresh water to a town located near a seashore site that is in a drought season, or there may be plentiful brackish well water available in a desert. In the following section, two unique applications will be considered: (1) Shipboard application, and (2) Island or onshore application. In the shipboard application, the objective is to maximize the production of fresh water at the sacrifice of electric power (see FIG. 4c, which shows Scenario #3). Whatever electric power is produced will be cycled back to operate the air compressor, such as by using the surge tank compressed air energy system described above. In the island application, flexibility is desired to be able to switch from one scenario to another, either maximizing electric power, maximizing desalination, or maintaining a balance of both (see FIGS. 4a, 4b and 4c, which show Scenarios #1, #2 and #3).

Figure 4A:
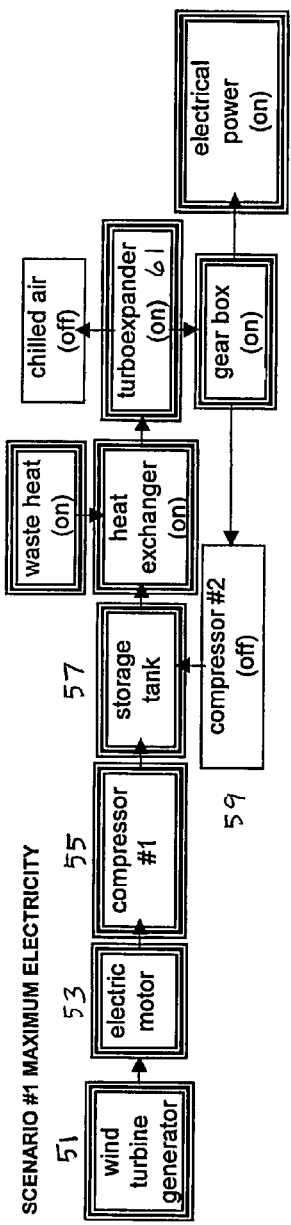
FIG. 4a is a flow chart showing a configuration scenario that provides maximum electricity.
Figure 4B:
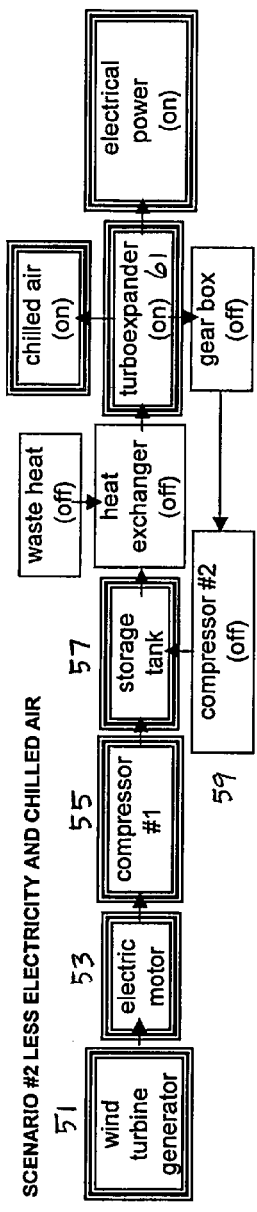
FIG. 4b is a flow chart showing a configuration scenario that provides a combination of electricity and chilled air.
Figure 4C:
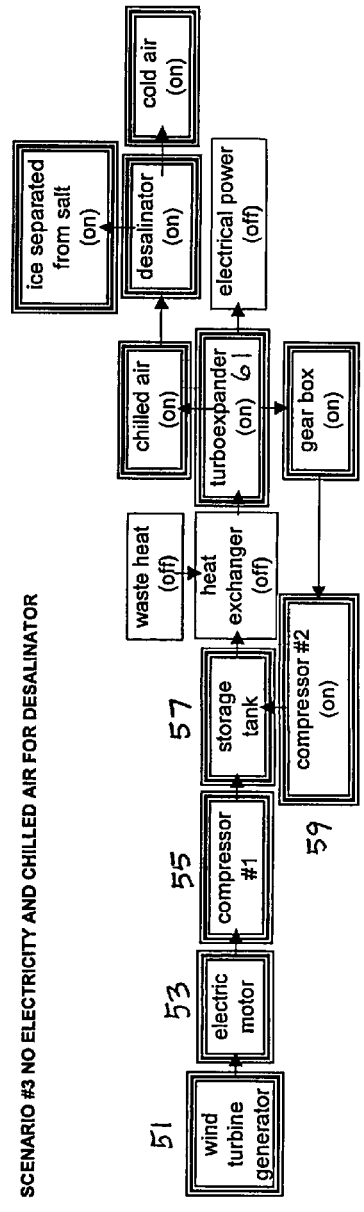
FIG. 4c is a flow chart showing a configuration scenario that provides maximum chilled air and no electricity.

1. Shipboard Application:

As seen in Scenario #3, in FIG. 4c, diesel fuel available on board a ship can be used to operate Compressor #1, 55. Compressor 55 preferably feeds compressed air into a very small surge tank 57. Surge tank 57 has one exit that feeds into the turbo expander 61 which, in turn, expels extremely cold air. The shaft of turbo expander 61 is preferably attached to a turbo compressor wheel, Compressor #2, 59, that takes local atmospheric air and compresses it so that it can feed compressed air back into surge tank 57. Thus the net system uses diesel fuel to drive Compressor #1, 55, and then super chilled air is the by-product. As will be discussed, this super chilled air can interact with seawater and generate pure water using the desalinating system described herein. This device can be made relatively small and can generate a significant amount of freshwater when compared to other existing systems that are used on ships, such as the reverse osmosis method.

In a variation of this embodiment, the on-board ship system can also be driven by a wind turbine 51 mounted on the ship, to use wind generated energy to drive compressor 55. Wind turbine 51 can be mounted so that it can swivel and at any time be aimed toward the wind, such that the wind, either in combination with, or instead of the power of the engine on the ship, can be used to generate energy to drive the compressor. Compressor 55 is preferably gear driven such that energy from the wind turbine is used directly without being converted into electricity first, which increases efficiency.

2. Island and Off-Shore Application:

The Island Application preferably uses any of the compressed air energy methods described above to co-generate electricity and/or chilled air. First of all, during the period of time when only electricity is needed, a heater or waste heat can be used to preheat the input compressed air to the turbo expander 61 (to about 350 degrees F.) to optimize the generation of electricity, with reduced consumption of compressed air, and essentially no chilled air from the turbo expander. However, during the period of time when both electricity and chilled air (for desalination and air conditioning purposes) are needed, the heat input is preferably turned off. In such case, the turbo expander generates electricity with increased consumption of compressed air, and chilled air is expelled from the turbo expander as a by-product to feed the desalination and/or cooling system. The cold air that passes through the desalination system can also be used to provide cooling for an air conditioner.

During the period of time when (a) no electricity is needed, and (b) chilled air is needed for desalination and/or air conditioning purposes, the heater input is preferably turned off. Preferably, the surge tank "cycle back" system described above can be implemented. In such case, the turbo expander 61 preferably generates reduced electric power, or none at all, and chilled air is expelled from turbo expander 61 to the desalinating system and/or cooling system. And, whatever electric power is produced is cycled back to operate the reciprocating compressor #2, 59. In this mode of operation, the volume of the surge tank is not relevant. A steady pressure is reached in tank 57 such that a given input compressor power puts out a fixed flow of chilled air. Compressors #1 and #2 preferably operate continuously.

3. System Scenarios:

In Scenario #1, shown in FIG. 4a, there is interest in generating the maximum level of electrical power while exhausting the storage tank 57 at the minimum flow rate. This can be accomplished by using waste heat from nearby equipment (or solar irradiation) or compressor 55 to heat the pressurized air fed to turbo expander 61. The higher initial temperature, say, about 300 degrees F., will produce an exhaust air temperature from the turbo expander 61 that is slightly below room temperature. Thus, although electricity is produced, there is no useful co-generated chilled air. The turbo expander 61 impeller material should be titanium at the high tip speeds of the rotating impeller.

In Scenario #2, shown in FIG. 4b, there is interest in producing electrical power and simultaneously producing exhaust chilled air from turbo expander 61 that is extremely cold. Thus, there is co-generated chilled air that can be used for air conditioning systems, refrigerators, food lockers and, in the preferred embodiment, desalination systems. The turbo expander 61 can operate at temperatures below 70 degrees F. so that it is acceptable for impeller material to be made of high strength aluminum at the high tip speeds of the rotating impeller.

In Scenario #3, shown in FIG. 4c, there is no interest in producing electrical power, but there is interest in producing chilled air from turbo expander 61. Thus there is co-generated chilled air that can be used for air conditioning systems, food lockers, refrigerators, and in the preferred embodiment, desalination systems. The turbo expander can operate at temperatures below 70 degrees F. so that it is acceptable for impeller material to be made of high strength aluminum at the high tip speeds of the rotating impeller.

C. Eutectic Freeze Process:

An existing technology called the Eutectic Freeze Crystallization method has attracted attention in recent years. In the context of desalinating seawater containing salt, the eutectic freeze crystallization process takes advantage of the freezing process, and the phase diagram of saltwater solution, as shown in FIG. 20.

Pure water will begin to freeze at 0 degrees C. (32 degrees F.), whereas, a solution of saltwater containing 3.5% salt concentration will begin to freeze at about minus 1.9 degrees C., wherein the ice that forms is essentially salt free, with a density of about equal to that of freshwater ice. The lowest temperature at which a saltwater solution will remain a liquid is minus 21.1 degrees C. or about minus 6.2 degrees F. The fresh water components of the saltwater solution begin to freeze prior to reaching that temperature, by forming ice crystals, but at that temperature, not only has the fresh water frozen, but the salt solution begins to crystallize out of solution as pure NaCl crystals and hydrated NaCl*2H$_2$O), along with the ice, until the liquid in the solution completely freezes to a solid. The frozen solution is a mixture of separate of NaCl crystals and hydrated NaCl*2H2O crystals as well as the original frozen fresh water ice crystals. This boundary between the warmer two-phase mixture and colder one-phase heterogeneous mixture is called a eutectic mixture.

The point at which a eutectic mixture is in equilibrium with the solution makes a wonderful calibration point for a temperature scale when there is only one salt solute in the water. Each solute has its own eutectic temperature and concentration. This is because a mixture of two-phases (ice fresh water ice and saltwater) and one solid phase is stable at one temperature and at one temperature only per each particular solute. If there is a transition from two-phases to one phase solid, the temperature must be at minus 21.1 degrees C. (or minus 6.2 degree F.).

The sequence of steps in the Eutectic Freeze Crystallization process can be explained based on a typical water-salt phase diagram, as shown in FIG. 20. If a saltwater solution is cooled below the freezing temperature designated by the liquidus boundary line, ice crystals will start to form. This line is at an angle to show that the freezing temperature of the saltwater solution is dependent on the level of salt concentration therein. For example, when there is 0 percent salt concentrate, the freezing temperature is 32 degrees F. However, when the salt concentration level increases, by moving down along the liquidus boundary line, the temperature at which the ice crystals will form decreases. For example, when there is a 10 percent salt concentration in the solution, the freezing temperature becomes lower, i.e., something like 15 to 20 degrees F. Then, with continued cooling, and as more ice is formed, the saltwater solution becomes more concentrated with salt. Therefore, its composition moves along the liquidus boundary line and eventually reaches a point called the eutectic point, wherein the solution is saturated with salt (with a salt concentration of 23.3%). At this concentration, ice crystals will form when the temperature is at the eutectic temperature of about minus 6.2 degrees F. Further cooling below minus 6.2 degrees F. will result in the formation of a mixture of three solids: 1) solid pure water ice crystals, 2) solid pure salt crystals, and 3) solid pure hydrated salt crystals in a single solid phase that does not permit separation. The eutectic point of NaCl is at minus 6.2 degrees F., and the eutectic composition is 23.3%.

In the present invention, the ice mass preferably operates at a temperature slightly above this temperature, in order to avoid crystallization of salt. Thus, only the area above the solidus boundary (below 23% salt concentration), which represents the region of the phase diagram above EFC temperature, are preferably used. The extreme far left region of the phase diagram (0% salt) represents pure ice/snow formation, and the central region represents the salty brine. The extreme far right region of the phase diagram and the region below the solidus boundary include pure solid ice crystals, pure solid "salt and hydrated water" crystals and pure solid salt crystals in a single solid phase that does not permit separation and are not used in the present system.

The NMR tests performed by Dr. Herman Cho of Pacific Northwest Laboratories showed that when a salt solution is frozen to below the eutectic temperature, it returns "immediately" to its two phase condition when thawed to warmer than the eutectic temperature. This is an important data point for describing the behavior of the very small droplets in the crystallization chamber.

It should also be considered that standard seawater from the ocean contains additional minerals and impurities other than salt, as shown in FIG. 7. FIG. 7 shows the standard composition of seawater. For each component the weight percent and the eutectic temperature are given. On the other hand, FIG. 8 represents the requirements for clean drinking water. Usually 3% salt concentration in the seawater, when brought to 0.03% salt concentration, is considered potable. Fresh water is considered to be any salt concentration below 0.05%, whereas, the term brackish water is commonly given to water having a salt concentration of between 0.05% and 3.0%. The term saline water is commonly given to water having a salt concentration of between 3.0% and 5.0%, and the term brine is commonly given to water having a salt concentration of more than 5.0%. Again, the term "seawater" will be used throughout to refer to any water needing to be purified, whether from the sea or not.

Note that by using the eutectic temperature of minus 21.2 degrees C. (or minus 6.2 degrees F.) to extract sodium chloride (NaCl), the crystallization process will leave the following minerals: Calcium Chloride (1.36 g/liter of intake) and Magnesium Chloride (4.66 g/liter of intake). These are two products that can be salvaged for further economic benefit. If there is interest in further removing other minerals, such as potassium chloride, magnesium sulfate and sodium bicarbonate, more careful control of the slush temperature can assure that these compounds do not get frozen into the ice and instead will remain in the brine solution for later recovery in additional processing. When fresh drinking water is the end goal, the present invention contemplates using filters to remove as many impurities from the seawater as possible before it is used in the desalination processes. The invention contemplates using any of the other minerals for further economic benefit.

Very little information has been published on the EFC method, presumably due to the alleged complexity of EFC compared to its competitive conventional techniques, such as evaporative and cooling crystallization. With the ongoing advancements in wash column technology and the large scale application of melt crystallization as an ultra purification technique, the most forwarded disadvantages of EFC concerning investment costs and scale limitations can be overcome, and time has come to consider its commercial application.

As discussed above, the EFC process of the present invention is different from other processes, in that it involves the formation of pure water ice crystals that can be separated from the impurities that are in the base water. It is important for the droplets to freeze to form a two-phase solution of solid ice particles and liquid brine, so it is desirable for the droplets to reach at or near the eutectic temperature while in flight. On the other hand, if the droplets become too cold (colder than the eutectic temperature) as they fall through the chamber, the fresh water within each droplet could freeze together with the solid salt crystals and solid brine, in which case, it may not be possible to separate the salt from the fresh water.

This can happen, for example, when the seawater spray consists of varied droplet sizes, wherein the smaller droplets may reach below the eutectic temperature and completely freeze by the time they reach the bottom of the chamber. In this respect, consider that the spray nozzle that is designed to disperse a cloud of mean size close to 4,000 microns in diameter will also generate a smaller fraction of mass flow but a huge number of droplets in the range of 400 microns in diameter. These smaller particles have a ten-fold smaller settling velocity and will have a ten-fold longer residence time. Furthermore, these smaller particles will freeze faster and to temperatures far below the eutectic temperatures when they interact with the minus 135 deg F. or minus 175 deg F. local air stream exiting the nozzles in the co-flow configuration. Even though typical nozzles spray larger diameter particles, there will always be smaller particles, including a distribution of particle sizes within a certain range. The smaller particles are likely to be large in numbers, but will not contribute to a very large mass overall.

Therefore, the small droplets in downward flight through this extremely cold temperature regime will indeed cause undesirable crystallization of the droplet into one solid particle composed of (1) Solid ice of fresh water, (2) Solid salt with each salt molecule bound to two water molecules with attached water molecules, and (3) Solid salt crystals. During the flight of the small particle in the cold air there is no separation of the brine from the fresh water. However, as will be discussed, the separation will occur when the droplet deposits on the mass of accumulated ice particles created from the large droplets at the bottom of the chamber, which preferably has an equilibrium temperature that is warmer than the eutectic temperature.

The very small particle on the order of a few hundred microns in diameter may freeze completely through to their centers when exposed to air temperatures far colder than the eutectic temperature, in the regime close to the spray nozzle. When these small droplets deposit on the warmer ice/snow mass at the bottom of the crystallization chamber, they are preferably warmed to about the equilibrium temperature of slightly warmer than the eutectic point. Thus if the small droplets undergo freezing to below the eutectic temperature, they can thaw back up to above the eutectic temperature. At that point, the usual separation of the solid porous snow/ice structure and the liquid salt solution (brine) will occur. In the invented process, therefore, at least at the bottom of the chamber, the crystallization temperature is preferably maintained at a level slightly above the eutectic freeze crystallization temperature in order to avoid salt crystallization. The net result is the formation of pure ice/snow and residual liquid brine.

The operation of the crystallization chamber at the eutectic temperature results in the highest possible conversion of seawater to sweet water, 85.7%. However, the porosity of the ice/snow mass may be higher at slightly warmer temperatures so that less than 85.7% conversion efficiency is sacrificed to obtain a higher purity of the final fresh water.

The present invention represents a novel variation of the EFC system, wherein clean chilled air is used as the refrigerant, and is mixed with a seawater droplet cloud, to cause the seawater to reach near the eutectic point, so that pure water ice crystals can be formed, which can be removed from the salty brine solution remaining after the ice freezes. In the present invention, it is intended that the system operate mostly above the eutectic point, particularly when the ice crystals begin to settle, so that the formation of solid salt crystals can be avoided.

One of the goals of the present invention is to ensure that the seawater is adequately frozen by exposure to the chilled air introduced and intermixed with the seawater in a mixing chamber. To do this, the present invention contemplates introducing extremely cold air into the mixing chamber, such as air chilled to preferably between minus 135 degrees F. to minus 175 degrees F., and then pressurizing the seawater and injecting it into the mixing chamber through nozzles in the form of tiny seawater droplets, which can more easily be mixed, cooled and affected by the chilled air. And, to ensure that adequate freezing and separation can occur, it is significant to determine the size, velocity and pressure of the droplets and how they are formed and introduced into the chilled air flow, as well as the temperature, volume flow rate and relative direction of the chilled air, as well as the size of the mixing chamber.

FIG. 9 shows the temperature regimes for the various phases of a water droplet. The Bergeron Process, named after its discoverer, Tor Bergeron, involves supercooled water droplets. The term supercooled refers to water that is still a liquid at temperatures below the freezing point of 0 degrees Celsius or 32 degrees Fahrenheit. Studies have shown that water in very small drops, such as the size of a cloud droplet, can exist at temperatures well below freezing (as low as minus 40 degrees C. or minus 40 degrees F.).

The present invention preferably utilizes a mixing chamber, such as those shown in FIGS. 14-18 and 25-31, for mixing the chilled air with the seawater droplets. The mixing chamber is essentially a container preferably having insulated walls in which the seawater droplets and chilled air can be introduced and intermixed until they collectively reach near (slightly above) the Eutectic Temperature, which, as indicated above, for saltwater, is minus 21.1 degrees C. The size and configuration of the chamber can vary, depending on the needs, and capacities that are desired, as will be discussed.

To help ensure that proper mixing occurs, the seawater is preferably pressurized and passed through one or more nozzles to form a spray, which forms a seawater droplet cloud, or mist, that is preferably introduced into the chamber. Any of various nozzle configurations are possible, depending on the desired results to be achieved.

Full cone nozzles form complete spray coverage in a round, oval or square shaped area. Usually the liquid is swirled within the nozzle and mixed with non-spinning liquid that bypasses an internal vane. Liquid then exits through an orifice forming a conical pattern. Spray angle and liquid distribution within the cone pattern depend on the vane design and location relative to the exit orifice. The exit orifice design and the relative geometric proportions also affect the spray angle and distribution. Full cone nozzles provide a uniform spray distribution of medium to large size droplets resulting from their vane design which features large flow passages and control characteristics.

FIG. 10 shows several characteristics of spray nozzles. The full-cone configuration may be most applicable to the present application. Within each type of spray pattern, the smallest capacities where the capacities are defined by the lowest pressure drop across the orifice where the orifice diameter is small, will produce the smallest spray drops. The largest capacities produce the largest spray drops. Although with most nozzles, a range of different size droplets (distribution) will inevitably be formed. For example, a nozzle with VMD of 4,000 microns diameter will have the largest mass flow of droplets at 4,000 microns. However, there will also be a much smaller mass flow of particles at the smaller size of 400 microns in diameter. Volume Median Diameter (VMD) is based on the volume of liquid sprayed; therefore, it is a widely accepted measure. FIG. 11 shows the range of drop sizes possible by nozzle type.

Note that in one embodiment of the present invention, there would be mixing between the input seawater and the chilled air, wherein about 250 pounds per minute (250 #/min) of seawater could be processed with a predetermined amount of chilled air, which has been calculated to be about 7,151 standard cubic feet per minute (7,151 SCFM). In such case, there would ideally be about 214 #/min of ice (fresh water) recovered. Based upon a turbo expander efficiency of 9.9 SCFM/hp and a compressor efficiency of 2.2 SCFM/hp, there is 7.1 kW input electrical power to generate a pound per minute of fresh water.

In order to transfer 11,000 pounds of saltwater in 120 minutes, the spray nozzle that is selected must pass a minimum of 10.76 gallons per minute. Thus the full cone nozzle having a capacity of 12 gallons per minute and 4,300 microns VMD could be applied to that sample embodiment. Note that heavy rainfall consists of particles with VMD of 2,000 to 5,000 microns. Droplets over 8,000 microns in diameter break up into fragments when reacted with a relative wind. In this example, the volume flow rate can dictate the design of the equipment, including the size of the nozzles, and operating pressure thereof, and therefore, the size of the seawater droplets, in cases where a desired rate of fresh water production is necessary. In other examples, the size of the nozzles and the seawater droplet sizes can be determined based on the optimum characteristics that are sought to be achieved, for the maximum efficiency of the equipment in the production of fresh water.

The size of the seawater droplet is preferably controlled, as much as possible, and predetermined, to ensure that proper mixing and adequate heat transfer occurs, to help ensure that proper freezing takes place. Preferably, the droplets will need only a very short amount of time to completely freeze, from the outer surface of the droplet, to the core of the droplet, an example of which can be seen in FIG. 12. This can be a function of the droplet size, as well as the temperature, and volume flow rate and direction of the chilled air, which is also a function of the size of the chamber, and how long the droplets are exposed to chilled air, i.e., residence time. The droplets must be small enough to be quickly frozen, but large enough so that they eventually fall to the bottom of the chamber, notwithstanding the flow rate of the chilled air.

Generally speaking, the droplet size can be affected by the amount of pressure that is used to force the seawater through the nozzles. When more pressure is used, the droplet diameter will tend to be smaller, and when less pressure is used, the droplet diameter will tend to be larger. For example, when a pressure of about 28 psia is used, the droplets will tend to be relatively small, resulting in a downward velocity of about 26 feet per second, into 14.67 psia atmosphere. On the other hand, at lower pressure, say, about 16 psia, the droplets will tend to be larger, resulting in a downward velocity of about 8.3 feet per second, into a 14.67 psia atmosphere. Nevertheless, with most nozzles, it is not always possible to completely control the size of each seawater droplet that is formed, so the present invention must take into account the possibility that a range of droplet sizes will be formed when the spray is made. However, the nozzles are designed for a specific nominal droplet size. Statistically, the nominal droplet size will be the median (VMD) value, with a typical bell-shaped distribution. For quality manufactured nozzles, the normal distribution will be relatively narrow and highly peaked so that the majority of particle sizes will be near the median value. The outer size region above and below the mean would not have a significant effect of the desalination system performance.

Another consideration is the flow rate of the chilled air in the chamber. In conjunction with the droplet size, how long a droplet will be exposed to and suspended within the chilled air, and how it will circulate within the mixing chamber, will depend on the relative velocities of the droplets and chilled air. That is, the velocity at which the droplets fall to the bottom of the chamber can be varied by adjusting the direction and flow rate of the chilled air in the chamber, as will be discussed. In this respect, the relative direction of the seawater spray and chilled air being introduced into the chamber can contribute to the proper formation of the ice crystals. In this respect, the present invention contemplates both a 1) counter-flow and 2) co-flow arrangement.

D. Counter-Flow:

To achieve a counter flow arrangement, the chilled air and seawater spray are introduced into the chamber in opposite directions. This can be achieved, for example, by having the seawater sprayed downward into the chamber, as the chilled air is introduced upward into the chamber. This arrangement is shown in FIGS. 16-18, and 25-30. With the counter flow using a downward spray of seawater, and an upward flow of chilled air, it is important to consider the effect of the opposing flows on the way the droplets circulate, freeze and settle within the chamber. In either instance, the difference between the two flow velocities, taking into account the effects of gravity, and the size of the droplets, and the temperature and volume rate of the chilled air flow, and size of the chamber, can help determine the extent to which the seawater droplets can be sufficiently circulated, such that adequate cooling and freezing and settling of the droplets can be achieved. They must also fall to the bottom of the chamber to begin forming an ice mass in fairly short order, i.e., within less than a few seconds.

Accordingly, when considering a counter flow, one must consider the terminal fall velocity of the seawater droplet as it is being subjected to the upward chilled air flow. A correlation of the terminal fall velocity for water droplets in air is shown in FIG. 13. The smaller diameter particles (shown below the line) will in many cases be blown upward and could be blown out of the system, and therefore, the nozzle configuration of the spray is preferably configured so that it does not produce droplets that are too small. However, with most nozzles, a certain amount of the seawater droplets will inevitably be formed as a spray of tiny mist-like droplets, which will tend to be blown upward, although this preferably represents a very small fraction of the seawater output.

Consideration has been given to using about 7,151 SCFM chilled air, and a chamber having a 25 square feet cross sectional area vertical column, wherein the upward vertical velocity for the chilled air has been determined to be about 4.77 ft/sec. In such case, by taking into account the data supporting FIG. 13, it has been determined that seawater droplets that are greater than 325 microns will likely properly settle down slowly through the upward chilled air flow at that velocity. By looking at the chart in FIG. 13, however, it has been considered that seawater droplets having a size of 4,000 microns in diameter, with 44 ft/sec chilled air settling velocity, would be more acceptable. Dr. Wa Gao reported freezing 2,800 and 4,200 micron size droplets of piggery wastewater in mean times of about 7 seconds using minus 4 deg F. chilled air in her vertical wind tunnel. In the present invention, however, the seawater droplets are preferably frozen, from room temperature, i.e., plus 40 degrees F., down to close to minus 6.2 degrees F. (eutectic temperature), in a much shorter amount of time, as little as about 0.2 seconds, since chilled air at temperatures between minus 135 degrees F. to minus 175 degrees F. are used.

For the larger droplet sizes of the order of 4,000 microns diameter, it will take more than 0.2 seconds to freeze the droplet to the core, assuming that the same temperature chilled air is used. At the outset, when the droplet is at +40 deg F. and the air may be between minus 175 deg F. and minus 135 deg F., it might seem possible that there is a strong heat transfer and only 0.2 second is needed. Nevertheless, this calculation is not entirely accurate because heat exchange is taking place as the droplet decreases in temperature and the local air increases in temperature. Furthermore, it is assumed that the droplet interacts with all the air that is needed to assure a proper heat exchange. However, droplet freezing data reported by Dr. Gao supports this short freezing time for an individual droplet in air streams that are warmer. Consider the example for residence time in the counter flow chamber, wherein a 4,000 micron diameter droplet with a downward settling velocity of 44 ft/sec, encounters the slower upward velocity of chilled air of 4 ft/sec in the chamber. The droplet will fall through a 10 feet vertical height at 10 feet/(44 ft/sec−4 ft/sec)=0.25 seconds. Thus it is expected that the larger droplets will not complete the required heat exchange until they deposit on the ice/snow mass and complete their heat exchange to attain the equilibrium temperature of minus 6 deg F.

It can also be seen that the larger the droplet size, the greater the upward velocity of chilled air that can be used in the counter flow chamber, while still enabling the droplets to fall to the bottom of the chamber in a relatively short amount of time, which in one of the examples being considered, is about 2.5 seconds. And, with a larger droplet size, the longer it would take to freeze the droplet to the core, assuming that the same temperature chilled air is used, wherein it is desirable for the temperature of the chilled air to be relatively low, and the chilled air flow rate to be relatively high for a high transfer rate to the droplet.

Figure 16:
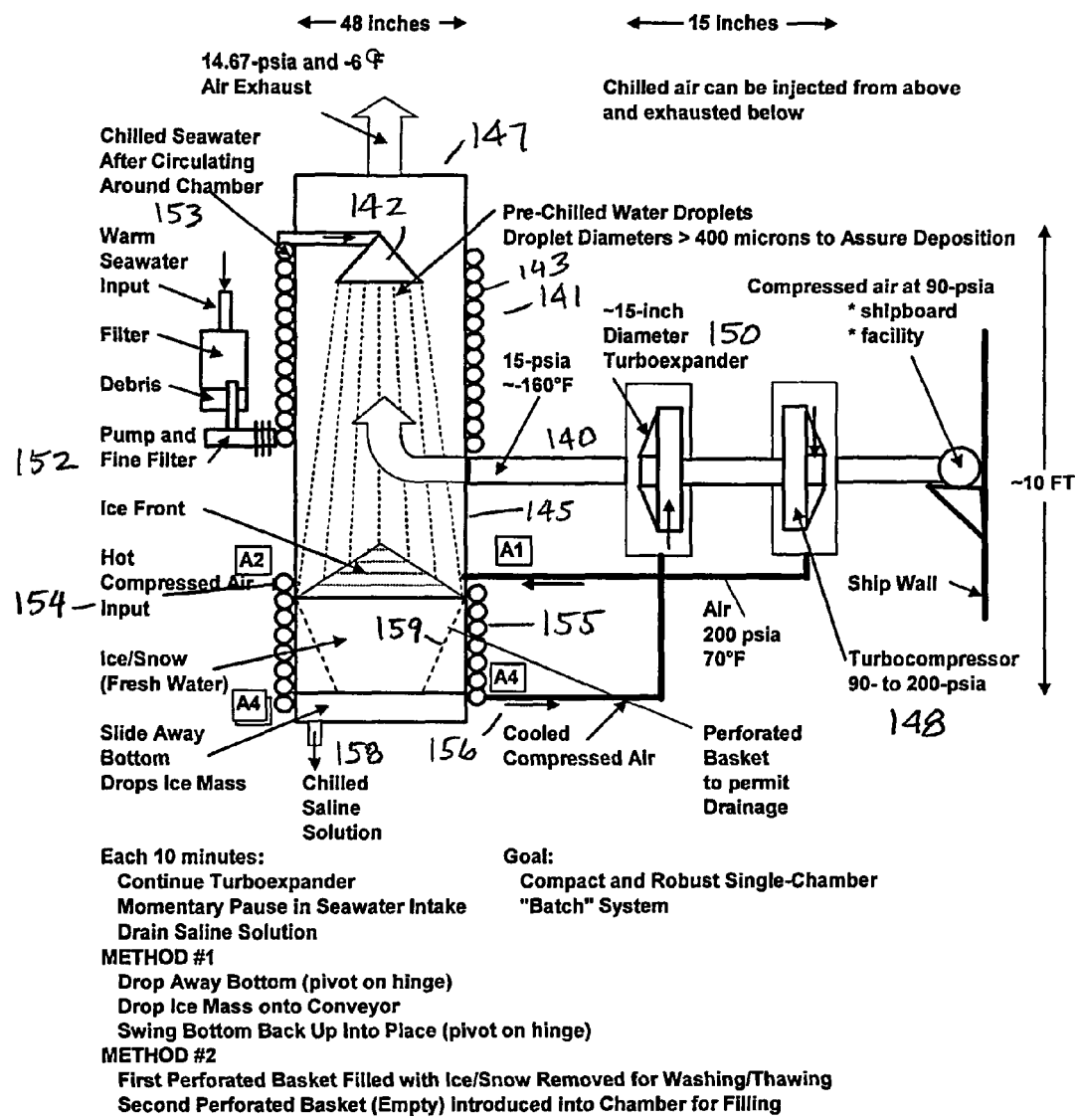
FIG. 16 shows a section view of the main chamber with chilled air being injected upward against the falling seawater droplets, referred to as "counter-flow."
Figure 17:
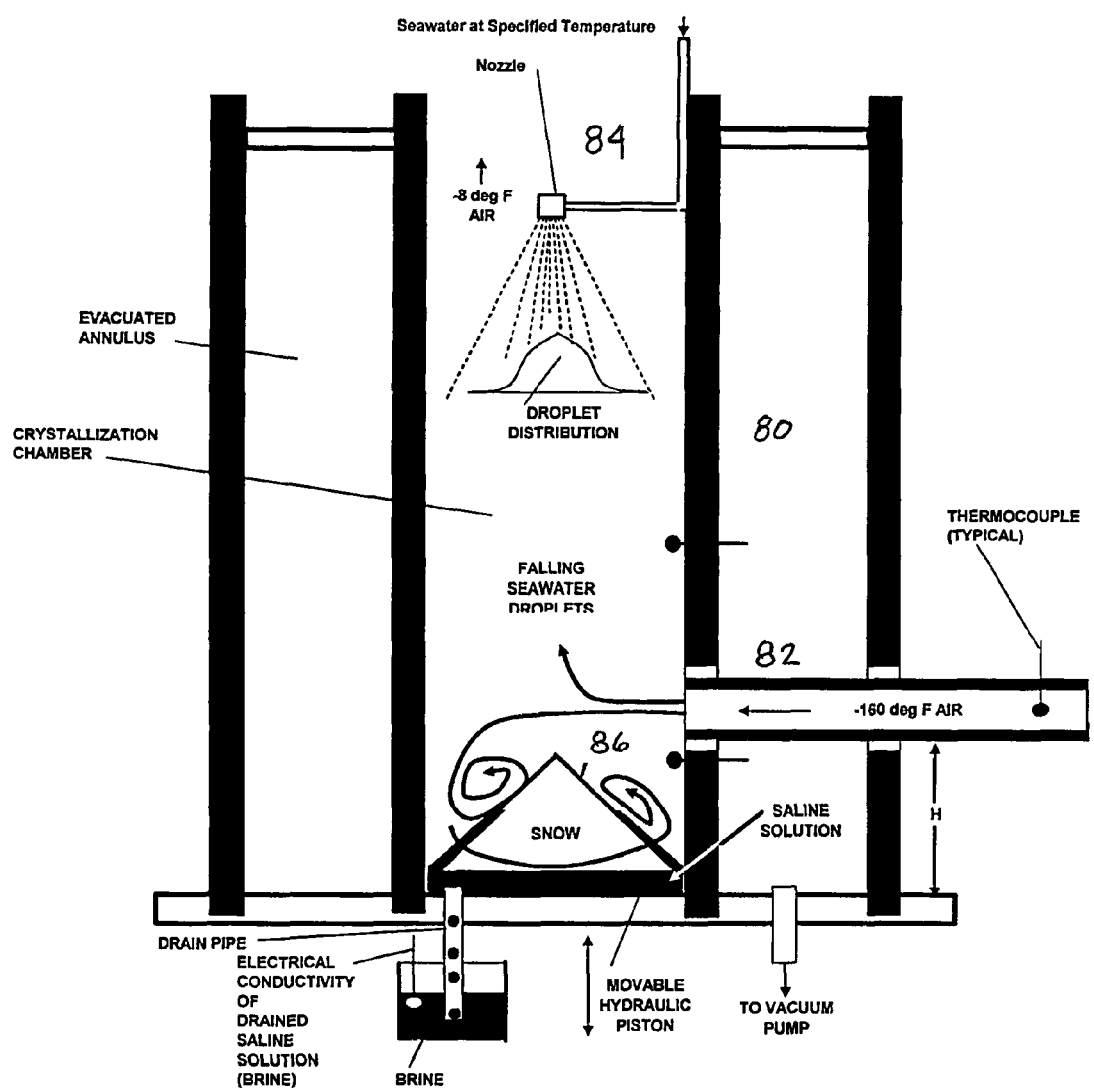
FIG. 17 shows a section view of the main chamber with a counter flow arrangement showing the injection height "H" of the chilled air.
Figure 18:
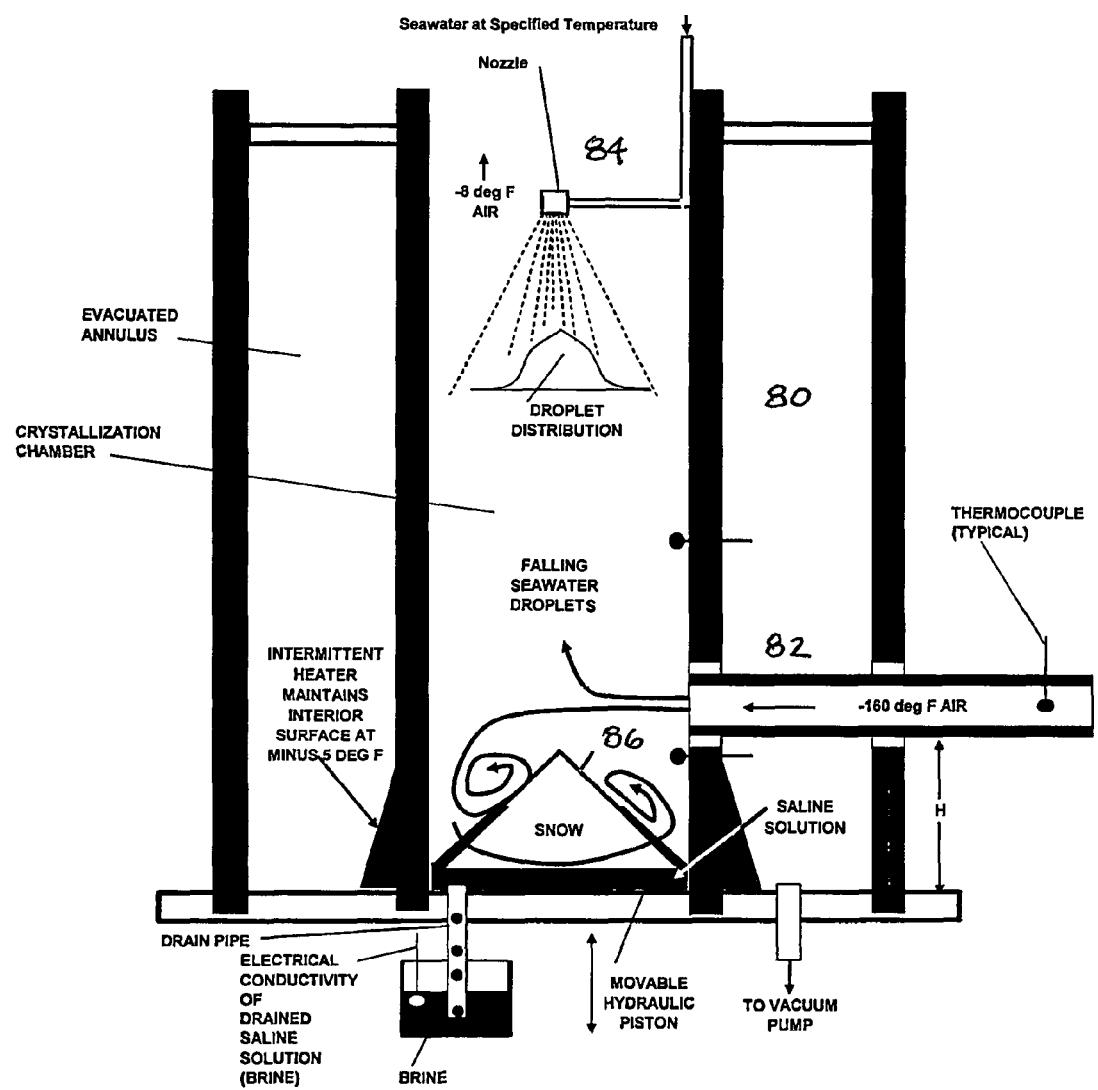
FIG. 18 shows a section view of the main chamber with a counter flow arrangement showing the injection height "H" of the chilled air, and the annulus gap around the conical ice mass.

Although the nozzles will tend to be directed downwards into the chamber, as shown in FIGS. 16-18, through an orifice located on the chamber walls, chilled air will tend to flow upwards, by maintaining a vent at the top of the chamber. By venting at the top, the chilled air introduced into the chamber can only flow upwards, through the chamber, wherein this flow can be used to create the counter flow, against the falling droplets. This trajectory gives the longest residence time and permits coalescence of droplets that collide. The entry for the chilled air is located on the sides of the chamber so that the droplets will not stick to the injection mechanism. In the research work done on freezing droplets, upward flowing chilled air was injected at an upward velocity such that the droplet settling velocity was matched and the droplet remained stationary for observation of the droplet properties during freezing.

The settling velocity of the droplets and the rapidity of the freeze process also determine the height of the settling chamber. Using the counter flow arrangement, the taller the mixing chamber, the longer the droplets will take to drop to the bottom, and therefore, the longer the droplets will be exposed to the chilled air, to freeze. Furthermore, the phase diagram is an equilibrium diagram which assumes that sufficient time is available to permit the separation of the different phases. The final construction of the settling chamber therefore is preferably determined based on the phase separation efficiency of the system. If it is too optimistic, it may be necessary to either reduce the flow rate of the seawater through the nozzles, or increase the height of the settling chamber, or volume flow rate of chilled air, etc.

It is also desirable to ensure that the ice particles remain separated in the air so that they will freeze properly before they land and coalesce at the bottom of the chamber to form an ice mass. If two or more ice particles are allowed to merge together and combine in flight, they will tend to form larger droplets, which will require more time and cooling to freeze. Therefore, using the counter flow arrangement, it is desirable to form seawater droplets that are far enough apart so that when they are sprayed they will not merge together in the air.

Previous investigators have looked at two rain droplets colliding due to the attractive force between them. They considered droplets 20 microns in diameter and assumed that the initial separation is about 10 times the diameter rather than the usual assumption of 50 times the diameter. The 10 diameters separation produces a denser distribution of droplets that will more likely lead to coalescence, droplet growth, and rain.

Based on these ratios, if the separation between particles is 25 times the diameter, and the diameter is 4,000 microns, the preferred separation distance would be 100,000 microns. This would mean that there would be 1 particle in a cube that is 10 cm×10 cm×10 cm or 1 particle per liter. The above calculation would mean that the distribution of this cloud would need to be accomplished in a chamber volume that is 1,026 feet tall and 25 square feet in cross sectional area, wherein this static cloud would have a density of 1 particle per liter of air. If this were the distribution of droplets in a cloud at high elevation, the droplets would fall to the ground and not collide during their downward trajectory.

If the separation between particles is 10 times the diameter, and if the diameter is 4,000 microns, the separation distance would be 40,000 microns. Based on the above calculations, the distribution of this cloud would need to be accomplished in a chamber volume that is 260 feet tall and 25 square feet in cross sectional area. If this were the distribution of droplets in a cloud at high elevation, the droplets would fall to the ground and possibly collide during their downward trajectory.

However, when introducing a nozzle spray that is continuously producing a seawater droplet cloud and causing continuous settling to occur using a slowly moving upward air mass flow, such as one that flows up at 4 feet per second, it has been determined that the height of the settling chamber may be much less. In addition, when a droplet diameter of 4,000 microns is used, they will not be affected as significantly by the direction of the upward air flow, and therefore, will tend to deposit at the bottom of the crystallization chamber, where it will complete its heat exchange and some drainage in a few seconds. However, when droplets of 200-micron diameter or less are used, they will tend to settle too slowly, at a downward velocity of about 2 ft/sec, and therefore, the droplets may not even deposit at the bottom of the crystallization chamber. Accordingly, it will be necessary, in such case, to assure that the droplets are at least larger than 400-microns in diameter. Nevertheless, at the lower end of the size spectrum, these smaller size droplets will have a higher residence time, i.e., probably higher than 2.5 seconds. Furthermore, as will be discussed later, the droplets will form a more porous ice mass when deposited at the lower temperatures associated with the incoming air at the bottom of the crystallization chamber.

These are inherent disadvantages associated with the counter flow arrangement, insofar as the upward chilled air flow causes the droplets to be forced upward and circulated for a greater period of time, wherein they can more easily collide and merge together if the chamber isn't large enough, and/or the density of the droplets is too high.

FIG. 16 shows an example of a counter flow and batch ice removal system, wherein chilled air is injected from the middle of the main chamber 141 and flows upward. FIG. 16 shows a section view of main chamber 141, with pipes 143 and/or cavities extending around the chamber walls 145, for circulating seawater and/or heated compressed air through the chamber walls, as will be discussed, for heat exchange purposes. This embodiment shows that compressed air can be generated by turbo compressor 148, and that the compressed air can be released and expanded by turbo expander 150, wherein the chilled air that is produced can be introduced into chamber 141 near the middle 140. Additional compressors, and heat exchangers, etc., as discussed before, can also be provided.

Chilled air from turbo expander 150 is preferably directed upward as a result of venting the chilled air at the top of chamber 141, i.e., the chilled air flow begins from about the mid point 140 of chamber 141 and exhausts at the top. The temperature, pressure and flow rate of the chilled air is preferably predetermined, and is a function of the factors that are discussed herein.

Pre-chilled seawater that has been filtered and circulated through the chamber walls, as will be discussed, is preferably introduced into chamber 141 through a set of one or more nozzles 142, to form a spray of seawater droplets, such as in the form of a droplet cloud. This is preferably injected into the chamber from above, from the top 147 of chamber 141, and in a downward direction. The temperature, pressure and flow rate of the seawater droplets is preferably predetermined, and is a function of the factors that are discussed herein.

This configuration enables the chilled air and seawater droplets to be introduced in opposite directions into the chamber 141, and circulated, wherein the droplets can be further cooled by the chilled air through heat exchange within the chamber. The nozzles 142 are preferably designed to distribute the droplets toward the center, such that the ice particles are kept away from the chamber walls, and so that the ice mass tends to form in the center of the chamber, such as in the form of an inverted cone shape. In this embodiment, the exhaust chilled air is allowed to exit chamber 141 through an exhaust at the top 147, wherein the exhaust chilled air can then be used for other cooling purposes, such as air conditioning.

The warmer intake temperature of the seawater and/or heated air from the turbo compressor 148 are preferably circulated within the chamber walls 145 to help keep the ice droplets forming in the chamber 141 from collecting on the walls 145, and regulate the temperature inside the chamber 141, i.e., to help maintain a more consistent temperature inside.

Seawater that has been filtered, for example, can be introduced by a pump into pipes 143 and/or cavities at near the mid-point 152, such that it circulates upward through the upper half of the chamber walls 145, and can exit near the top, at point 153, where the pre-chilled seawater can be distributed by nozzles 142, for introduction into chamber 141. Seawater is preferably circulated through the upper pipes 143 extending around chamber 141, wherein as the seawater circulates, it is pre-cooled by heat transfer with the cold chamber walls 145, before it is released into the main chamber 141 via nozzles 142. In this respect, the seawater is preferably (1) chilled as it circulates through the intake pipes 143 that surround the main chamber 141, (2) chilled as seawater droplets are ejected through a spray nozzle inside the main chamber 141, and (3) further chilled when the freezing seawater droplets are deposited on a mound to form an ice mass at the bottom of the chamber 141.

Heated air from the turbo compressor 148 can be introduced into the pipes 155 and/or cavities at a low point 154, such that it circulates downward through the lower section of chamber walls 145, and can exit at the bottom 156, wherein the cooled compressed air can then be distributed back to turbo expander 150, to help keep the compressed air cool. In this respect, the pipes 155 are preferably adapted to maintain the compressed air in its compressed state, which allows the actual air that is expanded by turbo expander 150 to be pre-cooled, so that the resultant chilled air can be made colder. In effect, heated compressed air from turbo compressor 148 can be circulated to keep the ice mass from sticking to the chamber walls, and, as the air circulates, it is cooled by heat transfer from the chilled chamber walls, wherein the pre-cooled air is then circulated back to turbo expander 150, wherein the air is super cooled and introduced into the main chamber 141, to freeze the seawater droplets.

The location of the pipes and/or cavities can be modified, i.e., the seawater can be circulated through the entire chamber, or the lower section, and/or the heated air can be circulated through the entire chamber, or the upper half, depending on the needs of the system. Preferably, much of the pre-cooling of the seawater and heated air occurs when it is in the pipes and/or cavities and there is thereby an excellent means of transferring heat within the chamber walls.

The bottom of the chamber is preferably adapted to allow the concentrated salt brine to be collected and then removed, through vent 158, wherein the ice mass will form on top of the salt brine, and float thereon, due to the lower density of the ice, and the higher density of the brine. A basket 159 can be provided at the bottom of the chamber so that the ice mass can easily be removed without having to stop the system. In this respect, the bottom of the chamber 141 is preferably adapted with an opening, which allows basket 159 to be removed, wherein the ice mass can then be thawed to produce fresh drinking water. Alternatively, the bottom of the chamber 141 can be designed to have a drop down door, such as with a hinge, such that without having to stop operating the system, the door can be lowered, to allow the ice mass, and any remaining collected brine, to be removed from chamber 141. In such case, there is preferably a conveyor system under chamber 141 which allows the ice mass to be transported to where it can be thawed and melted to produce fresh drinking water.

FIGS. 17 and 18 also show a counter flow system with a similar chamber 80 with chilled air introduced near the mid-point 82, wherein the nozzles 84 are adapted to introduce seawater from above. These drawings more clearly show the shape of the ice mass 86 forming at the bottom to be more of an inverted cone shape, as a result of directing the nozzles 84 toward the center of the chamber 80. This embodiment also shows a piston embodiment which can be used to lower the ice mass down from the chamber when it is desired to be removed. It also shows that the entry point 82 of the chilled air should be higher than the highest possible point of the ice mass. This is designated by the reference "H" which is the distance from the bottom of the chamber to the chilled air entry point. This is necessary to assure that the injected chilled air does not impinge on the ice mass and surrender its chilling properties into the ice mass rather than into the air in the settling chamber 80. The injected air must enter the settling chamber 80 and immediately rise to the top of the chamber and interact with the falling seawater droplets. FIG. 18 also shows that a separate heating unit can be incorporated into the chamber walls near the bottom to help keep the ice mass, and any falling ice particles, from freezing onto the chamber walls.

There is a zone at the bottom of the settling chamber below the chilled air injection point that will contain a dead air regime wherein air circulates in eddies. These eddies will sap some of the intake chilled air and will return some of the eddy air back into the main upward airflow. Because the eddy flows may undesirably maintain the ice mass and saline water at below the eutectic temperature, resulting in some of the salt crystallizing and depositing at the bottom of the saline solution, the value of H should be determined to ensure that the ice mass will remain at the appropriate temperature, which, in the preferred embodiment, is slightly above the eutectic point. Note that the shape of the developing ice mass is preferably conical-like, although any shape that allows the salt brine to runoff the sides or down through its pores is contemplated, as will be discussed. This facilitates the deposition of ice crystals and the runoff of the saline solution associated with each ice crystal.

It is also desirable to maintain a liquid annular gap around the periphery of the ice mass as it develops and also to facilitate its displacement during removal. As the droplets deposit on the ice mass, the mass separates into its two phases, ice crystal and saline solution. Because of the conical surface of the ice mass, the liquid can run downhill and outward toward the walls of the settling chamber. Accordingly, it is desirable for the ice mass to have a gap between the ice mass and the settling chamber in order for the draining liquid to run off the ice mass and into the saline solution underneath. In addition to building in a heat exchange system, using pipes and/or cavities within the chamber walls, as discussed above, a local heater can be provided in the wall of the settling chamber, at the bottom of the chamber, which can be turned on to supply just enough local heating to maintain the required gap.

FIGS. 17 and 18 show a piston that can be used to lower the ice mass, so that it can be removed from the chamber 80, wherein this annular gap can facilitate the movement of the ice mass through the settling chamber. The height of the settling chamber is preferably designed to supply the residence time to facilitate the transfer of chilling energy from the air to the seawater droplets during a period measured in seconds. However, the main separation of the ice from the saline solution occurs on the ice mass where it remains for longer time periods, ranging from minutes to hours.

E. Co-Flow Arrangement:

In addition to blowing the chilled air upward against the falling droplets, i.e., "Counter-flow," as in the systems discussed above, additional embodiments have been developed in which the chilled air is blown in the same direction as the seawater droplets, referred to as "Co-flow." The co-flow arrangement is shown in FIGS. 14-15, and 31-34. The advantages and disadvantages of both are discussed herein.

A downward flow of chilled air into the chamber is advantageous because the air is at its coldest temperature at the moment it hits the seawater, i.e., as it is being sprayed downward from the top of the chamber. This exposes the droplets to temperatures that are substantially lower than the eutectic temperature, and helps to begin the flash freezing process of the seawater quickly, which helps form ice faster. This can also help to keep the droplets from sticking together if and when they collide, as they would if the density of the droplets is too high, or the chamber size is too small.

As the droplets fall, which is a function of the height of the chamber, and begin to absorb the cold air, i.e., which in turn freezes the droplets, the air begins to warm up, so that by the time the droplets reach bottom, the air is not as cold as it was when it was introduced into the chamber, which is advantageous because it prevents the ice particles from becoming too cold, which can cause the entire brine to freeze. By keeping the temperature of the mixture at the bottom of the chamber slightly above the eutectic point, the brine is prevented from freezing completely, which, as will be discussed, will allow more of the liquid salty brine solution surrounding the ice particles to runoff and separate from the ice particles.

The downward flow of chilled air also prevents the droplets from being suspended in mid-air for too long, which can happen if the chilled air is blown against the falling droplets as in the case of the counter-flow arrangement. Exposing the droplets to chilled air for too long can make it difficult to control and accurately regulate the precise temperature in the chamber, as well as the temperature of the droplets, which is necessary to maintain a proper consistency at the bottom. For example, in many situations, the freezing state of the seawater may not be the same from one location inside the chamber to another, i.e., some ice particles may end up being exposed to the chilled air for too long, in which case they may be too cold, while others may not be exposed long enough, in which case they would not be cold enough. This problem can be amplified when the size of the droplets differ as they are emitted from the nozzles, thereby causing the droplets to freeze at different rates.

With the downward co-flow process, many of these problems can be avoided. Nevertheless, one potential downside is that by exposing the seawater droplets to a blast of chilled air in the same direction as the falling droplets, the droplets may travel too quickly to the bottom of the chamber, which means that there will be less residence time for the droplets to freeze. One solution to this problem is to use super cold chilled air that can act on the droplets quickly, to ensure that by the time the droplets reach the bottom of the chamber, they are at the proper temperature. Another is to use pre-chilled seawater to form the droplet cloud so that less time is required for the seawater droplets to freeze and/or reach the eutectic point, and therefore, less exposure time is needed.

Another is to regulate the size and flow rate of the seawater droplets, and the chilled air flow, so that the droplets do not travel as quickly down to the bottom. For example, in one embodiment, the co-flowing chilled air can be introduced into the chamber at a reduced velocity, such as at about 4 feet per second downward, such that as the droplets are introduced into the chamber, and if the droplets are small enough, they can actually decelerate in flight. This can occur because, even if the droplets are emitted at a relatively high velocity, if they are small enough, they can be significantly affected by the slower moving downward air mass, wherein, even if they start out at a velocity, of, say, about 26 feet per second, into a 14.67 psia atmosphere, they may slow down, in response to the much slower air flow.

Nevertheless, with this flow rate, the residence time of the droplet's flight in the chamber will likely be relatively short, i.e., the time it takes for the droplet to fall from the top of the chamber down to where the droplets deposit onto an ice mass at the bottom of the chamber. Whether the droplets are relatively large (up to 5,000 microns) and have a 55 ft/sec settling velocity, or small (as little as 200 microns) and have a 2 ft/sec settling velocity, the downward air flow of 4 feet per second will result in a residence time of either 0.16 seconds for the 5,000 micron droplet (10 feet÷(55 ft/sec+4 ft/sec)=0.16), or 1.6 seconds for the 200 micron droplet (10 feet÷(2 ft/sec+4 ft/sec)=1.6) in a chamber that is 10 feet tall. Accordingly, there is still the need to use super chilled air, and/or pre-cooled seawater, as discussed.

As mentioned above, residence time (the flow time during which thermal interaction and thermal exchange occurs between the seawater droplet and the surrounding chilled air flow) is one of a number of key parameters controlling the freezing of the pure water constituent of the seawater droplet and promoting separation of the resultant ice crystal particle from the residual brine. Residence time depends on the seawater droplet velocity down the desalination chamber, as well as on the desalination chamber height. The chamber height is therefore established based on the requirement that particle water freezing is completed and its separation from the residual brine is accomplished.

Consider the example wherein the turbo expander supplies airflow at 5,297 SCFM, and uses a 4 ft/sec vertical velocity in the crystallization chamber, so that the chamber has a required 5.3 ft diameter. Consider that the height of the chamber is 10 ft. The following calculation assumes a 2.5 seconds residence time. The same calculation must be performed for other residence times.

5,297 scfm airflow
   4 ft/sec vertical velocity in chamber
   240 ft/min vertical velocity in chamber
   22.1 sq ft
   5.3 ft diameter
   2.5 sec residence time
   10 ft path length (height of chamber)

It is also necessary to assure that the droplets have sufficient spacing to assure collision avoidance. In the example we have been using, and requiring the ratio of the air diameter to droplet diameter to be 16:1, the following table shows the cloud parameters inside the crystallization chamber, for both large and small droplets:

The top table below shows that for a 4 ft/sec transit velocity (of the downward chilled air flow), the 5,297 SCFM requires a chamber diameter of 5.3 feet. For a droplet size of 4,000 micron and 5,297 SCFM air flow, the spacing between droplets is 16 droplet diameters. This corresponds to a reasonable cloud description with independent flight paths. The lower table below shows the same is true for the droplet diameters of 200 microns, except that there are more of them.

| | | | |
|---|---|---|---|
| 4,917 | #/hr seawater | 4,000 | microns |
| 64 | #/cu ft seawater | 0.4 | cm |
| 76.8 | cu ft/hr seawater | 1.57E−01 | in diameter |
| 1.28 | cu ft/min sea water | 1.18E−06 | cu ft volume of droplet |
| 5,297 | scfm air | 6.40E+01 | #/cu ft |
| 16.1 | dia std air/dia seawater | 7.57E−05 | #/droplet |
| 5.3 | ft diameter chamber | 1.08E+06 | droplets per min |
| 4.0 | ft/sec air | 5297 | scfm air |
| | | 4.90E−03 | scf air/droplet |

| | | | |
|---|---|---|---|
| 4,917 | #/hr seawater | 200 | microns |
| 64 | #/cu ft seawater | 0.02 | cm |
| 76.8 | cu ft/hr seawater | 7.87E−03 | in diameter |
| 1.28 | cu ft/min sea water | 1.48E−10 | cu ft volume of droplet |
| 5,297 | scfm air | 6.40E+01 | #/cu ft |
| 16.1 | dia air/dia seawater | 9.47E−09 | #/droplet |
| 5.3 | ft diameter chamber | 8.66E+09 | droplets per min |
| 4.0 | ft/sec air | 5297 | scfm air |
| | | 6.12E−07 | scf air/droplet |

For the co-flow system, a pressure difference of 10-psid will spray a droplet into the chamber at 22.8 ft/sec. A diameter droplet diameter of 4000 micron has a settling velocity of 44 ft/sec. Thus the large droplet will spray into the chamber at a much higher velocity than the local air velocity of 4 ft/sec and tend to be momentarily accelerated from 22.8 ft/sec to 44 ft/sec. For a 10 ft path length in the air the residence time would then be about 0.25 seconds. Thus a large droplet of 4,000 microns may deposit too quickly for complete heat exchange to occur between the droplet and the chilled air, although most of the heat exchange will have occurred if a relatively high heat transfer coefficient applies. The continuous flow of the cold air over the deposited ice mass will complete the remaining heat exchange.

For the co-flow air system, a pressure difference of 40-psid will spray a droplet into the chamber at 45 ft/sec. A diameter droplet diameter of 200 micron has a settling velocity of 2 ft/sec. Thus the small droplet will spray into the chamber at a much smaller velocity than the local air velocity of 4 ft/sec and tend to be momentarily decelerated from 45 ft/sec to 4 ft/sec. For a 10 ft path length in the air the residence time would be about 2.5 seconds. Thus the small droplet will deposit on the bottom of the crystallization chamber with complete heat exchange at about minus 6 degrees F.

Another consideration that should be made in setting up the system is the fact that it may be difficult to accurately control the exact size of the seawater droplets emitted by the nozzles. Although flow rates and velocities can be accurately controlled, the actual size of the seawater droplet is not as easily regulated. Therefore, the system settings should be designed to take this into account. That is, whether the droplets are small or large, the velocity of the air mass, as well as the pressure and velocity of the droplets should be controlled so that the end result is as consistent as it can be. When the droplets are smaller, they will tend to be more affected by the air mass, and less affected by the original emission speed, and therefore, consideration must be made to account for this, i.e., the fact that they will tend to be brought down at a slower rate than a relatively large droplet. At the same time, when the droplets are larger, they will tend to be less affected by the air mass, and more affected by the emission speed, and gravity, and therefore, consideration must be made to account for the fact that they will tend to be brought down at a relatively higher rate.

In this respect, the present invention preferably contemplates that even relatively large droplets on the magnitude of up to about 4,000 to 5,000 microns in diameter can be sufficiently affected by the air flow, and therefore, the residence time can be controlled to a sufficient level. Although the rate at which each different size droplet falls to the bottom of the chamber will differ, depending on the size and mass of the droplets, and therefore, the exposure time of each different size droplet may differ, the present invention contemplates that the settings can be adapted to ensure that the droplets are exposed to the chilled air sufficiently, and when the ice particles reach bottom, they will be near the eutectic temperature, wherein the droplets will form ice crystals, coalesce and form an ice mass, and the brine salt solution will runoff properly, as will be discussed. This system also permits empirical control of the flow because one can control the flow of the chilled air so that the final conditions are as desired.

One of the goals of the system is for the final equilibrium temperature after the droplets deposit on the bottom of the chamber to be consistently at slightly above the eutectic temperature. This means that regardless of the droplet size, the condition of the circulation within the chamber should be such that it will cause the mass rate of the chilled air flow to eventually match the mass rate of the seawater droplet flow, to effect the best possible heat exchange, so that the final result will be that the exhaust air within the chamber and the accumulating ice particles will be at the ideal temperature, i.e., close to the eutectic temperature. Nevertheless, given that a perfect heat exchange is not likely, the more likely scenario is that the exhaust chilled air will be colder than the eutectic temperature, and the ice mass at the bottom will be warmer than the eutectic temperature, which is a result that is acceptable.

Of course, proper heat exchange must take into account the heat transfer coefficient for the seawater droplets, which is difficult to determine given that each droplet size might differ. Moreover, within the chamber itself, as the droplets fall, each droplet is getting colder, while the air is getting warmer, so that at each subsequent instant during the process, the heat transfer coefficient is changing. The heat transfer coefficient between the seawater droplet and the surrounding chilled airflow is a critical parameter controlling the freezing of the pure water constituent of the seawater droplet and its separation from the residual brine. The heat transfer coefficient is a function of the diameter of the seawater droplet and its density, the density of the chilled air, the temperature of both, the chilled air and the water droplet, the relative velocity between the seawater droplet and the surrounding chilled airflow, and the residence time of the seawater droplet within the surrounding airflow. The values of these parameters will change along the droplet flow path, and so will the resultant heat transfer coefficient.

The table in FIG. 35 shows that the large 4,000-micron droplet will have a core temperature between minus 56.6 degrees F. and plus 8.59 degrees F. in a flight of 0.2 seconds, depending upon the heat transfer coefficient. The heat transfer coefficient is likely closer to the 50 BTU/(HR SQFT F) value. The small 200-micron droplet will have a core temperature between minus 120.8 degrees F. and plus 39.9 degrees F. in a flight of 0.2 seconds, depending upon the heat transfer coefficient. The heat transfer coefficient is likely closer to the 50 BTU/(HR SQFT F) value. Thus it can be expected that the droplets, large and small, will be between minus 56.6 degrees F. and minus 120.8 degree F., although this is not likely to happen since the temperature of the chamber is warmer near the bottom, so that the assumption of a constant minus 121 degrees F. air temperature is false. What the calculation is meant to show, however, is that a 4 second flight time in the crystallization chamber should permit the complete mixing of the air and the droplets so that the final equilibrium temperature of the air will approach somewhat cooler than minus 6 degrees F. and the droplets will approach slightly warmer than minus 6 degrees F. when deposited on the bottom of the crystallization chamber. Thus, the end result in the desalination process is that the entry droplets smoothly decrease their temperature to slightly above minus 6 degrees F. and the air is warmed smoothly to less than minus 6 degrees F.

It should be clear that the smallest droplets will likely freeze across their entire volume relatively quickly, given that the chilled air is coldest at the top of the chamber, wherein there is not likely to be a delay in converting the liquid seawater to a solid. Although it is not desirable for the droplets to become too cold, this is acceptable given that by the time the frozen droplet reaches the bottom of the chamber, the temperature of the air, and of the ice mass, will be such that the droplet will warm back up again to slightly above the eutectic point, thereby avoiding the freezing of salt crystals, and allowing for the salt brine solution to adequately runoff, rather than being trapped within the ice mass.

In the case of larger droplets, however, the droplets will be more affected by the differences in temperature from the top to the bottom. Moreover, with larger droplets, there is a greater variance in how the droplet itself will freeze. That is, as far as exposure to cold temperatures is concerned, the larger droplets will be exposed to the coldest temperature from the outside in, i.e., the outside of the droplet will become colder faster than the inside of the droplet. On one hand, this might indicate that the salt will tend to be forced toward the center, while the fresh water on the outside might begin to freeze. On the other hand, studies have shown that when the water droplet reaches a certain temperature across its volume, the fresh water within the droplet actually freezes in the center first, and the more concentrated salt brine solution attaches itself to the outer surface of the ice crystal.

Other studies indicate that large droplets will freeze from the outside, forming an outer ice shell. As the shell thickness grows inward due to further freezing, it increases the pressure within the central liquid core, thus resulting in cracking and fragmenting of the brittle ice shell. The liquid brine then flows to the outside of the ice shell as the freezing continues the inward growth of the ice. The inner liquid core then coats the outside of the frozen fresh water droplet. The net conclusion is that for large droplets the inner liquid core containing salt will flow to the outside of the frozen particle of fresh water ice and will deposit on other similar configurations of ice particle coated with liquid brine. The attachment of these frozen spheres produces a porous structure that allows the liquid brine to drain down from the deposited mass and drain through a perforated surface to a collection pan.

Although pure water freezes at 0 degrees C., the freezing point can be lowered by dissolving salt into the water. Then, if the mixture is cooled to below the new freezing point, water crystals will begin to form. As a result, the remaining salt solution becomes further concentrated, until the salt saturation point is reached. This intersection of the freezing point line and the saturation point line is referred to as the eutectic point, as shown in FIG. 6. Below the eutectic point, salt crystals will be formed in addition to the ice crystals, although in forming the final ice mass, the present invention preferably operates above the eutectic point, to avoid the formation of salt crystals.

When the solution freezes, the water molecules tend to form the most stable crystal arrangement if there are no foreign particles present. When a solution containing minerals is cooled to the freezing point, the water molecules begin to form ice crystals that tend to exclude particles that are unlike the water molecules. For example, as saltwater freezes, salt is excluded because salt has a different crystalline structure than water. This is sometimes called brine rejection. Salt forms cubic crystals (with four sides), whereas ice is hexagonal, or six-sided. Among all the molecules in a volume of cold, salty water, there are instances of water molecules that are next to each other, away from any of the $Na^+$ or $Cl^-$ ions. These tend to stick together, while those molecules with $Na^+$ or $Cl^-$ ions will be less likely to stick, or to stay stuck. This produces fresh water ice crystals, which separate from the slightly saltier liquid water. There are 13 different crystal formations of frozen water depending upon the extent of the cold temperature. Some of the crystal formations are quite porous and will permit liquids to flow through the open channels that are formed.

At room temperature, liquid water becomes denser as the temperature is lowered, just like other substances. But at 4 degrees C., just above freezing, water reaches its maximum density, and then, as the water cools further toward its freezing point, the liquid water, under standard conditions, expands to become less dense. The physical reason for this is related to the crystal structure of ordinary ice, known as hexagonal ice. This special property of water is put to good use in the process of the present invention. As salt crystals form near the eutectic point, they sink to the bottom of a solution while the ice crystals rise to the surface. The result of the process is a separation by physical means, allowing the two components of the solution to be readily isolated.

Figure 14:
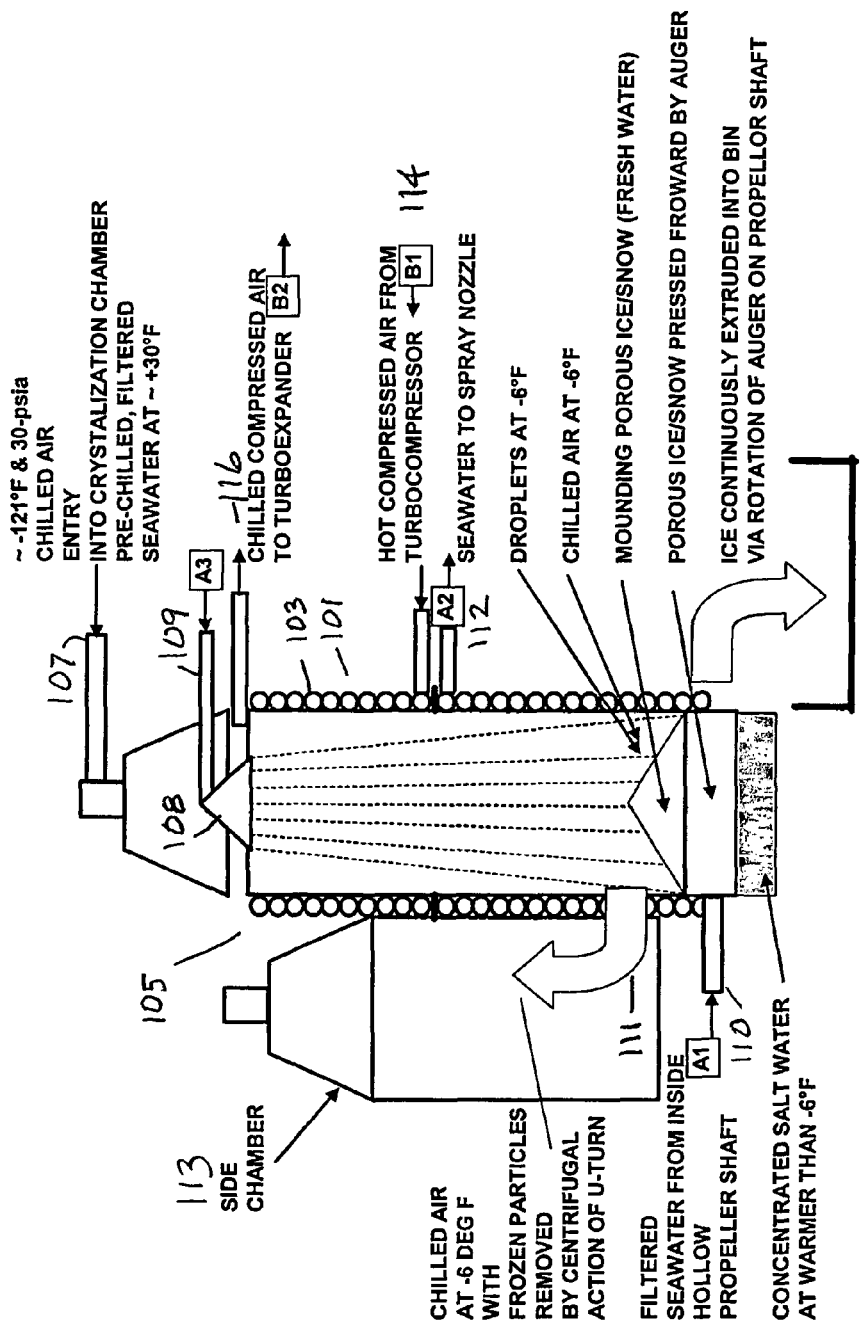
FIG. 14 shows a section view of the main mixing chamber with pipes and/or cavities extending around the walls thereof for circulating seawater and/or heated compressed air or water through the chamber walls.
Figure 15:
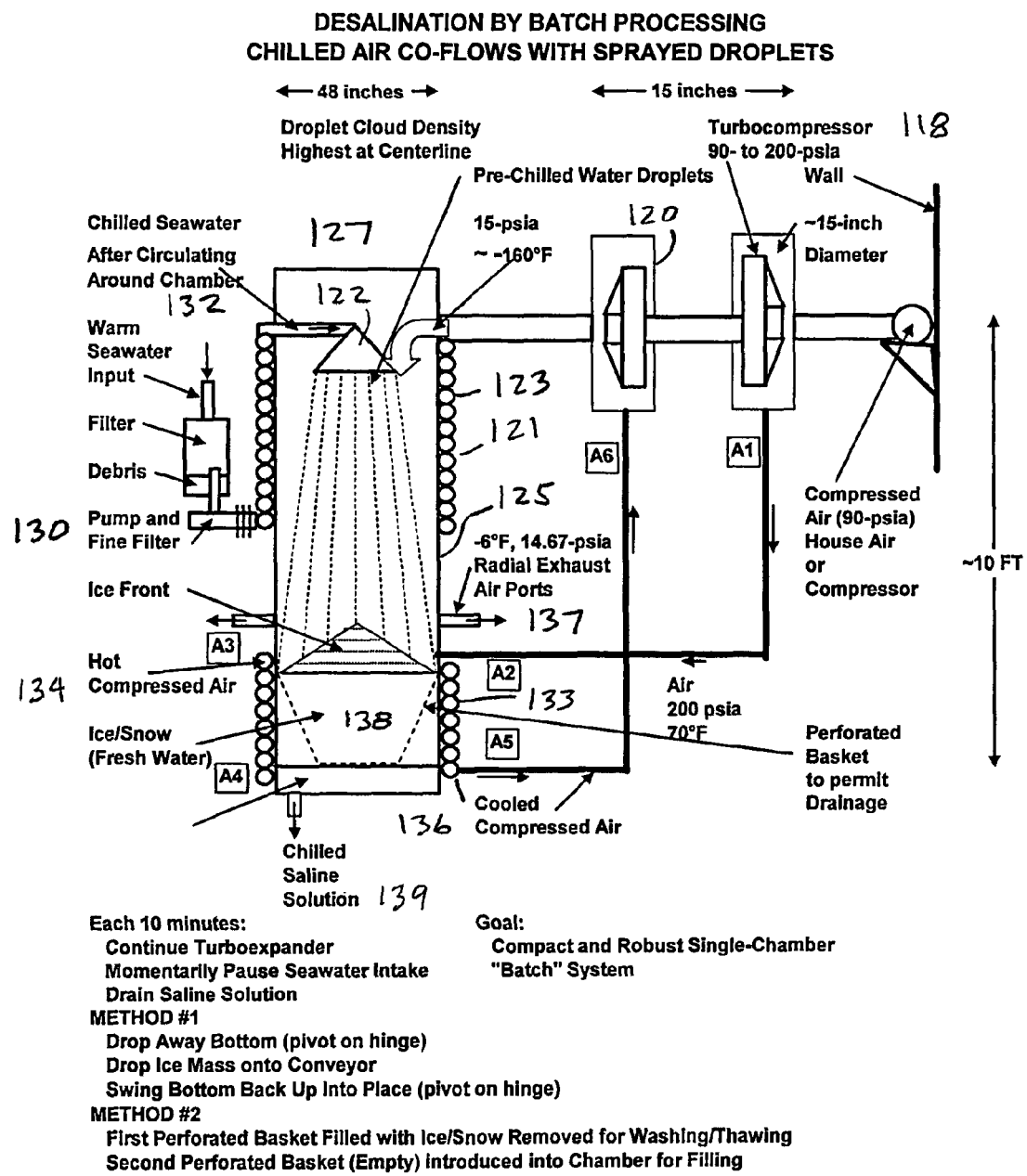
FIG. 15 shows a section view of the main mixing chamber with chilled air being injected from the top of the main chamber, referred to as "co-flow."

In the downward Co Flow process shown in FIGS. 14 and 15, the chilled air is preferably maintained at an extremely low temperature, such as at about minus 168 degrees F. with about 14.67-psia discharge pressure. The preferred range is between minus 135 degrees F. and minus 175 degrees F. A one-stage turboexpander will generate minus 135 degrees F. whereas a two-stage turboexpander will generate minus 175 degrees F. This chilled air preferably contacts the seawater droplets which are injected at a reduced temperature as well, such as about 30 degrees F. to 40 degrees F., at the top of the crystallization chamber 101. As the mixture of chilled air and seawater droplets move downward in the chamber 101, the chilled air is warmed by the seawater droplets and the seawater droplets are chilled by the co-flowing surrounding air. The mass flow of the chilled air and the mass flow of the seawater droplets are designed to result in a final equilibrium temperature of slightly warmer than minus 6.2 degrees F., the eutectic temperature for saltwater. Nevertheless, because perfect heat exchange is not likely to occur, for reasons discussed above, it is likely that the chilled air that is cycled out of the chamber is colder than the eutectic temperature, and that the droplets are slightly warmer than the eutectic temperature, which is desirable.

There may be a time delay before freezing can set in. It is assumed that the system will be adapted such that the injected seawater can be reduced to close to minus 6 degrees F. by the time it reaches bottom, within a residence time of less than 2.5 seconds. Some will freeze sooner, and others may need the entire 2.5 seconds, but the system is preferably adapted so that as the droplets collect at the bottom, the residual temperature of the droplets and resulting ice mass will be slightly above minus 6 degrees F. Much of the heat exchange process will have occurred before the droplet formation can freeze completely. Another advantage of the co-flow system is that the crystallization chamber can be made smaller, since the droplets will freeze faster.

In FIGS. 14 and 15, examples of the co-flow desalination system of the present invention are shown. FIG. 14 shows a section view of the main chamber 101 with pipes 103 and/or cavities extending around the walls 105 thereof for circulating seawater and/or heated compressed air through the chamber walls. The warmer temperature of the seawater and/or heated air from the compressor helps to keep ice from collecting on the walls of the chamber, and regulate the temperature inside the chamber, to help maintain a more consistent temperature inside the chamber. Seawater that has been filtered, for example, can be introduced into the pipes 103 and/or cavities at the bottom 110, such that it circulates upward and around through the lower half of the chamber walls, and can exit at near a mid-point 112, where the pre-chilled seawater can be distributed upward, to nozzles 108, for introduction into chamber 101. Heated air from the turbo compressor can be introduced into the pipes 103 and/or cavities at about the mid-point 114, such that it circulates upward and around through the upper half of the chamber walls, and can exit at the top 116, wherein the cooled air can be distributed back to the turbo expander, to help keep the compressed air cool.

The heat transfer from the cold temperature inside the chamber to the pipes and/or cavities surrounding the chamber helps to cool the seawater and/or heated air, which helps to pre-cool the seawater before it is sprayed into the chamber, and/or pre-cool the heated air before being chilled by the turbo expander and introduced into the chamber. Preferably, much of the pre-cooling of the seawater and heated air occurs when it is in the pipes and/or cavities and there is thereby an excellent means of transferring heat. The location of the seawater and/or heated air pipes and/or cavities can be modified, i.e., the seawater can be circulated through the entire chamber, or the upper half, and/or the heated air can be circulated through the entire chamber, or the lower half, depending on the needs of the system.

Chilled air from the turbo expander is preferably directed downward and introduced into the chamber 101 from above, at the top 107 of chamber 101. The temperature, pressure and flow rate of the chilled air is preferably predetermined, and is a function of the factors that are discussed herein. Pre-chilled seawater that has been filtered and circulated through the chamber walls is preferably introduced into the chamber through a set of one or more nozzles 108, to form a spray of seawater droplets, such as in the form of a droplet cloud. This is preferably injected into the chamber from above, from the top 109 of the chamber. The temperature, pressure and flow rate of the seawater droplets is preferably predetermined, and is a function of the factors that are discussed herein.

This configuration enables both the chilled air and seawater droplets to be introduced in the same direction into the chamber 101, and circulated, wherein the droplets can be cooled by the chilled air through heat exchange within the chamber. The nozzles 108 are preferably designed to distribute the droplets toward the center, such that the ice particles are kept away from the chamber walls, and so that the ice mass tends to form in the center of the chamber, such as in the form of an inverted cone shape. In the embodiment of FIG. 14, the exhaust chilled air is allowed to exit chamber 101 through a lower exit point 111, into side chamber 113, which allows the chilled air to circulate downward through the chamber 101, wherein the exhaust chilled air can then be used for other cooling purposes, such as air conditioning. This embodiment is intended for use with a continuous extrusion rotating auger that helps remove the ice mass from the bottom of the chamber. The bottom of the chamber is adapted to allow the concentrated salt brine to be collected and then removed, wherein the ice mass will form above the salt brine, and float thereon due to the lower density of the ice, and the higher density of the brine.

FIG. 15 shows a section view of the co-flow and batch ice removal system, wherein chilled air is injected from the top of the main chamber. FIG. 15 shows a section view of the main chamber 121 with pipes 123 and/or cavities extending around the walls 125 thereof for circulating seawater and/or heated compressed air through the chamber walls. This embodiment shows compressed air being generated by turbo compressor 118, and a turbo expander 120 for releasing and expanding the compressed air, wherein the chilled air is introduced into chamber 121 at the top. Additional compressors, and heat exchangers, etc., as discussed before, can also be provided.

The warmer temperature of the seawater and/or heated air from the compressor helps to keep ice from collecting on the walls of the chamber, and regulate the temperature inside the chamber, to maintain a consistent temperature inside the chamber. Seawater that has been filtered, for example, can be introduced by a pump into the pipes and/or cavities at the mid-point 130, such that it circulates upward and around through the upper half of the chamber walls, and can exit near the top, at point 132, where the pre-chilled seawater can be distributed to nozzles 122, for introduction into chamber 121. On the top of the main chamber, seawater is preferably circulated through the upper pipes 123 extending around the chamber 121, wherein the relative warmth of the seawater helps to prevent ice from collecting on the chamber walls 125. Likewise, as the seawater circulates, it is pre-cooled by heat transfer with the cold chamber walls 125 before it is released into the main chamber 121 via the nozzles 122. Although the seawater droplets are cooled and frozen using the interaction with the chilled air, a significant portion of the seawater temperature drop can be achieved by passing the seawater through the tubes 123 surrounding the chamber 121.

Heated air from the turbo compressor 118 can be introduced into pipes 133 and/or cavities at a low point 134, such that it circulates downward and around through the lower section of the chamber walls, where the ice mass collects, and can exit at the bottom 136, wherein the cooled compressed air can be distributed back to the turbo expander 120, to help keep the compressed air cooler. In this respect, pipes 133 are preferably adapted to maintain the compressed air in its compressed state, which allows the actual air that is expanded by turbo expander 120 to be pre-cooled, so that the resultant chilled air can be made even colder. Heated compressed air from the turbo compressor 118 helps keep the ice mass from sticking to the chamber walls. As the air circulates, it is cooled by heat transfer from the chilled chamber walls, wherein the pre-cooled air is then circulated to turbo expander 120, wherein the air is super cooled and introduced into main chamber 121 to freeze the seawater droplets.

The heat transfer from the cold temperature inside the chamber to the pipes and/or cavities surrounding the chamber helps to cool the seawater and/or heated air, which helps to pre-cool the seawater before it is sprayed into the chamber, and/or pre-cool the compressed air before being released and chilled by the turbo expander and introduced into the chamber. Preferably, much of the pre-cooling of the seawater and heated air occurs when it is in the pipes and/or cavities and there is thereby an excellent means of transferring heat from the seawater and heated air into the chamber walls and chamber air. The location of the seawater and/or heated air pipes and/or cavities can be modified, i.e., the seawater can be circulated through the entire chamber, or the lower section, and/or the heated air can be circulated through the entire chamber, or the upper half, depending on the needs of the system.

Chilled air from the turbo expander is preferably directed downward and introduced into chamber 121 from above, at the top 127 of chamber 121. The temperature, pressure and flow rate of the chilled air is preferably predetermined, and is a function of the factors that are discussed herein. Pre-chilled seawater that has been filtered and circulated through the chamber walls is preferably introduced into the chamber through a set of one or more nozzles 122, to form a spray of seawater droplets, such as in the form of a droplet cloud. This is preferably injected into the chamber from above, from the top 127 of chamber 121. The temperature, pressure and flow rate of the seawater droplets is preferably predetermined, and is a function of the factors that are discussed herein.

This configuration enables both the chilled air and seawater droplets to be introduced in the same direction into chamber 121, and circulated, wherein the droplets can be further cooled by the chilled air through heat exchange within the chamber. The nozzles 122 are preferably designed to distribute the droplets toward the center, such that the ice particles are kept away from the chamber walls, and so that the ice mass tends to form in the center of the chamber, such as in the form of an inverted cone shape. In this embodiment, the exhaust chilled air is allowed to exit chamber 121 through one or more air ports 137, which allows the chilled air to circulate downward through chamber 121, wherein the exhaust chilled air can then be used for other cooling purposes, such as air conditioning. The bottom of the chamber is adapted to allow the concentrated salt brine to be collected and then removed, through vent 139, wherein the ice mass will form on top of the salt brine, and float thereon, due to the lower density of the ice, and the higher density of the brine.

A basket 138 can be provided at the bottom so that the ice mass can easily be removed from the chamber without having to stop the system. In this respect, the bottom of the chamber 121 is preferably adapted with an opening so that basket 138 can be removed, wherein the ice mass can then be thawed to produce fresh drinking water. Alternatively, the bottom of the chamber 121 can be designed to have a drop down door, such as with a hinge, such that without having to stop operating the system, the door can be lowered, to allow the ice mass, and any remaining collected brine, to be removed from chamber 121. In such case, there is preferably a conveyor system under chamber 121 which allows the ice mass to be transported to where it can be thawed and melted to produce fresh drinking water.

In FIGS. 31-34, the desalination system 40 of the present invention is preferably adapted to remove salt and other impurities from seawater 60. In this embodiment, the desalination system 40 preferably comprises a crystallization chamber 41, which can be used to remove salt and other impurities, wherein purified water can be produced thereby. The crystallization chamber 41 is preferably an insulated container specially adapted to maintain cold temperatures inside, and to allow seawater 60 and chilled air 50 to be introduced and mixed therein, as well as ice and concentrated brine to form at the bottom. The crystallization chamber 41 can be similar to those disclosed in U.S. provisional application Nos. 60/789,415, filed Apr. 5, 2006, 60/794,190, filed Apr. 21, 2006, and 60/832,777, filed Jul. 24, 2006, which are all incorporated herein by reference.

The desalination system 40 preferably injects seawater 60 into the crystallization chamber 41, preferably in the form of a mist, or spray 62, wherein the chilled air 50 from the turbo expander is preferably introduced into the chamber 41, thereby exposing the mist or spray 62 to very cold air. This causes the seawater droplets 62 to be super chilled, and flash frozen, thereby forming super cooled ice particles 63 that drop onto the bottom 64 of the chamber. The seawater droplets 62 are preferably but not necessarily introduced at the top 65 of the chamber, and the chilled air 50 is either 1) introduced near the middle of the chamber and directed upward, or 2) introduced into the chamber from above, which creates a down draft, which forces the seawater droplets 62 down to the bottom faster. The factors that determine which to use depends on how quickly the seawater needs to be frozen, which is dependent on how cold the seawater 60 is before it enters chamber 41, how cold the chilled air 50 is, the size of the chamber 41, how the seawater droplets are exposed to and circulate with the chilled air, and the amount of each that is being introduced, etc.

The freezing of the seawater 60 preferably enables buoyant pure water ice particles 63 to be formed, with trace amounts of salty brine 67 adhering thereto, with the objective being to leave behind the salt and other impurities in the salty brine 67, at the bottom 64 of the chamber 41. The desalination system 40 preferably removes the ice particles 63 from the salty brine 67, which is denser than the ice particles 63, so that gravity can help separate the brine 67 from the ice particles 63, and cleans the ice particles 63, in one of at least two ways.

First, the ice particles 63 can form a large ice mass 66, by allowing the ice particles 63 to accumulate at the bottom of the chamber 41, i.e., as they fall on top of each other. Over time, as the ice particles 63 fall and they stick together, they will collectively form an ice mass 66, which will tend to float on top of the salty brine 67, which is denser than the ice mass 66. In this respect, preferably, the system is adapted so that ice particles 63 will form a conical shape ice mass 66, by introducing seawater droplets 62 into the center of the chamber 41, wherein ice particles 63 formed thereby will also accumulate in the center of the chamber. This advantageously enables the salty brine 67 that encapsulates or adheres to each pure water ice particle 63 to run down the sides, rather than being trapped inside ice mass 66 i.e., in pockets or crevices that might otherwise form on mass 66 as it solidifies. By forming a cone shaped ice mass 66, the brine 67 that adheres to each ice particle 63 will simply run off down the sides, rather than being trapped in mass 66, so that salty brine 67 can be effectively separated from ice mass 66 as needed. On the other hand, studies have shown that the ice mass that forms may form channels and voids throughout the mass so that any accumulated salt brine 67 could simply pass through the mass, via the channels and voids, without being trapped in the mass. The ice mass, in this respect, looks more like snow, and forms a porous mass that allows the brine to pass through. The ice particles that are formed and fall onto the ice mass are typically at about minus 6 degrees F.

Figure 31:
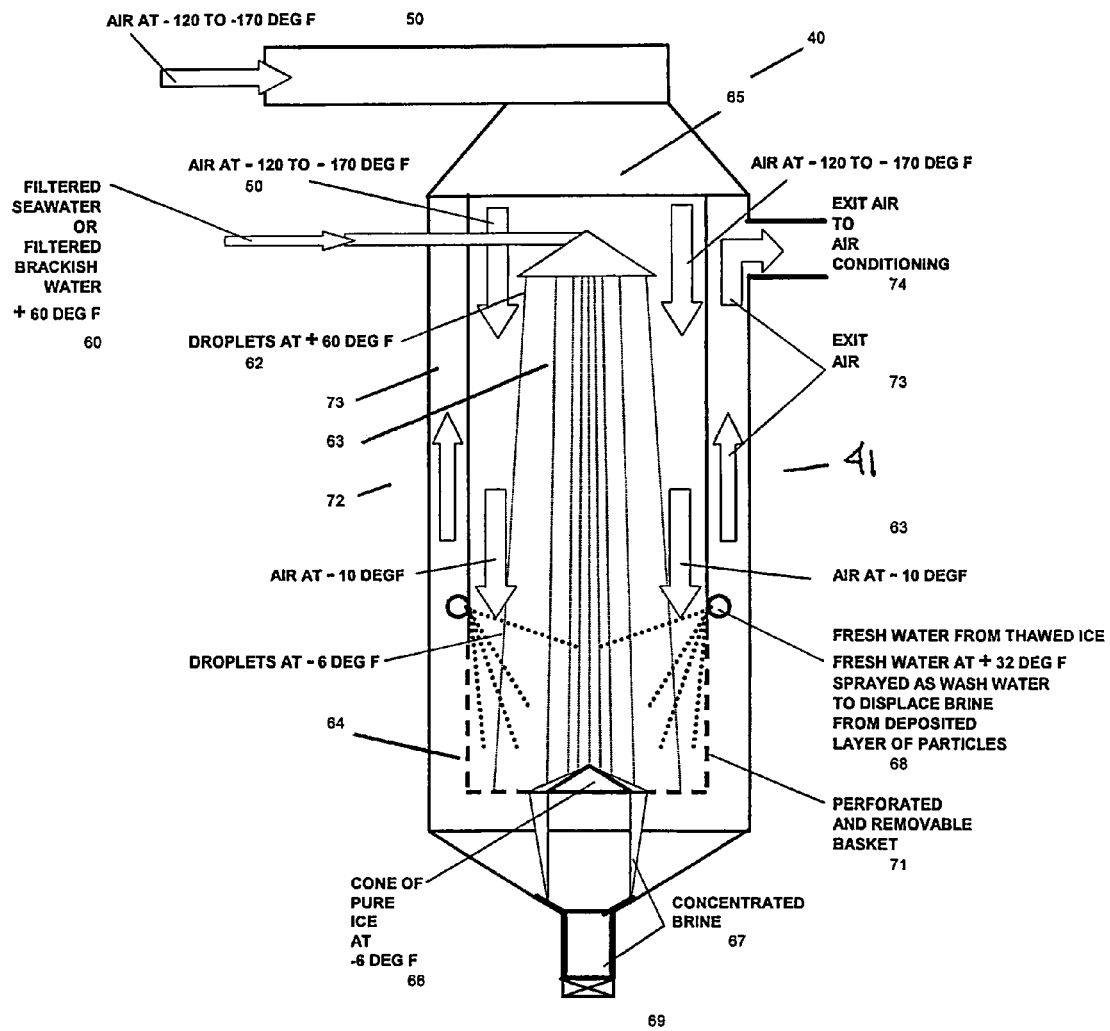
FIG. 31 shows a schematic of the desalination system with a crystallization chamber that uses chilled air to freeze particles of seawater injected into the chamber as a mist or spray, wherein the chilled air is introduced from above, referred to as co-flow.

The embodiment also preferably has means for rinsing the ice mass 66 with fresh water, and by allowing the mass 66 to melt, fresh water can be produced. In this respect, as shown in FIG. 31, additional fresh water at room temperature, such as at 60 degrees F., can be sprayed down from nozzles 68 onto ice mass 66 to serve as a wash column, which helps to remove the salty brine 67 from the ice mass 66 as the mass forms. The majority of salt brine 67 is displaced from the spaces between the ice particles 63 by gravity flow. For further removal of the brine that attaches itself to the surface of each ice particle 63, there is preferably an injection of fresh water on the layer of ice/brine deposited at the base of crystallization chamber 41 to assist the gravity drainage of the salty brine 67 on a layer-by-layer basis. This fresh water freezes as it attaches to each layer and further displaces the very thin viscous salty brine layer from the interstices between the ice particles 63. The fresh water that is frozen on the ice particles is later thawed and preferably recovered for re-use without use of additional fresh water. If even higher purity water is required, a downstream wash column can be added.

Note that water spray can be introduced to assist in enhancing the gravity drainage of the salt brine 67 as a form of pre-wash. Because of surface tension, there may be some undesirable dissolved minerals and impurities that are attracted to the surface of the ice crystals, and therefore, it may become necessary to wash the ice mass with fresh water, such that it freezes onto the ice mass, and in the internal channels and voids within the ice mass, as it releases the minerals and other impurities from the external and internal surfaces of the mass. The water preferably freezes onto the layer of frozen ice particles 63 that are coated with brine, and, as the particles collect on the ice mass 66, they displace the high viscosity brine from the surface of the ice particle 63 and allow the salt brine 67 to flow to the outer surface of ice mass 66. The salty brine 67 is preferably drained out of the bottom of chamber 41, through a drain 69, as shown in FIGS. 31 and 32.

The bottom section 64 of the chamber 41 preferably comprises a perforated basket 71, which is able to catch the falling ice particles 63, to form ice mass 66 thereon, but which allows the chilled air to circulate out of chamber 41. In this respect, the side walls 72 of chamber 41 preferably has channels or spaces 73 through which the excess chilled air can flow, wherein the excess chilled air preferably travels out through an exit port 74, shown in FIG. 32, wherein the chilled air can then be distributed to the air conditioning system and used as chilled air.

Figure 32:
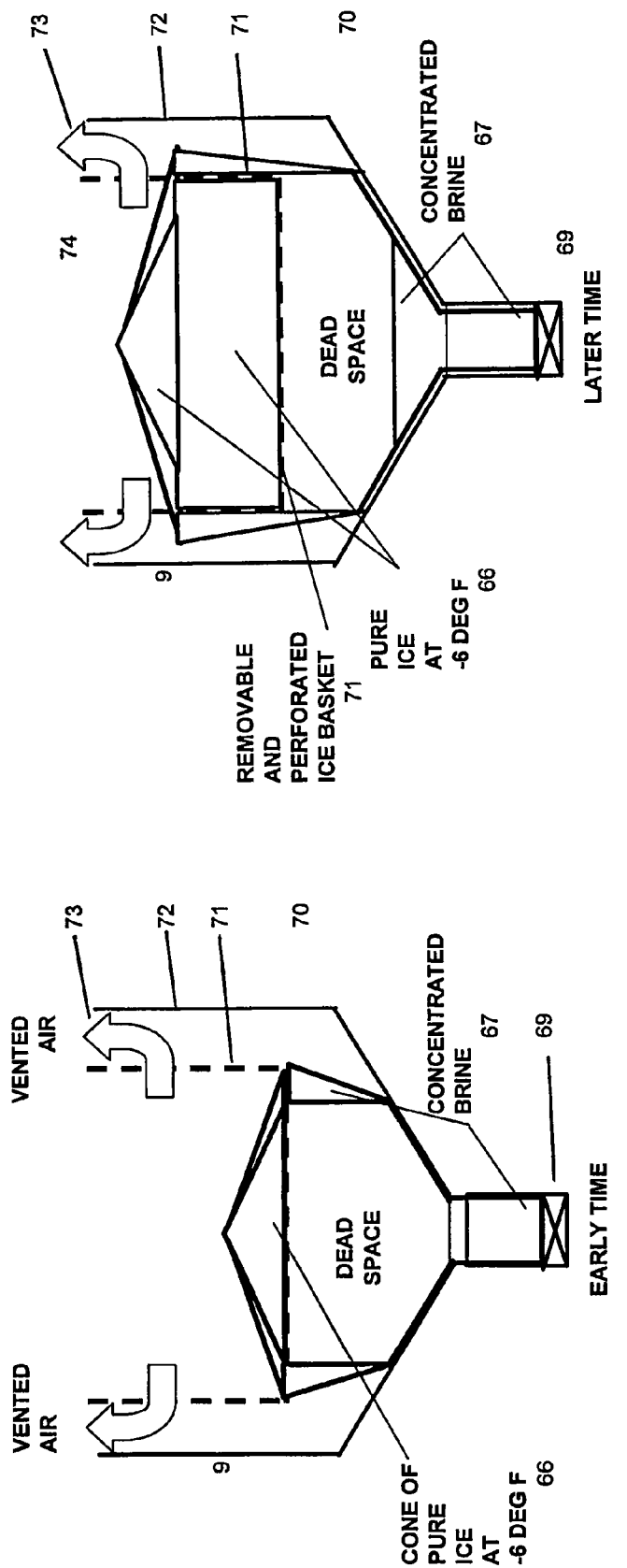
FIG. 32 is a schematic of the desalination system shown in FIG. 31, showing how the ice particles build up at the bottom of the chamber to form an ice mass, where a perforated basket is used to remove the ice.

The right hand side of FIG. 32 shows how the ice particles 63 form at the bottom of basket 71, to from a larger ice mass 66, or, in some cases, a slurry 74, wherein the perforations in the basket allow the salty brine 67 to pass through, leaving behind the pure water ice particles 63 in basket 71. Then, by removing the basket 71, the pure water ice mass 66 and/or slurry 74 can be removed from chamber 41.

Figure 33:
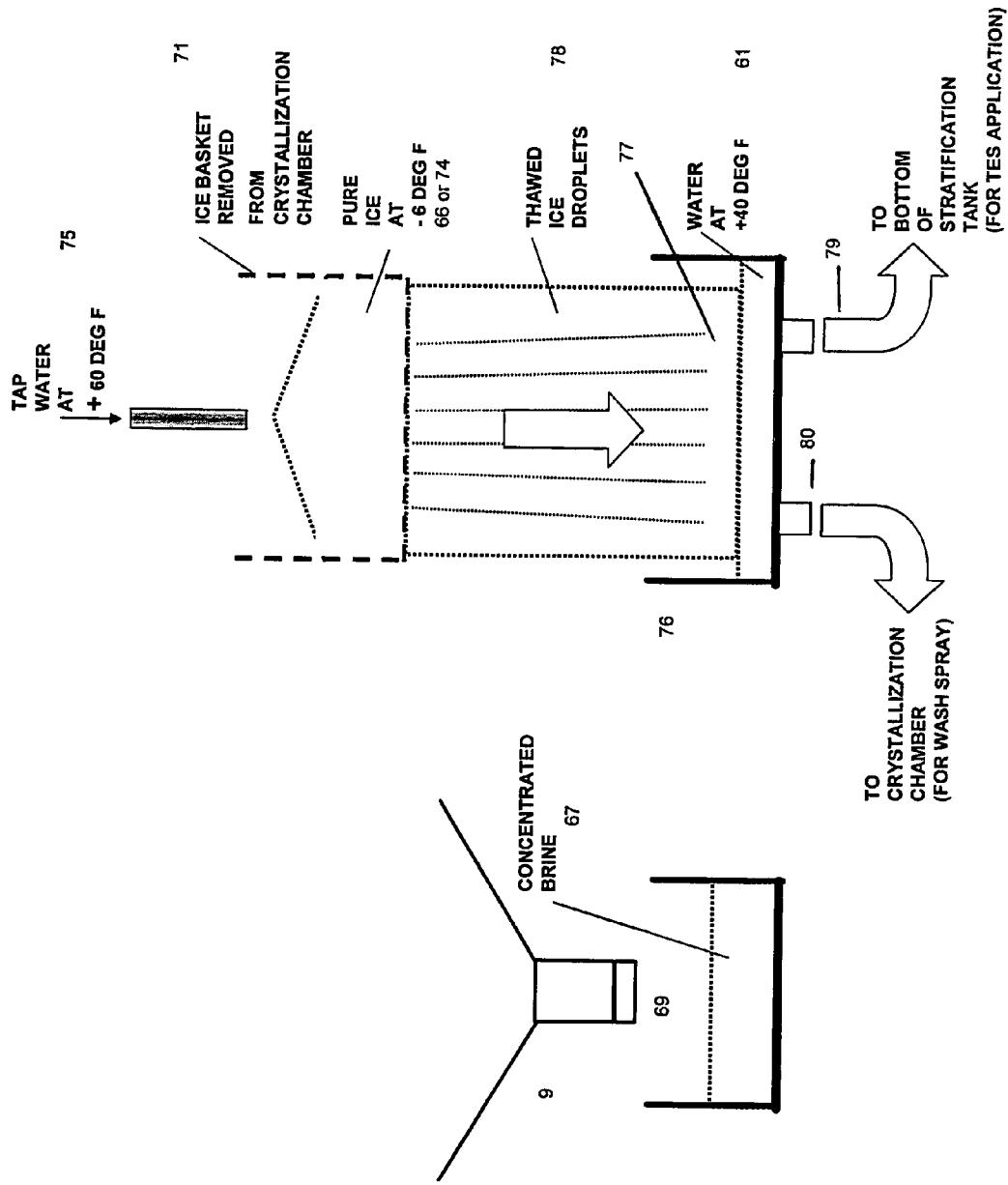
FIG. 33 is a schematic of the desalination system shown in FIG. 31, showing how the ice particles can be removed from the chamber, and melted using a wash column in a holding tank.
Figure 34:
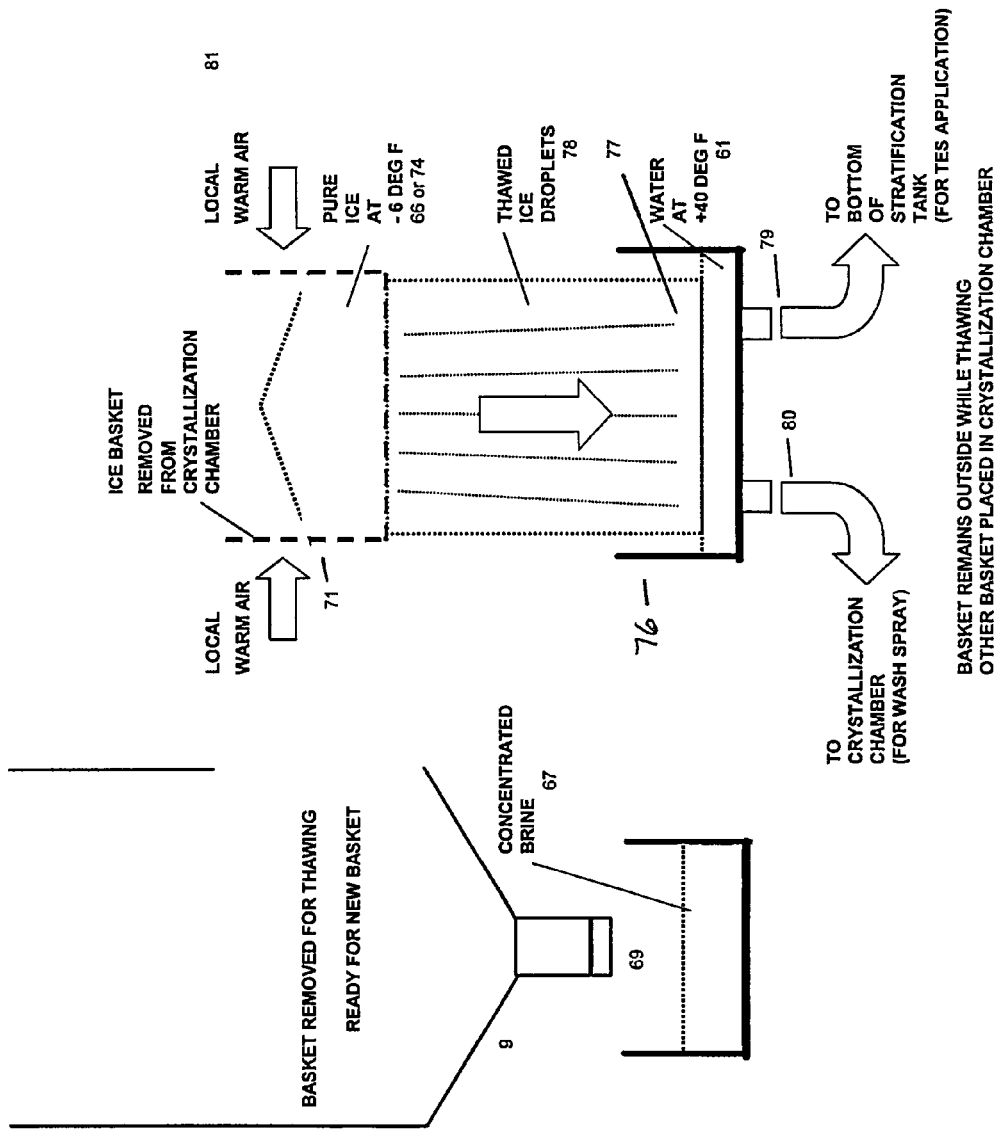
FIG. 34 is a schematic of the desalination system shown in FIG. 31, showing how the ice particles can be removed from the chamber, and melted using local warm air, where a perforated basket is used to remove the ice.

The ice mass 66 of ice particles 63 which is removed with basket 71 can then be melted, to produce fresh water at the bottom of a holding tank 76, as shown in FIG. 33. As shown, fresh water 75 at relatively warm temperatures, in this case, at plus 60 degrees F., can be sprayed down like a wash column onto the ice particles 63, to rinse the ice, and cause the ice to melt. As shown in FIG. 34, local warm air 81 can also be brought into holding tank 76, to further assist in melting the ice particles 63. As the ice melts, the fresh water droplets 78 pass through the perforations in basket 71, and collect at the bottom 77 of holding tank 76, in the form of chilled fresh drinking water. More than one basket 71 can be used so that the desalination and melting processes do not need to be interrupted while removing each basket 71 from chamber 41.

Because the ice mass 66 is made of ice, and therefore, is cold, the fresh water that is produced when it melts will be chilled water. The ice is preferably at about minus 6 degrees F., and by passing water at about 60 degrees F. over the ice, the resultant fresh water is preferably at about 40 degrees F. From there, the fresh chilled water can be distributed for drinking purposes, or through outlet 79 to a separation tank, and stored there for later use by the air conditioning system, or, through outlet 80 to be re-circulated back to the crystallization chamber 41 to be used as the spray 68 for the wash column, or spray 75 in holding tank 76. In either case, the water can be used for secondary purposes, including providing cooling for an air conditioning system, or washing the ice particles 63 in the crystallization chamber 41, before the water is cycled back to be distributed as fresh drinking water 52.

Thus the desalination system has means for separating the ice particles 63 from the salty brine 67, to make sure that any left over salt or other impurity are removed from the ice particles. For example, these ice particles 63, which are preferably cooled to about minus 6 degrees F., to assure the formation of the solid ice phase and liquid brine phase, are preferably distributed into holding tank 76, or other container, and sprayed by or otherwise mixed with additional fresh water 75, such as water that had previously been purified by the system (which can be at room temperature), and then allowed to melt. By mixing the super cooled ice particles 63 with the additional water 75 at room temperature, the system is able to produce very cold fresh drinking water, i.e., at or near freezing temperatures.

F. Heat Exchange Built into Chamber Walls:

In the preferred embodiment, the chamber walls are preferably heated with the indrawn warm seawater and/or heated compressed air from the compressor, to keep ice from collecting on the walls, and the ice mass from sticking thereto. This way, when the ice mass is of a sufficient size, it can be removed easily from the chamber and allowed to melt in a warm ambient environment to produce pure water, i.e., in a batch process.

In the preferred embodiment, the chamber walls are preferably adapted with pipes and/or cavities such that the indrawn seawater and/or heated air from the compressor can be passed through the chamber walls. This effectively serves as a heat exchanger which not only keeps the chamber walls relatively warm to 1) prevent the ice from collecting on the walls, 2) prevent the ice mass from sticking thereto, and 3) helps regulate the temperature in the chamber, but it also helps to reduce the temperature of the seawater before it is introduced into the chamber, and cool the compressor. This dual heat exchange effect enables both the temperature of the chamber and the seawater to be regulated without having to use any extra energy. The pipes are preferably extended around the chamber to increase energy transfer efficiency between the seawater and/or heated air, on one hand, and the chamber, on the other hand. A cavity can also be used, which is essentially a space between an inner wall, and an outer wall, i.e., the chamber can be made with a double wall, so that seawater and/or heated air can be passed through the inside of the wall. This improvement that can be used in connection with the batch process and relates to the use of pipes and/or cavities around the chamber walls, which helps regulate the temperature in the chamber, but also the temperature of the seawater and/or air passing through the pipes.

G. Ice Mass Formation:

As the ice particles form and drop to the bottom of the chamber, they preferably begin to coalesce and form an ice mass, which has the appearance of snow, more than an ice block, on top of the collecting salt brine. This ice mass has relatively low density due to numerous air channels and voids therein, and the porous nature of its formation. The density of this mass is typically in the range of 0.5 to 0.6 g/cc, (recall that fresh fallen snow has a density of <0.1 g/cc) which is almost half that of pure ice. A careful inspection of the mass reveals that it looks more like snow, and has a network of channels and voids which allows any excess brine collecting on the ice particles to easily runoff and be drained through the mass and into the brine collection. And by keeping the ice mass, and the chilled air flow around the air mass, at somewhat warmer than the eutectic temperature, the salt brine that attaches to the ice crystals can easily be washed away, i.e., they won't form solid salt crystals.

As the ice mass grows, a consistent flow of the brine solution will continue to flow and drain down through the channels, voids and pores, to enable the brine to be further removed, and the ice mass to be further purified. In this respect, it is worth noting that the actual ice mass of fresh water itself will remain at about 0 degrees C. or 32 degrees F. due to the significant amount of heat generated that is associated with the phase change.

Figures 23, 24, 35:
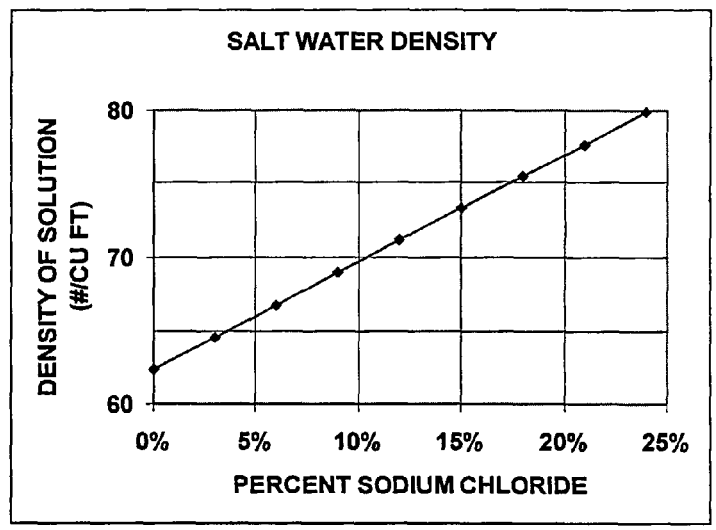
FIG. 23 shows density variations for water and ice as a function of temperature.
FIG. 24 shows density variations for saltwater as a function of percentage of sodium chloride.
FIG. 35 shows a chart of centerline water droplet temperatures with a residence time of 2.0 seconds (200 and 4 k micron).

At first, due to the density difference between the freezing seawater droplets, and the seawater at the bottom of the chamber, the ice particles will begin to float. As shown in FIG. 23, when the liquid water forms ice, there is about a 9% drop in density, and, when the higher salt concentrations of liquid seawater at near eutectic conditions causes the ice to form, there is a 71% drop in density and the ice becomes strongly buoyant for a faster separation. Note that the salt water solution at 24% concentration is 80 pounds per cubic feet. In such case, the ice readily separates from the saltwater solution. FIG. 24 shows density variations for saltwater as a function of percentage of sodium chloride.

After sufficient time has passed for the ice particles to accumulate, and the ice mass to form, which, in one embodiment under consideration, is two hours, but can also be as short as 10 minutes, or less, the very small ice crystals begin to float to the top of the dense saline liquid and coalesce to form an ice mass. But as the newly arriving droplets repeatedly land on the ice mass, the mass can form a rough upper surface, with small hills and valleys. This can cause additional droplets falling onto the middle of the block to separate into saline droplets and ice crystals inside the valleys. If the ice mass was solid, this could cause some of the liquid saline droplets to be suspended and trapped in the ice block, because the ice mass typically forms with channels and voids therein, the brine solution tends to seep down through the mass, and into the brine collection.

Nevertheless, to ensure that more of the ice particles tend to form in the center, the nozzles can be positioned with a dense cluster pattern closer to the settling chamber centerline, as shown in FIGS. 17 and 18. The ice buildup will then occur preferentially toward the center of the chamber, forming an inverted cone or conical shape ice mass. Accordingly, as each new combined saline droplet attaches externally to a crystal of ice, they will attach to the cone-like surface of the mass, and the liquid saline droplet will flow over its containment surface, if any, and run down the conical slope to the solution at the bottom. Another alternative is to use the above pattern of nozzle placements, but also control the flow through the nozzles so that the nozzle depositing at the centerline of the settling chamber has the highest flow rate and the longest flow time.

The ice mass, when removed, must still be washed to sweep away any salt and other minerals and impurities at the interface. When the ice mass is removed from the chamber area to a temperate zone, it will melt to form pure water.

The fundamental mechanism for the attachment of the concentrated solution of the salt to the frozen water is surface tension. Thus, all the concentrated solution in the center of an open channel within the ice mass will behave like a bulk liquid and drain out. On the other hand, the few molecules of salt solution that attach to the ice stick to the ice because of surface tension. The surface tension is released when fresh water engages this sticky layer, freezes onto the ice and forces the sticky layer to be rejected and washed away. In the proposed crystallization chamber, as the frozen particles (coated with high density liquid brine) accumulate on the top of the previous layers in a conical heap, a low flow rate of fresh water is preferably sprayed on top of the most recently deposited layer. This fresh water deposits onto the ice mass and releases the very thin brine layer from the surface of the ice/snow. Thus there is gravity flow of brine and also washed (flushed) brine that flows from the conical shaped mass of ice.

The spray of chilled fresh water onto the mass of ice/snow is frozen onto the mass of ice/snow as each layer is deposited. The freezing fresh water displaces the brine that is attached to the surface of the ice/snow and releases the brine to drain through the crevices. When the washed ice/snow mass is recovered and thawed, the sprayed fresh water is recovered for reuse while the cleaned fresh water is used as product.

Porosity of the ice particles and the ice mass is an important parameter in the proposed process. Fortunately, it is a natural phenomenon for ice particles to have high porosity. The porous channels and voids within the ice structure allow residual trapped brine to drain, especially during the washing phase of the process. The residual contamination within the clear water is therefore minimized and reduced to a level that is acceptable for drinking.

Consider that ice has a density of 0.92-gm/cc and water has a density of 1.0-gm/cu cm so that ice floats on water. But more importantly there has been an old assumption that snow is about 10% as dense as water, or 0.10-gm/cc. It has been shown by measurement that at colder temperatures the snow forms an even more porous structure. See FIG. 6 which shows a comparison of the density of snow compared to air temperature.

H. Sample Calculation:

The following calculation shows the airflow requirements to generate 12,000 gallons per day of fresh water from 13,793 gallons per day of seawater processing. In this example, a 535 HP, two-stage turbo expander operating at an 85% thermodynamic efficiency is used, which will output 24,155 pounds of chilled air at minus 168 degrees F. This chilled air will absorb 939,146 BTU/HR if warmed to minus 6 degrees F., the eutectic temperature of saltwater.

| CHILLED AIR | | |
|---|---|---|
| | 535.07 | HP |
| | 9.9 | SCFM/HP |
| FLOW | 5,297.15 | SCFM |
| FLOW | 24,155.00 | #/HR |
| SPECIFIC HEAT | 0.24 | BTU/(# F.) |
| TEMP INPUT | −168 | F. |
| TEMP OUTPUT | −6 | F/ |
| | (939,146.40) | BTU/HR |

To show why it may be necessary to pre-cool the seawater to about 30 to 40 degrees F., the following analysis will begin by using a 60 degree F. saltwater at 64 pounds per cubic feet, which will be chilled to minus 6 degrees F. based upon the approximate calculation:

| SEAWATER | | |
|---|---|---|
| FLOW | 4917 | #/HR |
| SPECIFIC HEAT | 1 | BTU/(# F.) |
| TEMP INPUT | 60 | F. |
| TEMP OUTPUT | 32 | F. |
| FUSION | 144 | BTU/# |
| SPECIFIC HEAT | 0.5 | BTU/(# F.) |
| TEMP INPUT | 32 | F. |

-continued

| SEAWATER | |
|---|---|
| TEMP OUTPUT | −6 F. |
| | 939,147.00 BTU/HR |

In this example, a relatively small 4 feet diameter crystallization chamber is used, wherein a flow of chilled air of 5,297 SCFM is injected into the chamber at a velocity of 7 feet per second vertically downward. The example 4,000-micron spherical droplet size has a vertical settling velocity of 44 feet per second in still air. Thus there is a 7 ft/sec+44 ft/sec=51 ft/sec downward vertical transport of the droplet. If the chamber is 8 feet tall, there is a less than 8/51 second residence time in flight. Note: The above sizes of the chamber, droplets, etc., and the speed of the airflow, falling velocity of droplets, etc., are approximate, and may be deviated to the extent necessary, by taking into account the factors discussed herein. Thus it may be necessary to consider pre-chilling the saltwater intake from 60 degrees F. down to about 30 degrees F., before the saltwater is injected into the chamber, such as by forcing the intake water to circulate around the crystallization chamber, as will be discussed.

It is recognized that the seawater droplets will have to be super cooled to minus 26 degrees F. rather than minus 6 degrees F. to actually initiate the ice (fresh water) formation. The time delay for the initiation of the ice formation is shortened when the air temperature is much colder than minus 26 degrees F. For this reason, the present system preferably begins with a chilled air temperature of minus 135 degrees F. to minus 175 degrees F., give or take, or any temperature that works given the factors discussed herein. When the ice (fresh water) starts to form, it forms in less than a few seconds. Thus it is necessary for the droplets to initiate their freezing process in the crystallization chamber using a large sub-cooling temperature difference to start the solidification process while falling as a droplet, but to complete the freezing process after it has deposited on the growing mound of ice at the bottom of the chamber.

In some circumstances, the outer surface of the 4,000-micron diameter droplet may drop to temperatures far below the eutectic temperature and form fresh water ice, salt crystals and salt crystals with each molecule of NaCl attached to two molecules of water. There will also be metastable liquids in that mixture of solids. However, when warmed to slightly above the eutectic temperature, the thermodynamic mixture of fresh water ice and separate high density and high concentration saltwater solution becomes established as per the equilibrium diagram.

It is expected that the droplet will experience a freezing environment for a fraction of a second to only a few seconds in downward vertical flight and a freezing environment from between 10 seconds to 10 minutes or more in the accumulated mass at the bottom of the crystallization chamber. For the batch process of say 6 to 10 minutes, there is preferably more than enough time to attain equilibrium conditions in the mixture once the ice mass begins to form, to configure itself according to the phase diagram.

When the saltwater temperature remains at slightly warmer than minus 21.12 degrees C. (251.8 degrees K), or minus 6.02 degrees F., the total saltwater separates into two phases: (1) Pure ice when later thawed becomes pure water, and (2) Concentrated liquid saltwater solution. The ice (lower density) floats atop the high-density concentrated salt water. This is the desired state. FIG. 20 shows the equilibrium phase diagram for a mixture of sodium chloride (NaCl and water.

The sodium chloride is called the solute and the water is the solvent. When the two-phase region is entered at cold temperatures, there develops two phases (1) pure solid ice and (2) liquid brine with salt crystal as the solute and liquid water as the solvent.

When the saltwater temperature remains at colder than minus 21.12 degrees C., or minus 6.02 degrees F., the saltwater separates into three phases: (1) Pure ice when later thawed becomes pure water, (2) Salt crystals wherein there are two water molecules attached to each salt crystal ($NaCl*2H_2O$) and (3) Pure salt crystals. Although the equilibrium diagram only shows these three configurations at temperatures below minus 6 degrees F., there are other metastable liquid states that exist in this less than minus 6 degrees F. regime. This is an undesired state for our operation.

The data for a seawater sample (for which [Na+]) 0.46 M) are also shown; the high liquid fraction for this sample below the eutectic point is presumably due to the presence of other salts that have a lower eutectic than NaCl (in particular, MgSO4 and MgCl2). For the 0.5 M sample (~seawater) more than 99% of the NaCl precipitates as NaCl*2H2O at the eutectic point, but for the more dilute samples typically more than half of the initial Na+ remains in a free ionic state to as low as 228 K.

According to an idealized interpretation of the Gibbs phase rule and the phase diagram of NaCl and water, NaCl (aq) solutions solidify completely at temperatures below the eutectic point (252° K or −6° F.) to a mixture of (1) pure water ice, (2) NaCl (solid), and (3) $NaCl*2H_2O$ (solid), for all initial salt concentrations. The finding that a liquid brine phase can coexist with large amounts of ice and solid sodium salts at temperatures more than 20 degrees K below the eutectic point would therefore represent an apparent deviation from ideal equilibrium behavior. To differentiate this unfrozen brine phase from the "quasi-liquid layer" (QLL) previously found in studies of bulk pure water ice, we refer to the solution phase as a "quasi-brinelayer", or QBL.

The coexistence of a liquid brine phase with pure ice at temperatures below the eutectic point is indicated in experiments reported by Thurmond and Brass[17] and Koop et al.[18] Using differential scanning calorimetry (DSC), Koop et al. observed two separate thermal emission events during cooling of dilute NaCl solutions, which they attributed to the supercooled-liquid to solid-phase transitions associated with (1) the formation of pure ice (pure solid water) and (2) the precipitation of $NaCl*2H_2O$. The temperatures of these two-phase transitions converge as the NaCl concentration increases and become essentially equal for concentrations above 16 wt % NaCl.

When the saltwater solution is progressively chilled to the freezing temperature of pure water, then to the eutectic temperature of NaCl and then to colder temperatures other metastable compounds form described above as QLL and QBL. Thus it is expected that when the droplets from the spray nozzle encounter super chilled air, that pure ice (pure frozen water) will form with a series of other NaCl crystal and water structures. However, as the droplet warms back up to slightly above the eutectic temperature, the equilibrium solid ice and concentrated NaCl solution forms that is associated with the usual equilibrium diagram for the salt solution.

FIG. 19 shows this hysteresis loop and return to the initial condition. Time proceeds in the direction indicated by the arrows; the freezing temperature ($T_f$) and the eutectic temperature ($T_e$) are shown by the dashed vertical lines. When the liquid brine is first cooled (C1), no phase transition is observed, and thus the liquid is metastable below $T_f$. During cooling C2, pure ice suddenly precipitates, evolving heat, and the liquid fraction drops, but not to zero. The remaining MBL is cooled during C3 until a second phase transition occurs (C4), resulting in a second exothermal event and a drop in the liquid fraction. A liquid phase, the QBL, nonetheless remains, as revealed by the NMR experiments, and can be cooled during C5. Upon warming (W1), the liquid fraction gradually increases until Te is reached, whereupon rapid melting begins and the liquid fraction jumps. This sudden melting stops when the resulting brine reaches the approximate concentration dictated by the freezing point depression curve, and the liquid fraction rises smoothly thereafter as the temperature is raised (W3) and melting continues. Note that these discussions were taken from "NMR Investigation of the Quasi-Brine Layer in Ice/Brine Mixtures" by Cho, Shepson, Barrie, Cowin and Zaveri.

This discussion indicates that there can be sufficient heat transfer from the chilled air from the turbo expander in the pipes and/or cavities, and the intake seawater in the pipes and/or cavities, to have both fluids reach their equilibrium temperature of minus 6 degrees F. (or close to it) prior to injection of the seawater through a nozzle into the crystallization chamber. Of course, it would be necessary for the pipes and/or cavities to be joined together along a common surface for best heat exchange. The pipes and/or cavities and the chamber walls are preferably made of materials with excellent heat exchange properties, i.e., aluminum, copper, etc. The flow requirement in the pipes and/or cavities is such that the super cooled state of the liquid brine is sustained until it is sprayed into the crystallization chamber. The only reason for the droplet formation is to permit the solid brine to form liquid brine and be forced to the outside of the ice droplet. The success of this approach would result in a minimum size crystallization chamber of interest to users who are cramped for space.

The phase change occurs within less than a few seconds so that the residence time of the droplet in the chilled air and on the deposited mound of ice need only be less than a few seconds (FIG. 19). The progress of freezing could be followed at short intervals by rapidly scanning the liquid water 1H NMR line and monitoring its disappearance as the temperature dropped below phase transition points. Most solutions in the present study were found not to begin solidifying until the temperature was reduced below 257° K (or +3.2° F.). Recall that the eutectic temperature is minus 6 degrees F. Once freezing begins, the process was rapid, with the largest changes in the NMR signal complete within a few seconds.

Saltwater from the sea, at the seawater temperature (say 60 degrees F.), is filtered and pumped through the pipes and/or cavities that surrounds the bottom surface and the sidewalls of the crystallization chamber. The warm seawater circulates the warm intake seawater in a direction that warms the bottom surface initially and finally warms the sidewalls of the chamber prior to being sprayed through the nozzle into the crystallization chamber. Thus there are two important effects: (1) Saltwater sprayed into the crystallization chamber is pre-chilled to 30 to 40° F. before it comes into contact with the chilled air inside the crystallization chamber, and (2) The bottom surface and the sidewalls of the crystallization chamber are sufficiently warm to prevent any ice buildup.

The outermost boundary of the nozzle spray is limited radially so that little or no saltwater droplets strike the sidewalls, even as the height of the deposited ice increases with time. The droplets from the sprayer produce a range of seawater droplet sizes preferably with most all of the droplets centered around 4,000 microns in diameter. This occurs because of the size of the orifice in the showerhead and the pressure difference. It is also possible to select 1,000 microns in diameter seawater droplets, and even 250 microns diameter seawater droplets, or other size.

The droplet preferably starts at between 30 degrees F. and 40 degrees F. and comes into contact with the chilled air, preferably at minus 121 degrees F. or colder. FIG. 21 shows the core temperatures of the droplets after 0.2 seconds of exposure to minus 121 degrees F. of chilled air. The surface of the droplet will immediately attain a temperature slightly warmer than minus 121 degrees F. It is assumed that the heat transfer coefficient for the air/water interface is 1 to 5 BTU/(Hr Sq-Ft F) for free convection. If this flow conforms more to forced convection, the heat transfer coefficient will be higher and the core temperatures will be colder.

However, the core temperatures of the large 4,000 micron diameter droplet will be +24° F. and +32° F. for heat transfer rates of h=5 BTU/(Hr Sq-Ft F) and 1 BTU/(Hr Sq-Ft F), respectively, in 0.2 seconds of flight (First two columns of FIG. 21). There is no freezing in this short time. However, there is still the case wherein a credible higher heat transfer coefficient just may bring in these core temperatures to lower values. If the lumped mass model being used here is abandoned, it is expected that the actual freezing process will take place from the outside to the inside so that a frozen ice shell forms. The first two columns of FIG. 22 show that the freezing of the entire droplet will take place about 2 seconds after deposition. The chilled air has only a short residence time in the downward flight, and will need about 2 seconds more to completely surrender its stored chilled energy after the droplet has been deposited However, the core temperatures of the 1,000 micron diameter droplet will be −56.6° F. and +7.8° F. for heat transfer rates of h=5 BTU/(Hr Sq Ft F) and 1 BTU/(Hr Sq Ft F) in 0.2 seconds of flight (Third and fourth columns of FIG. 21). Thus the freezing of the entire droplet will take place about 2 seconds after deposition. Thus the chilled air has only a short residence time in the downward flight, and will need about 2 seconds more to completely surrender its stored chilled energy after the droplet has been deposited (see third and fourth columns of FIG. 22).

It is obvious that if 250-micron droplets are used, that even shorter flight times in the crystallization chamber will freeze the droplets completely.

It is important to note that these calculations assume that the −121° F. is maintained for the entire downward flight. Recall that heat exchange has been taking place with the incoming seawater in the pipes and/or cavities and during the heat exchange with the seawater droplets during its downward flight. The heat exchange is complete when the air and the two-phase mixture attain minus 6 degrees F.

If very small droplet sizes are used, much of the freezing will still take place after deposition. Portions of the droplet will be super cooled at the outside radius of each droplet and these super cool regimes will contain metastable structures. But at equilibrium, after deposition, the ice particles will pack together and they will float atop the dense brine. When the brine drains from the ice mass, voids will form. Thus the propeller will move a frothy mass toward the exit plane.

I. Example of Proposed System:

An embodiment of the proposed system is described by showing snapshots of the system configuration at six key times in its operation.

Figure 25:
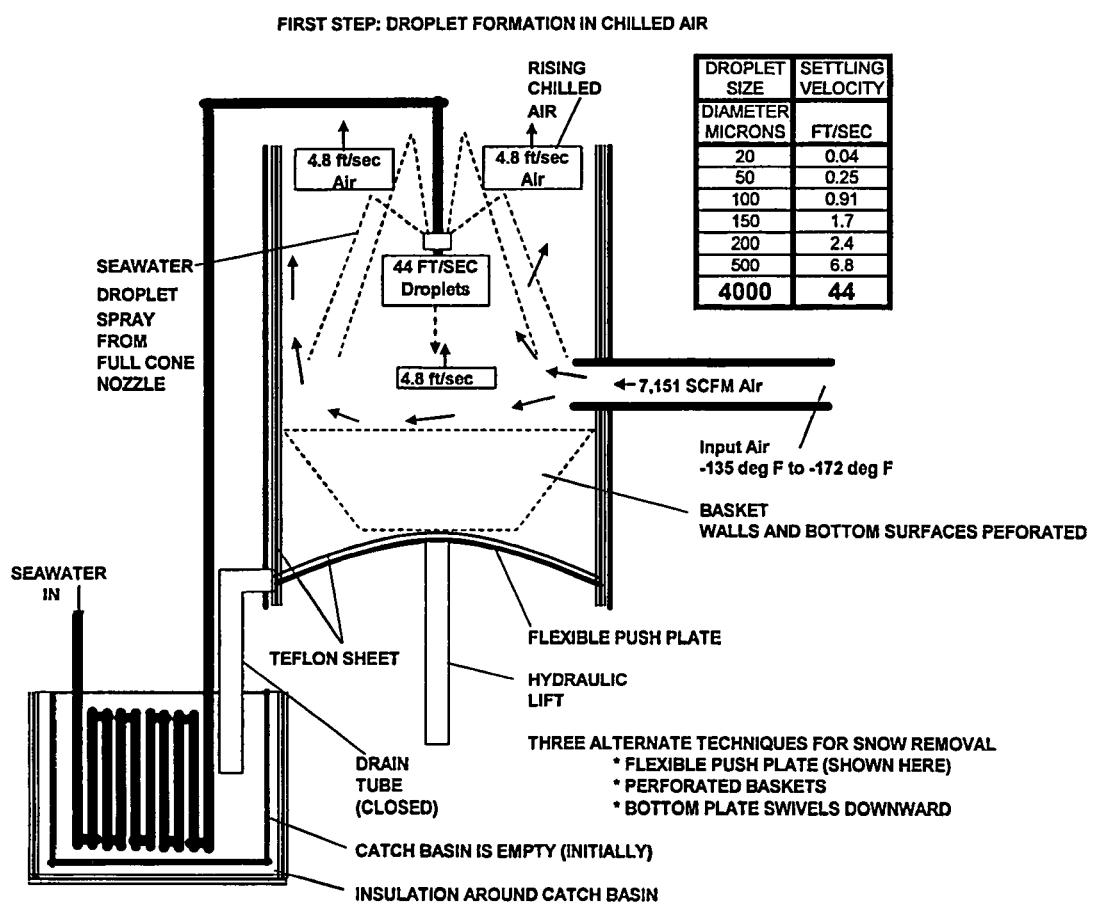
FIG. 25 shows a section view of the main chamber showing a counter flow system wherein chilled air is introduced so that it travels upward inside the chamber against the falling seawater droplets, wherein a hydraulic lift is provided to remove the ice mass when the cycle is completed.

1. First Step:

The first step in the counter flow arrangement shown in FIG. 25 shows the nozzle spraying the intake seawater into droplets at 70 degrees F. with a median diameter of 4,000 microns, and the chilled air introduced at 7,151 SCFM and temperature of minus 157 degrees F. The upward velocity of the droplets from the nozzle eventually reaches a minimum relative velocity because of gravity, and then settles downward toward the base of the column. The final mixture of (1) seawater droplets and (2) chilled air, results in minus 6 degrees F., the eutectic temperature of the mixture. One can control the final mixture temperature so that it is warmer or colder than the eutectic temperature by adjusting the flow of intake seawater and chilled air.

Figure 26:
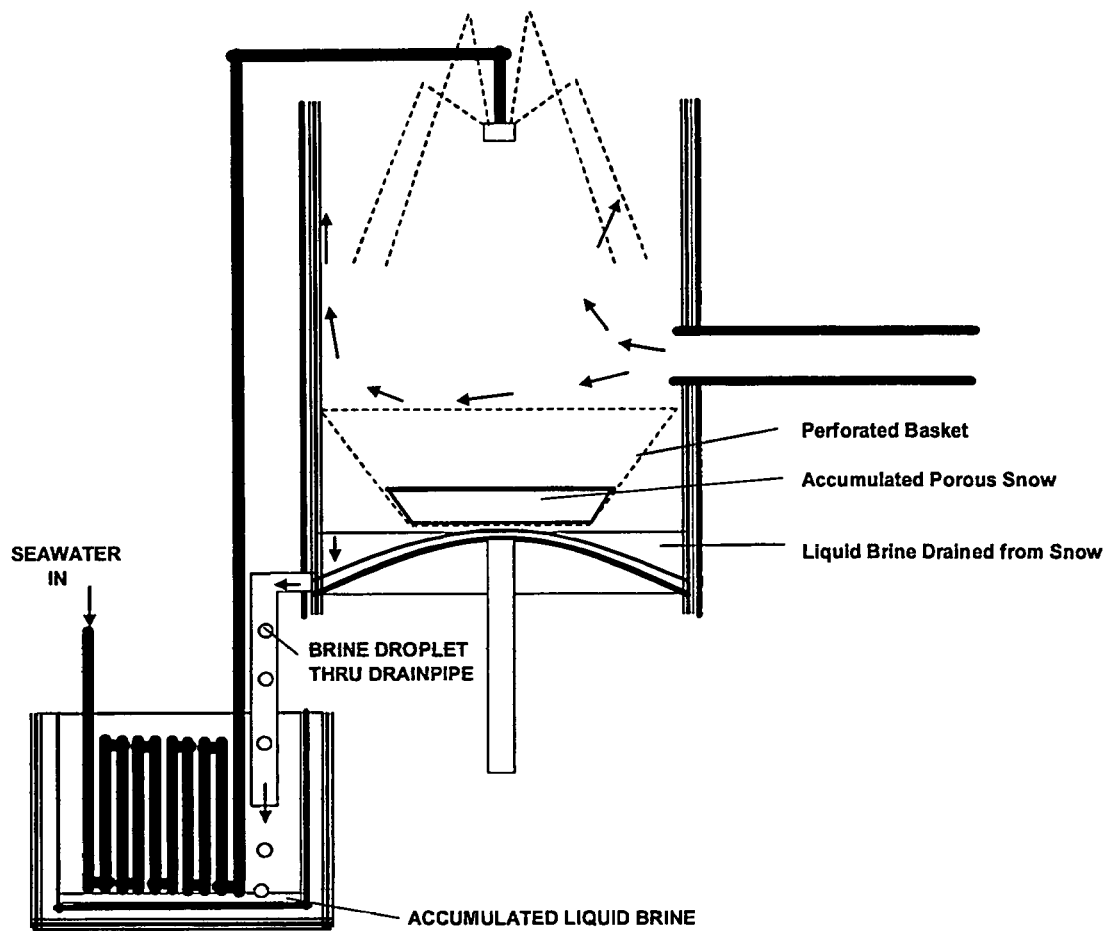
FIG. 26 shows a section view of the main chamber showing the counter flow system of FIG. 25 wherein chilled air is introduced so that it travels upward inside the chamber against the falling seawater droplets, wherein an ice mass begins to form at the bottom of the chamber where concentrated salt brine collects.

2. Second Step:

As shown in FIG. 26, the mixing of the seawater droplets and chilled air occurs with some droplets (1) Falling through chilled air with chilled ice and seawater as one piece but with the ice separated from the salt solution (2) Colliding and coalescing with nearby droplets and progressing with the separation process within the new and larger droplet, and (3) Droplets that reach the bottom pool of fluid so that the saline solution of the droplet merges with the larger pool of fluid and the released ice crystal buoys to the top where it may coalesce with other previous ice crystals.

As the newly arriving droplets repeatedly land on the ice mass, the mass can form a rough upper surface, with small hills and valleys. This can cause additional droplets falling onto the middle of the mass to separate into saline droplets and ice crystals inside the valleys. This could cause some of the liquid saline droplets to be suspended and trapped in the ice mass, although studies show that channels and voids are formed in the ice mass, through which the brine can pass down into the collected solution.

To avoid this, and enable the saline liquid to run off the edges, the nozzles can be positioned with a dense cluster pattern closer to the settling chamber centerline. The ice buildup will then occur preferentially toward the center of the chamber, forming an inverted cone (see FIGS. 17 and 18). Accordingly, as each new combined saline droplet attaches externally to a crystal of ice, they will attach to the cone surface, and the liquid saline droplet will flow over its containment surface, if any, and run down the conical slope to the solution at the bottom. Another alternative is to use the above pattern of nozzle placements, but also control the flow through the nozzles so that the nozzle depositing at the centerline of the settling chamber has the highest flow rate and the longest flow time.

The injection height of the chilled air should be higher than the ice mass, as discussed above in connection with FIG. 17, and means for producing an annulus gap between the ice mass and chamber walls is preferably provided, as discussed in connection with FIG. 18.

Figure 27:
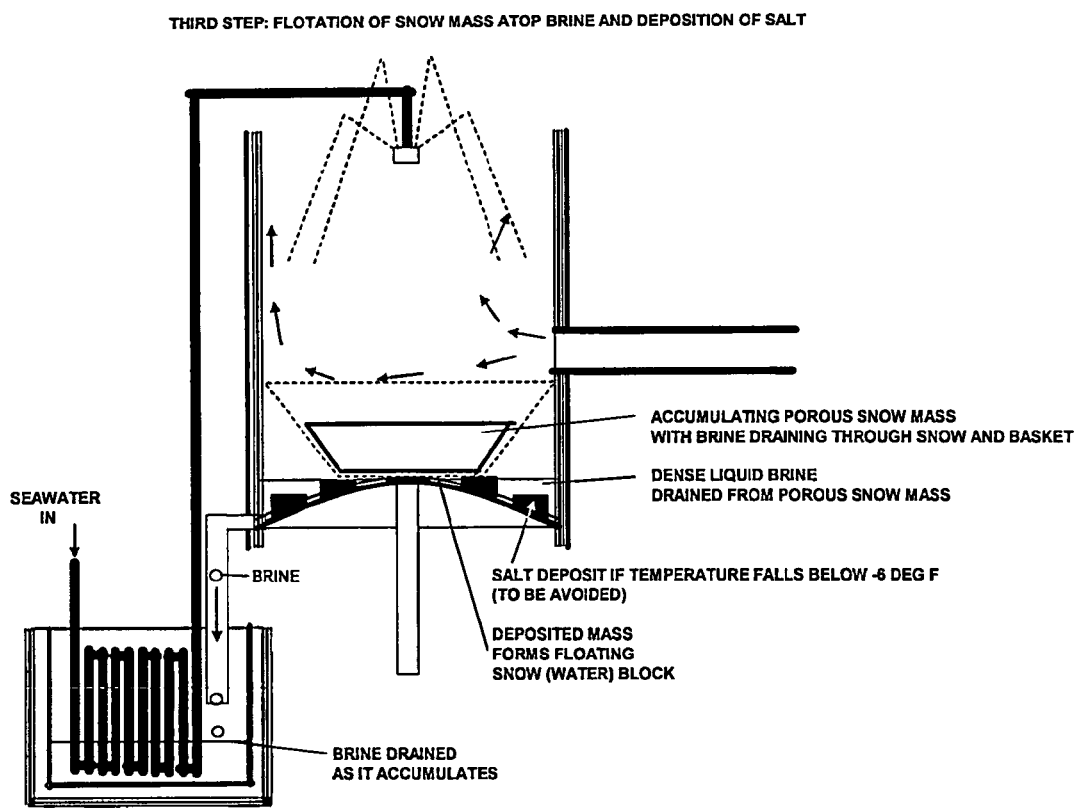
FIG. 27 shows a section view of the main chamber showing the counter flow system of FIG. 25 wherein chilled air is introduced so that it travels upward inside the chamber against the falling seawater droplets, wherein an ice mass forms at the bottom of the chamber and concentrated salt brine collects and solid salt deposits form.

3. Third Step:

If too little seawater is sprayed into the settling chamber, the mixture at the bottom of the chamber will fall below the eutectic temperature and not only will there be solid ice going out of solution but the salt will go out of solution and deposit itself as salt crystals. This is shown in FIG. 27. See conical shape of ice block of preferred embodiment in FIGS. 17 and 18.

4. Fourth Step:

The 2 hours of the continuous operation has come to an end and it is time to remove the ice block. The nozzle structure is moved to the side, and the solution is raised to the level where it does not spill over the edges of the chamber wall.

Figure 28:
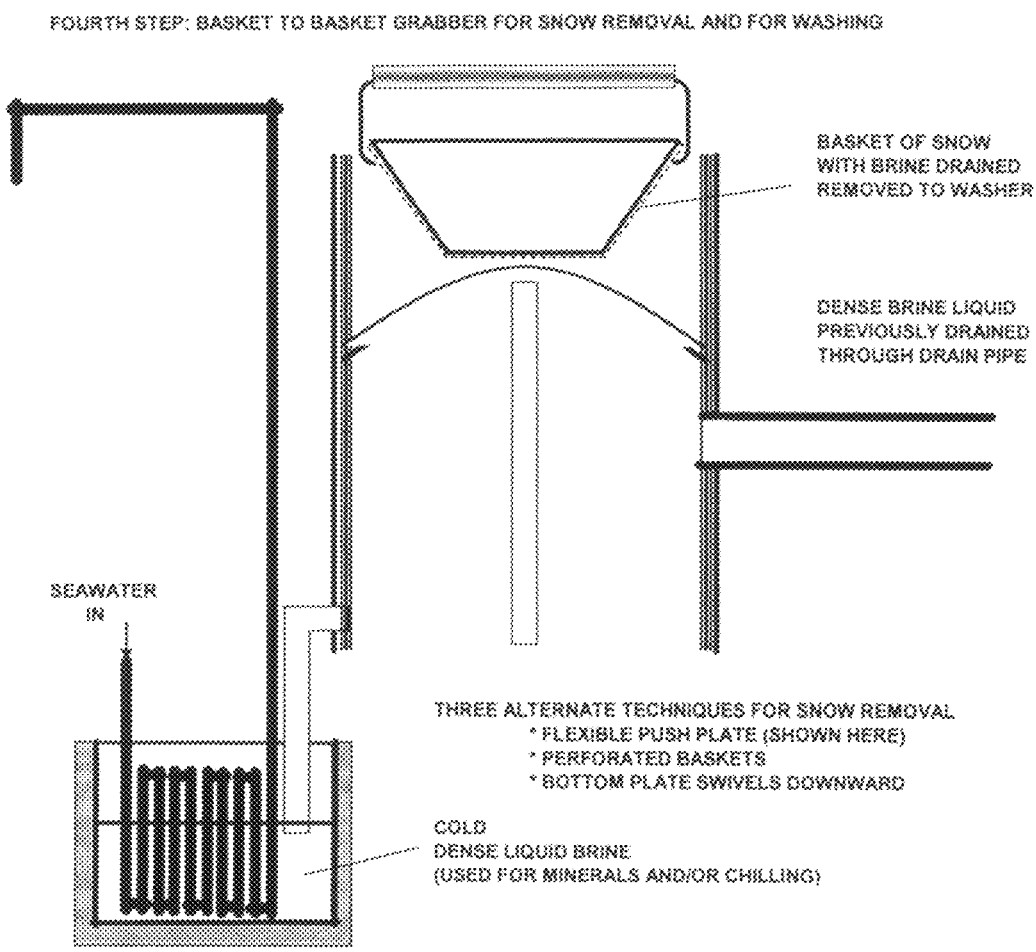
FIG. 28 shows a section view of the main chamber with an embodiment having pincers that grab the ice mass after it has formed, and the cycle has completed.

Over the two hour period the ice crystals collect on the top of the denser saline solution and merge into an ice block. At this time the interior contents of the entire settling chamber is moved upwards by a hydraulic piston until the top surface of the saline solution reaches the top edge of the settling chamber. There is then access to the ice block by pincers that hook the ice block and move it to the next position where it is scraped and washed, as shown in FIG. 28. The chilled solution will be saved for later steps in the operation. The surfaces of block of chilled ice need to be scratched or rinsed with fresh water to remove any brine solution in its interfaces. It is then left in a tank for room temperature thawing and for later use as pure drinking water.

Alternatively, after the ice mound has built to its planned height and is floating on the concentrated salt solution, the saltwater drain at the bottom of the crystallization chamber is opened to drain the salt water. When the saltwater solution has been completely drained, the drain is closed. The bottom drops down and swings from the horizontal position to a vertical position around a hinge. The hinge supports the bottom surface of the crystallization chamber. Any pipes or tubing surrounding the bottom surface of the chamber is preferably configured to accommodate the pivot around the hinge. Then, the ice mound can slide down the pivoted bottom surface and fall upon a conveyor belt. The conveyor belt sends the ice mound to the tank containing previous ice mounds that are thawing.

Since the transfer of the ice from the chamber is accomplished by gravity, the incoming chilled air can be adjusted to be about 14.67-psia (1 atmosphere pressure). This 14.67-psia exit pressure for the turbo expander and 200-psia for the entrance pressure to the turbo expander, permit extremely cold temperatures to be achieved at the turbo expander exhaust into the crystallization chamber. However, this large pressure drop will require a two-stage turbo expander.

5. Fifth Step:

The incoming warm seawater will be passed through a heat exchanger counter currently with the outgoing chilled briny water, as shown in FIG. 29. The energy savings will permit a higher desalination rate for the same chilled airflow.

6. Sixth Step:

The operation of the system at slightly above the eutectic temperature is convenient in that the dense saline solution floats the ice and Teflon can be provided on the inside surface of the chamber walls to avoid the ice block from sticking to the vessel. In the final stage, after the ice block is removed, it is convenient to drop the temperature below the eutectic temperature to deposit the ice as crystals that can be removed. This process will likely be initiated earlier than in the last step.

As shown in FIG. 30, to remove the salt, the hydraulic lift is dropped to its initial position. There are then two conditions. (1) The thermocouple indicates that the saline solution is slightly warmer than the eutectic temperature. In this case, when the saline solution is removed, all the salt is removed with the saline solution. This chilled saline solution is returned to the heat exchanger to precool the intake seawater. (2) The thermocouple indicates that the saline solution is slightly colder than the eutectic temperature. The saline solution is drained and processed as described in the first case. Thereafter, the hydraulic piston is dropped below the bottom level of the settling chamber and the solidified salt is scraped off the piston surface. The salt can be discarded or a use found for it.

J. Comparison to Other Methods:

The following discussion is provided to show that the present method is able to produce fresh drinking water at a lower cost, i.e., pound per minute, than the previous desalination processes. The analysis below describes the methodology and assumptions used to evaluate the utility and efficiency of this method of desalinating seawater. The analysis below consists of two basic steps:

(1) Defining the thermodynamics of the process that involves matching the cooling/freezing capacity of the chilled air, with the energy required to be removed from the batch of seawater to cause the salt and the pure water within the batch to crystallize.

(2) Defining the setup and specifying the steps in the process required to achieve physical separation of the salt and ice crystals, and to accomplish desalination of the batch of seawater.

As listed below, in this batch process the amount of seawater was determined to be 11,000 pounds and the duration of the desalination process of the batch was assumed to be 2 hours. The initial temperature of seawater was assumed to be 70° F. The eutectic point of NaCl is −6.2° F. and the eutectic composition is 23.3%. The total amount of cooling required for this batch is 2,211,000 BTU. This includes the ice formation phase (163 BTU/# fusion).

| Ice Formation Included |  |
| --- | --- |
| 120 | min |
| 11,000 | # salt water |
| 1 | BTU/(# F.) |
| 70 | F. |
| 32 | F. |
| 163 | BTU/# fusion @−6.2 deg F. |
| 2,211,000.00 | BTU cooling required |

If the ice formation phase is not included, supercooled water is achieved, and the available cooling capacity can accommodate 30,000 # of saltwater.

| No Ice Formation (SUPERCOOLED WATER) |  |
| --- | --- |
| 120 | min |
| 30,000 | # salt water |
| 1 | BTU/(# F.) |
| 70 | F. |
| −6.2 | F. |
| 0 | BTU/# no ice |
| 2,286,000.00 | BTU cooling required |
| 250 | # salt water/min |
| 0.857 | fraction of fresh water |
| 214 | # fresh water/min |

The 500 kW turbo expander processes 7,151 scfm of air and delivers the atmospheric pressure air at −153° F. for desalination. The temperature of −6.2° F. is the eutectic temperature for ice formation and separation from salt crystals. Thus, we will use the air for desalination over the temperature range of −153° F. to −6.2° F. The calculation shown below gives the available cooling energy as 2,297,508 BTU if we operate the flow process for 120 minutes. The intake of 11,000 pounds of seawater at 70° F. and bringing it to −6.2° F. requires 2,211,000 BTU.

| 500 | kW (thermal) |
| --- | --- |
| 670 | hp |
| 10.67 | scfm/hp |
| 7,151 | scfm |
| 120 | min |
| 858,177 | scf |
| 0.076 | #/cu ft |
| 65,221 | # air |
| 0.24 | BTU/(# F.) |
| −6.16 | F. |
| −153 | F. |
| (2,298,508.17) | BTU cooling available |

The iteration of the above calculations for the 500 kW system shows that the proposed freeze crystallization will ideally produce 79.75 # fresh water per minute, ideally. Thus, 6.27 kW is required to produce a pound of fresh water per minute. This compares to the scraped surface crystallizer that requires 11.4 kW to produce a pound of fresh water per minute; and to the reverse osmosis membrane desalinator that requires 68.2 kW to produce a pound of fresh water per minute.

The embodiments discussed and shown herein are merely exemplary and are by no means intended to be limiting. The present invention contemplates various methods and systems that can be adapted that can carry out the intents and purposes of the invention, which may be a variation of the embodiments disclosed herein.

What is claimed is:

1. A system for desalinating seawater comprising:
   a compressor for compressing air;
   an expander for expanding compressed air to co-generate chilled air;
   a chamber, with at least one nozzle through which the seawater can be sprayed into the chamber, and into which the chilled air from the expander can be introduced, wherein the exposure of the seawater to the chilled air enables ice particles consisting of pure water to be formed in the chamber;
   a device that helps remove the ice particles from the chamber, thereby helping to separate the pure water in the ice particles from the impurities in the seawater; and
   wherein the walls of the chamber are adapted with tubes or passages which are extended within said walls to allow the seawater, and/or heated air from the compressor to be circulated within said walls, to help regulate the temperature of said walls.

2. The system of claim 1, wherein the system comprises at least one of the following:
   1) a storage tank is provided to enable the compressed air to be stored therein, and wherein the expander is adapted to release and expand the compressed air inside said tank, to produce chilled air;
   2) an electrical generator is provided which is adapted to produce electricity as the compressed air is being released by the expander, wherein the chilled air is produced as a by-product of producing electricity;
   3) a surge tank, wherein, as the compressed air is expanded by the expander, the energy produced thereby is used to drive a second compressor that produces additional compressed air energy that can be introduced into the surge tank;
   4) at least one heat exchanger for helping to reduce the temperature of the compressed air before it is expanded by the expander; or
   5) at least one common shaft between the compressor and expander which allows them to operate in association with each other.

3. The system of claim 1, wherein the temperature of the chilled air introduced into the chamber is below the eutectic temperature for the seawater, and wherein the ice particles are allowed to deposit at the bottom of the chamber in the form of a mass, wherein the temperature of the mass at the bottom of the chamber is above the eutectic temperature for the seawater.

4. The system of claim 3, wherein the temperature of the chilled air is between minus 135 degrees F. and 175 degrees F., and the temperature of the mass of ice particles is above minus 6.2 degrees F., such that a liquid brine consisting of the impurities in the seawater can runoff from the mass.

5. The system of claim 1, wherein the system comprises at least one of the following:

1) the system is adapted such that the seawater can be sprayed down into the chamber from above, and the chilled air can be introduced such that it flows upward inside the chamber;
2) the system is adapted such that the seawater can be sprayed down into the chamber from above, and the chilled air can be introduced such that it flows downward inside the chamber in the same direction as the seawater.

6. The system of claim 1, wherein chilled air is introduced at a temperature between minus 135 degrees F. and 175 degrees F.

7. The system of claim 1, wherein said at least one nozzle is adapted and configured to produce a centrally focused spray of seawater that tends to keep the droplets that are formed by the spray away from the outer walls of the chamber, and toward the center of the chamber, wherein as the ice particles fall, they tend to land near the center of the chamber, to form an ice mass which allows the seawater to flow down the sides of the ice mass, without being captured within the ice mass formation as it coalesces and freezes.

8. The system of claim 1, wherein seawater is passed through the tubes or passages in the chamber walls to help warm up the chamber walls, and in turn, the cold temperature inside the chamber can help pre-chill the seawater as it circulates before being sprayed into the chamber, wherein the seawater that is introduced into the chamber is pre-chilled to less than 40 degrees F.

9. The system of claim 1, wherein heated air is passed through the tubes or passages in the chamber walls to help warm up the chamber walls, wherein the cold temperatures inside the chamber can help pre-chill the heated air as it circulates to the expander.

10. The system of claim 1, wherein the location where the chilled air is introduced into the chamber is above the height that is expected to be reached by an ice mass formation that is formed within the chamber when the ice particles coalesce and freeze together at the bottom of the chamber.

11. The system of claim 1, wherein a heater is provided in connection with the walls of the chamber near where the ice particles accumulate, wherein the walls of the chamber can be heated to prevent the ice particles from freezing and sticking to the walls, and/or to allow any ice mass that is produced as the ice particles coalesce and freeze within the chamber to be easily removed.

12. The system of claim 1, wherein said tubes or passages are extended around said chamber.

\* \* \* \* \*